US011263695B2

(12) United States Patent
Taylor et al.

(10) Patent No.: US 11,263,695 B2
(45) Date of Patent: Mar. 1, 2022

(54) METHODS AND SYSTEMS FOR LOW LATENCY GENERATION AND DISTRIBUTION OF TRADING SIGNALS FROM FINANCIAL MARKET DATA

(71) Applicant: Exegy Incorporated, St. Louis, MO (US)

(72) Inventors: David Edward Taylor, St. Louis, MO (US); Andy Young Lee, Ballwin, MO (US); David Vincent Schuehler, St. Louis, MO (US)

(73) Assignee: Exegy Incorporated, St. Louis, MO (US)

( * ) Notice: Subject to any disclaimer, the term of this patent is extended or adjusted under 35 U.S.C. 154(b) by 0 days.

(21) Appl. No.: 16/874,474

(22) Filed: May 14, 2020

(65) Prior Publication Data

US 2020/0364791 A1  Nov. 19, 2020

Related U.S. Application Data

(60) Provisional application No. 62/847,641, filed on May 14, 2019.

(51) Int. Cl.
*G06Q 40/00* (2012.01)
*G06Q 40/04* (2012.01)
*G06F 17/18* (2006.01)
*G06N 20/00* (2019.01)
*G06Q 30/02* (2012.01)

(52) U.S. Cl.
CPC .............. *G06Q 40/04* (2013.01); *G06F 17/18* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| 4,868,866 A | 9/1989 | Williams, Jr. |
| 5,270,922 A | 12/1993 | Higgins |
| 5,987,432 A | 11/1999 | Zusman et al. |
| (Continued) | | |

OTHER PUBLICATIONS

"Lava Trading Deploys Foundry", Light Reading, 2004, pp. 1-3.
(Continued)

*Primary Examiner* — Olabode Akintola
(74) *Attorney, Agent, or Firm* — Thompson Coburn LLP

(57) ABSTRACT

Systems and methods are disclosed herein that compute trading signals with low latency and high throughput using highly parallelized compute resources such as integrated circuits, reconfigurable logic devices, graphics processor units (GPUs), multi-core general purpose processors, and/or chip multi-processors (CMPs). Examples of trading signals that can be computed in this fashion include a liquidity indicator that indicates a presence of a reserve order for a financial instrument, a liquidity estimation that estimates an amount of hidden liquidity for a financial instrument, a quote price stability estimation that estimates a duration of time for which a price quote for a financial instrument will be valid, and/or a quote price direction estimation that estimates whether the price in a next quote for a financial instrument will be higher or lower than the price for that financial instrument in the current quote.

35 Claims, 38 Drawing Sheets

(56) References Cited

U.S. PATENT DOCUMENTS

| | | |
|---|---|---|
| 6,278,982 B1 | 8/2001 | Korhammer et al. |
| 6,388,584 B1 | 5/2002 | Dorward et al. |
| 6,711,558 B1 | 3/2004 | Indeck et al. |
| 7,139,743 B2 | 11/2006 | Indeck et al. |
| 7,181,437 B2 | 2/2007 | Indeck et al. |
| 7,414,975 B2 | 8/2008 | Olderdissen |
| 7,552,107 B2 | 6/2009 | Indeck et al. |
| 7,606,267 B2 | 10/2009 | Ho et al. |
| 7,636,703 B2 | 12/2009 | Taylor |
| 7,660,793 B2 | 2/2010 | Indeck et al. |
| 7,680,790 B2 | 3/2010 | Indeck et al. |
| 7,702,629 B2 | 4/2010 | Cytron et al. |
| 7,840,482 B2 | 11/2010 | Singla et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 8,069,102 B2 | 11/2011 | Indeck et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 8,326,819 B2 | 12/2012 | Indeck et al. |
| 8,374,986 B2 * | 2/2013 | Indeck ............... G06N 5/025 706/47 |
| 8,379,841 B2 | 2/2013 | Taylor et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,737,606 B2 | 5/2014 | Taylor et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,879,727 B2 | 11/2014 | Taylor et al. |
| 8,880,501 B2 | 11/2014 | Indeck et al. |
| 8,983,063 B1 | 3/2015 | Taylor et al. |
| 9,020,928 B2 | 4/2015 | Indeck et al. |
| 9,047,243 B2 | 6/2015 | Taylor et al. |
| 9,176,775 B2 | 11/2015 | Chamberlain et al. |
| 9,323,794 B2 | 4/2016 | Indeck et al. |
| 9,336,494 B1 * | 5/2016 | Purpura ............... G06N 20/00 |
| 9,363,078 B2 | 6/2016 | Taylor et al. |
| 9,396,222 B2 | 7/2016 | Indeck et al. |
| 9,547,680 B2 | 1/2017 | Buhler et al. |
| 9,547,824 B2 | 1/2017 | Indeck et al. |
| 9,582,831 B2 | 2/2017 | Parsons et al. |
| 9,633,093 B2 | 4/2017 | Henrichs et al. |
| 9,633,097 B2 | 4/2017 | Tidwell et al. |
| 9,672,565 B2 | 6/2017 | Parsons et al. |
| 9,898,312 B2 | 2/2018 | Chamberlain et al. |
| 9,916,622 B2 | 3/2018 | Parsons et al. |
| 9,961,006 B1 | 5/2018 | Sutardja et al. |
| 9,990,393 B2 | 6/2018 | Parsons et al. |
| 10,037,568 B2 | 7/2018 | Taylor et al. |
| 10,062,115 B2 | 8/2018 | Taylor et al. |
| 10,102,260 B2 | 10/2018 | Lancaster et al. |
| 10,121,196 B2 | 11/2018 | Parsons et al. |
| 10,133,802 B2 | 11/2018 | Lancaster et al. |
| 10,146,845 B2 | 12/2018 | Henrichs et al. |
| 10,158,377 B2 | 12/2018 | Indeck et al. |
| 10,169,814 B2 | 1/2019 | Parsons et al. |
| 10,191,974 B2 | 1/2019 | Indeck et al. |
| 10,229,453 B2 | 3/2019 | Taylor et al. |
| 10,346,181 B2 | 7/2019 | Chamberlain et al. |
| 10,360,632 B2 | 7/2019 | Parsons et al. |
| 10,411,734 B2 | 9/2019 | Indeck et al. |
| 10,467,692 B2 | 11/2019 | Parsons et al. |
| 10,504,184 B2 | 12/2019 | Parsons et al. |
| 10,572,824 B2 | 2/2020 | Chamberlain et al. |
| 10,650,452 B2 | 5/2020 | Parsons et al. |
| 2002/0054604 A1 | 5/2002 | Kadambi et al. |
| 2002/0080871 A1 | 6/2002 | Fallon et al. |
| 2003/0086300 A1 | 5/2003 | Noyes et al. |
| 2003/0172017 A1 | 9/2003 | Feingold et al. |
| 2006/0123425 A1 | 6/2006 | Ramarao et al. |
| 2006/0269148 A1 | 11/2006 | Farber et al. |
| 2007/0027788 A1 | 2/2007 | Bandman et al. |
| 2007/0198523 A1 | 8/2007 | Hayim |
| 2007/0294157 A1 * | 12/2007 | Singla ............... G06Q 40/06 705/36 R |
| 2009/0182683 A1 | 7/2009 | Taylor et al. |
| 2010/0027545 A1 | 2/2010 | Gomes et al. |
| 2010/0138360 A1 | 6/2010 | Cutler et al. |
| 2012/0089496 A1 | 4/2012 | Taylor et al. |
| 2012/0116998 A1 | 5/2012 | Indeck et al. |
| 2012/0130922 A1 | 5/2012 | Indeck et al. |
| 2012/0246052 A1 | 9/2012 | Taylor et al. |
| 2014/0180904 A1 | 6/2014 | Parsons et al. |
| 2014/0180905 A1 | 6/2014 | Parsons et al. |
| 2017/0124166 A1 | 5/2017 | Thomas et al. |
| 2017/0124255 A1 | 5/2017 | Buhler et al. |
| 2017/0220655 A1 | 8/2017 | Henrichs et al. |
| 2018/0276271 A1 | 9/2018 | Parsons et al. |
| 2018/0330444 A1 | 11/2018 | Taylor et al. |
| 2018/0365766 A1 | 12/2018 | Taylor et al. |
| 2019/0073719 A1 | 3/2019 | Parsons et al. |
| 2019/0079984 A1 | 3/2019 | Lancaster et al. |
| 2019/0108177 A1 | 4/2019 | Henrichs et al. |
| 2019/0155831 A1 | 5/2019 | Indeck et al. |
| 2019/0205975 A1 | 7/2019 | Taylor et al. |
| 2019/0324770 A1 | 10/2019 | Chamberlain et al. |
| 2020/0007157 A1 | 1/2020 | Indeck et al. |
| 2020/0111163 A1 | 4/2020 | Parsons et al. |
| 2020/0184378 A1 | 6/2020 | Chamberlain et al. |

OTHER PUBLICATIONS

Actel White Paper, "Flash FPGAs in the Value-Based Market", 2005, pp. 1-9.

Altera White Paper, "Accelerating High-Performance Computing with FPGAs", Altera Corporation, Oct. 2007, pp. 1-8, Version 1.1.

Compton et al., "Configurable Computing: A Survey of Systems and Software", Northwestern University, Dept. of ECE, Technical Report, 1999, pp. 1-39.

Gokhale et al., "Reconfigurable Computing: Accelerating Computation With Field-Programmable Gate Arrays", 2005, pp. 1-247, Springer.

New York Stock Exchange, "XDP Integrated Feed Client Specification", Oct. 2019, pp. 1-31, Version 2.3a.

International Search Report and Written Opinion for PCT/US2020/32972, dated Sep. 18, 2020.

\* cited by examiner

| Concentration Ratio (averaged over 7 days) | |
|---|---|
| EDGA | 23.38 |
| Nasdaq BX | 22.68 |
| BYX | 9.41 |
| ARCA | 8.95 |
| EDGX | 4.64 |
| BZX | 4.07 |
| NYSE | 3.98 |
| NASQAQ | 2.97 |

| Most Reserve Order Volume Executed at Each Exchange | |
|---|---|
| NYSE | 30,222,894 |
| BZX | 17,439,263 |
| EDGX | 14,932,819 |
| NASDAQ | 13,231,460 |
| ARCA | 9,841,514 |
| BYX | 4,155,309 |
| EDGA | 824,547 |
| Nasdaq BX | 63,930 |
| Nasdaq PSX | 5,358 |

| Largest % of Time Occupied by Reserve Orders at Top of Book | |
|---|---|
| BZX | 4.43% |
| NYSE | 4.26% |
| EDGX | 3.13% |
| NASDAQ | 2.24% |
| ARCA | 1.12% |
| BYX | 0.56% |
| EDGA | 0.15% |
| Nasdaq BX | 0.01% |
| Nasdaq PSX | 0.00% |

| Largest Concentration of Reserve Order Volume as a % of Total Volume per Exchange | |
|---|---|
| BZX | 18.02% |
| NYSE | 16.95% |
| EDGX | 14.51% |
| ARCA | 9.98% |
| NASDAQ | 6.66% |
| BYX | 5.31% |
| EDGA | 3.40% |
| Nasdaq PSX | 0.56% |
| Nasdaq BX | 0.32% |

Figure 27

| Field Name | Description |
|---|---|
| ASK_DARK | The field is based on the Liquidity Indicator trading signal where a Boolean value will be set to TRUE when that signal indicates the presence of one or more reserve (iceberg) orders on the ask side. The field is set to FALSE when the signal ceases to be active, indicating that the previously detected hidden liquidity has been removed. Note that there is also a Liquidity Indicator trading signal field for the bid side of the order book (see BID_DARK) |
| ASK_DARK_TOTAL | This field represents the accumulated count of the Liquidity Indicator trading signal going true on the ask side for the trading day (the number of times the ASK_DARK field has transitioned to true during the subject trading day) |
| ASK_DARK_VOLUME_FILLED | This represents the volume of hidden liquidity traded during the current active ask-side liquidity indicator (ASK_DARK = TRUE). If there is no active signal currently (e.g., ASK_DARK = FALSE), a zero volume is shown. |
| ASK_DARK_TOTAL_VOLUME_FILLED | This represents the accumulated volume of hidden liquidity traded while ASK_DARK = TRUE for the trading day. |
| ASK_DARK_VOLUME_REPLENISHED | This represents the volume of shares replenished during the current active ask-side Liquidity Indicator trading signal (ASK_DARK = TRUE). If there is no active signal currently (e.g., ASK_DARK = FALSE), a zero volume is shown. |
| ASK_DARK_TOTAL_VOLUME_REPLENISHED | This represents the accumulated volume of shares replenished while ASK_DARK = TRUE for the trading day. |
| ASK_DARK_NUMBER_FILLED | This represents the number of hidden liquidity executions during the current active ask-side Liquidity Indicator trading signal (ASK_DARK = TRUE). If there is no active signal currently (i.e., ASK_DARK = FALSE), a count of zero is shown. |
| ASK_DARK_TOTAL_NUMBER_FILLED | This represents the accumulated count of hidden liquidity order executions while ASK_DARK = TRUE for the trading day. |
| ASK_DARK_NUMBER_ORDERS | This represents the number of orders identified as reserve (iceberg) orders on the ask side during the current active ask-side Liquidity Indicator trading signal (ASK_DARK = TRUE). If there is no active signal currently (e.g., ASK_DARK = FALSE), a count of zero is shown. |
| ASK_DARK_TOTAL_NUMBER_ORDERS | This represents the accumulated count of ask-side reserve (iceberg) orders identified for the trading day. |

Figure 28A

| Field Name | Description |
|---|---|
| BID_DARK | The field is based on the Liquidity Indicator trading signal where a Boolean value will be set to TRUE when that signal indicates the presence of one or more reserve (iceberg) orders on the bid side. The field is set to FALSE when the signal ceases to be active, indicating that the previously detected hidden liquidity has been removed. Note that there is also a Liquidity Indicator trading signal field for the ask side of the order book (see ASK_DARK) |
| BID_DARK_TOTAL | This field represents the accumulated count of the Liquidity Indicator trading signal going true on the bid side for the trading day (the number of times the BID_DARK field has transitioned to true during the subject trading day) |
| BID_DARK_VOLUME_FILLED | This represents the volume of hidden liquidity traded during the current active bid-side liquidity indicator (BID_DARK = TRUE). If there is no active signal currently (e.g., BID_DARK = FALSE), a zero volume is shown. |
| BID_DARK_TOTAL_VOLUME_FILLED | This represents the accumulated volume of hidden liquidity traded while BID_DARK = TRUE for the trading day. |
| BID_DARK_VOLUME_REPLENISHED | This represents the volume of shares replenished during the current active bid-side Liquidity Indicator trading signal (BID_DARK = TRUE). If there is no active signal currently (e.g., BID_DARK = FALSE), a zero volume is shown. |
| BID_DARK_TOTAL_VOLUME_REPLENISHED | This represents the accumulated volume of shares replenished while BID_DARK = TRUE for the trading day. |
| BID_DARK_NUMBER_FILLED | This represents the number of hidden liquidity executions during the current active ask-side Liquidity Indicator trading signal (BID_DARK = TRUE). If there is no active signal currently (i.e., BID_DARK = FALSE), a count of zero is shown. |
| BID_DARK_TOTAL_NUMBER_FILLED | This represents the accumulated count of hidden liquidity order executions while BID_DARK = TRUE for the trading day. |
| BID_DARK_NUMBER_ORDERS | This represents the number of orders identified as reserve (iceberg) orders on the bid side during the current active bid-side Liquidity Indicator trading signal (BID_DARK = TRUE). If there is no active signal currently (e.g., BID_DARK = FALSE), a count of zero is shown. |
| BID_DARK_TOTAL_NUMBER_ORDERS | This represents the accumulated count of bid-side reserve (iceberg) orders identified for the trading day. |

| Data from 8/2/2019 | Short-fuse Predictions - "First Fire" Metrics | | | Long-fuse Predictions - "First Fire" Metrics | | |
|---|---|---|---|---|---|---|
|  |  |  |  |  |  |  |
|  | 70.49% | 6,399,599 | 0.415720 | 77.24% | 11,546,828 | 2918.66 |
|  | 66.49% | 9,049,543 | 0.499712 | 73.32% | 13,483,396 | 2582.02 |
|  | 62.65% | 12,060,406 | 0.592734 | 69.72% | 15,379,517 | 2363.49 |
|  | 59.00% | 15,325,416 | 0.693036 | 66.63% | 17,488,245 | 2166.80 |
|  | 55.46% | 18,728,473 | 0.785675 | 63.91% | 19,528,301 | 2018.43 |
|  | 52.23% | 22,046,491 | 0.874694 | 61.65% | 21,311,441 | 1910.86 |
|  | 49.58% | 24,750,979 | 0.944960 | 59.75% | 22,823,425 | 1809.99 |
|  | 48.06% | 26,260,292 | 0.986067 | 58.18% | 24,105,765 | 1731.64 |
|  | 47.28% | 26,979,173 | 1.001322 | 56.83% | 25,160,809 | 1674.25 |

Figure 40C

| Threshold: 0.5 | Accuracy | | | Opportunity Capture | | Response Time (µs) | |
|---|---|---|---|---|---|---|---|
| | Improving | Crumbling | VIX | Improving | Crumbling | Improving | Crumbling |
| 2018-12-17 | 67.3% | 59.1% | 30.0 | 77.2% | 46.9% | 1,839 | 852 |
| 2018-12-19 | 66.3% | 60.4% | 25.6 | 76.5% | 47.9% | 1,060 | 423 |
| 2018-12-28 | 66.6% | 59.7% | 28.3 | 77.4% | 46.3% | 1,581 | 679 |
| 2019-01-04 | 65.5% | 61.8% | 21.4 | 78.2% | 46.0% | 2,347 | 779 |
| 2019-01-07 | 66.4% | 61.5% | 21.4 | 78.8% | 46.2% | 2,854 | 880 |
| 2019-02-11 | 67.0% | 60.8% | 16.0 | 78.7% | 46.0% | 4,097 | 1,411 |
| 2019-02-12 | 67.0% | 61.1% | 15.4 | 78.6% | 46.5% | 4,693 | 1,740 |
| 2019-02-13 | 67.6% | 60.7% | 15.7 | 78.6% | 46.7% | 4,259 | 1,531 |
| 2019-02-14 | 66.9% | 61.1% | 16.2 | 78.3% | 46.9% | 2,977 | 1,042 |
| 2019-02-15 | 66.6% | 61.7% | 14.9 | 78.7% | 46.5% | 4,234 | 1,389 |
| Average | 66.7% | 60.8% | | 78.1% | 46.6% | 2,994 | 1,073 |
| Standard Dev | 0.6% | 0.9% | | 0.8% | 0.6% | 1,280 | 424 |

|  | TRADE PRICE | TRADE SIZE | BID PRICE | OFFER PRICE | BID QUOTE VECTOR UP | OFFER QUOTE VECTOR UP | NEXT OFFER PRICE | PURSE CREDIT |
|---|---|---|---|---|---|---|---|---|
| Example 1 | $10.39 | 100 | $10.34 | $10.39 | 54.7% | 54.4% | $10.43 | $4.00 |
| Example 2 | $10.41 | 2000 | $10.40 | $10.41 | 48.6% | 40.4% | $10.40 | $20.00 |
| Example 3 | $10.45 | 1500 | $10.43 | $10.45 | 45.6% | 57.8% | $10.44 | -$15.00 |
| Example 4 | $10.29 | 1000 | $10.28 | $10.30 | 61.3% | 59.7% | $10.31 | $5.00 |

METHODS AND SYSTEMS FOR LOW LATENCY GENERATION AND DISTRIBUTION OF TRADING SIGNALS FROM FINANCIAL MARKET DATA

Cross-Reference and Priority Claim to Related Patent Applications

This patent application claims priority to U.S. provisional patent application Ser. No. 62/847,641, filed May 14, 2019, and entitled "Methods and Systems for Low Latency Generation and Distribution of Trading Signals from Financial Market Data", the entire disclosure of which is incorporated herein by reference.

This patent application is also related to PCT patent application serial no. PCT/US2020/032972, designating the United States, filed May 14, 2020, and entitled "Methods and Systems for Low Latency Generation and Distribution of Trading Signals from Financial Market Data" which claims priority to U.S. provisional patent application Ser. No. 62/847,641, filed May 14, 2019, and entitled "Methods and Systems for Low Latency Generation and Distribution of Trading Signals from Financial Market Data", the entire disclosures of each of which are incorporated herein by reference.

INTRODUCTION

Financial market participants use a wide variety of information to perform their roles in the marketplace. The primary pieces of information are the current prices for financial instruments, such as the most recent price at which an instrument traded, the highest price of limit orders to buy the instrument (the bid), and the lowest price of limit orders to sell the instrument (the offer). This pricing data, along with other pieces of information that dictate the terms under which a financial instrument may be bought or sold, is referred to as "financial market data" (or more simply, "market data"). As used herein, a "financial instrument" refers to a contract representing equity ownership, debt or credit, typically in relation to a corporate or governmental entity, wherein the contract is saleable. Examples of "financial instruments" include stocks, bonds, commodities, currency traded on currency markets, etc. but would not include cash or checks in the sense of how those items are used outside financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

The generation, delivery, and processing of market data has evolved dramatically along with financial markets. As the trading of financial instruments has moved from humans negotiating prices verbally to electronic markets with fully automated trading systems, market data has expanded from printing closing prices in newspapers to distributing real-time messages via computer networks. Electronic financial exchanges now publish one or more real-time feeds of market data, where the messages in these feeds have structured formats with defined data fields. These feeds may be consumed directly by financial market participants, such as exchanges, brokers, market makers, principal traders, and asset managers. These firms tend to be the most sophisticated and largest firms that rely on speed, as well as the ability to consume and process multiple feeds of real-time market data from one or more financial markets, to perform at least one of their roles in the marketplace. For example, a principal trading firm may use low latency market data to identify and execute profitable trading opportunities. As another example, an exchange or Alternative Trading System (ATS) may use low latency market data to ensure that they are complying with regulations such as Regulation National Market System (Reg NMS) that requires them to execute trades at the current best price or route the order to a market with the best price.

Systems that enable these firms to consume, process, and distribute market data feeds at high speed (low latency) and high capacity are essential and invaluable. Examples of systems and techniques for consuming, processing, and distributing financial market data feeds at low latency and high throughput are described in U.S. Pat. Nos. 7,840,482, 7,921,046, 8,768,805, 9,047,243, 10,037,568, 10,121,196, and 10,229,453, the entire disclosures of each of which are incorporated herein by reference.

Market data feeds may also be consumed by intermediaries that process, summarize, and distribute the data to financial market participants. These intermediaries are primarily financial technology and services vendors who deliver data to recipients that are less sensitive to data latency. Examples include trading firms who hold positions for more than a fraction of a second, regulatory compliance and risk management systems, retail brokers such as Fidelity and Vanguard, media outlets such as cable television networks, and Internet search engines such as Yahoo and Google.

For the purposes of discussion, we define tiers of financial market participants based on their data speed requirements. We define Tier 1 to be market participants that require real-time data delivered with maximum speed (minimum latency). These firms typically consume market data feeds directly from financial exchanges, co-locating their electronic trading systems in the same data center as the electronic exchange systems. These firms may also employ wireless network links to minimize the latency of market data transfers between data centers. Note that Tier 1 market participants include firms that hold positions in financial instruments for extremely brief periods of time (microseconds to seconds), as well as firms that hold positions for much longer periods of time. These latter firms still require low latency data to achieve predictable prices when buying or selling large positions, commonly referred to as "maximizing execution quality" or "minimizing slippage."

We define Tier 2 to be market participants that require real-time data, but they lack the minimum data latency requirement. These firms may also prefer to take summarized or delayed data throughout the trading day in order to minimize data consumption resources and costs.

We define Tier 3 to be market participants that prefer to operate on summary data, typically delivered at the conclusion of each trading session or day. Additional summarization periods, such as weekly, monthly, quarterly, or annually, are common.

Tier 2 and 3 represent a significant proportion of financial market participants, especially firms representing the "buy side" of the market that invest capital, either their own or outside investors, with the goal of increasing their value (i.e. achieving returns) while taking acceptable risk. Examples of Tier 2 and 3 market participants on the buy side include hedge funds, asset managers, and "actively managed" mutual funds.

In addition to using market data, market participants at each tier use additional information to perform their function in the marketplace. Trading signals are types of additional information that can be used in this regard. As used herein, a "trading signal" refers to derived information that provides an estimation or an inference about an aspect of market conditions, where such an aspect is not directly reported within the financial market data, and where the estimation or inference can be used as a factor by a market participant to make a trading decision with respect to the financial markets. Tier 1 market participants are especially interested in trading signals that predict short-term events for financial instruments, especially changes in liquidity (the amount of an instrument that may be readily purchased or sold), the number of outstanding orders, and prices of outstanding orders. Tier 2 and Tier 3 market participants are more broadly interested in trading signals that represent more sustained price movements (i.e. trends) over various time periods, as well as macro-economic events that may impact the price and liquidity of many financial instruments.

There are a wide variety of sources of trading signals. Financial market data is a primary source, especially for Tier 1 market participants that respond to instantaneous movements in prices. Some trading signals may be able to be generated from normalized market data messages, while other trading signals may require access to the raw (or native) format of market data messages from exchanges. Other sources for trading signals are generally referred to as "alternative data." Such alternative data may include: credit card transaction data, weather forecasts, sentiment analysis of social media updates, and geospatial image analysis to count cars in the parking lots of retail stores or the number of container ships moving goods along known shipping routes. These sources tend to be more useful to Tier 2 and 3 market participants based on their lower operating speeds and the longer time horizons of their trading opportunities.

In general, there are two classes of trading signals that may be extracted from real-time market data—logical signals and estimators.

Logical signals are generated from one or more features of financial market data that represent a condition or combination of conditions in the stream of real-time market data messages. These logical signals and the conditions that define them are typically based on expert knowledge of the way in which specific markets operate or specific financial instruments are traded. As noted above, some logical signals may be able to be generated from normalized market data messages, while other logical signals may require access to the raw (or native) format of market data messages from exchanges. For example, the number of messages that an exchange packages into a packet for transmission over a network may be one of the conditions of a logical signal.

Estimators are trading signals that predict future field values or conditions, typically employing some form of statistical method, regression analysis, machine learning, or "artificial intelligence." An estimator may predict when a price is going to change, what direction a price will move, or the number of shares that may be successfully sold in a defined time window. Most estimators are computed by first computing many features of the financial market data and then combining the outputs of the feature computations to produce an estimate. Expert knowledge is typically used to define features that may be helpful in producing the desired estimate. Once features are defined, a number of machine learning (ML) or artificial intelligence (AI) techniques can be employed to automate the exploration of possible combinations of features to produce an accurate estimator. For example, the resulting estimator can take the form of a probability value that a defined event will occur within a defined time period. In another example, this probability value can be converted into a Boolean value by choosing a threshold for the probability that defines a true or false estimate, and the estimator can take the form of the Boolean value.

Due to the computationally intensive task of generating trading signals and the state of conventional computer technology, they are primarily used by Tier 2 and 3 market participants. This is particularly the case for estimators. While Tier 1 market participants strongly desire estimators for the immediate-term market dynamics that dictate their trading performance, they face the technical challenges of generating estimators fast enough and synchronizing the estimates with their current view of market data. Accordingly, the inventors believe there is a need in the art for technical innovations that enable the generation of trading signals in the same or similar amount of time required to process financial market data (e.g., less than a few microseconds) and that present trading signals synchronously with market data to trading applications.

The inventors have developed technically innovative solutions that compute trading signals with low latency and high throughput, making them useful to latency-sensitive Tier 1 market participants. This represents a significant technical advance in the art because conventional computer systems have been unable to produce trading signals at sufficiently low latency and high throughput to make them useful for satisfying the demands of Tier 1 market participants. These technical innovations are achieved by identifying and leveraging opportunities for functional parallelism and data parallelism within the trading signal computations and then engineering the trading signal computations to be performed by highly parallelized compute resources such as integrated circuits, reconfigurable logic devices, graphics processor units (GPUs), multi-core general purpose processors, and/or chip multi-processors (CMPs). These types of compute resources can serve as coprocessors to which trading signal computations are offloaded. Such compute resources permit fine-grained parallelism with respect to the different operations that the compute resource performs, thereby providing the compute resource with the ability to generate trading signals at speeds that are orders of magnitude faster than would be possible through conventional software execution on a general purpose processor. Moreover, by leveraging such fine-grained parallelism, processing tasks for generating trading signals can be intelligently engineered into processing pipelines that include parallelized processing logic deployed on such a compute resource. With such a pipeline, downstream pipeline logic can perform a processing task on data that was previously processed by upstream pipeline logic while the upstream pipeline logic is simultaneously performing other processing tasks on new data, thereby providing tremendous throughput gains.

As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Examples of GPPs include an Intel Xeon processor and an AMD Opteron processor. As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. Thus, with a reconfigurable logic device, the gate level logic and interconnections between gate level logic can be reconfigured in the field to effectively "hard wire" the reconfigurable logic device to perform a desired operation. An example of a reconfigurable logic device is a field programmable gate array (FPGA). The gate level logic of a reconfigurable logic device can be reconfigured by loading firmware onto the reconfigurable logic device. The term "firmware", as used herein, refers to data processing functionality that is deployed on reconfigurable logic or other processing devices, wherein firmware may be used to change or define the form of the device on which it is loaded. By contrast, the term "software" refers to data processing functionality that is deployed on a processing device but does not change or define the form (e.g., gate level logic and interconnections) of the device on which it is loaded. GPPs, GPUs, and CMPs can have their data processing functionality defined via software, while reconfigurable logic devices have their data processing functionality defined via firmware.

In example embodiments discussed in greater detail below, the inventors show how trading signals can be computed and transmitted by a dedicated signal plant that operates on streaming financial market data.

In additional example embodiments, the inventors also show how trading signals can be computed by extending the architecture of a ticker plant that consumes, normalizes, aggregates, and distributes streaming financial market data. For example, the processing stages of a ticker plant pipeline can be extended to compute one or more features that are later combined to generate an estimator. This allows the estimator to be computed with minimal additional processing time and resources, as the incremental feature computations use the readily available fields and intermediate computation results of the data normalization and aggregation computations.

In yet additional example embodiments, the inventors show how trading signals can be computed within a trading application server.

As noted above, these innovative computations of trading signals can use both functional and data parallelism to achieve previously unattainable levels of speed and throughput. Computations can be sub-divided into two or more pipeline stages, where each pipeline stage operates in parallel to the other pipeline stages. Two or more pipelines of computations can then operate in parallel on two or more independent data streams. In some embodiments, the output of multiple pipelines can be combined to produce aggregated trading signals and estimators. As noted, these solutions can be implemented with a variety of parallel processing technologies that include, general purpose processors that contain multiple Central Processing Unit (CPU) cores (e.g., CMPs), application-specific firmware logic in FPGAs, and GPUs that contain numerous compute cores.

Accordingly, the accelerated market data appliances that are positioned at the head of electronic trading platforms are capable of generating trading signals in real time, where excess processing capacity in compute resources such as CPUs, FPGAs, GPUs, CMPs, etc. allow the trading signals to be delivered in real time and synchronicity with normalized market data. With such example embodiments, trading signal generation does not impede the delivery of real-time market data. For example, normalized market data and trading signals can be delivered consistently with single-digit microsecond latency.

Further still, the inventors have also developed solutions that present trading signals synchronously with market data to trading applications. In an example embodiment, trading signals can be delivered in the payload of the financial market data messages to downstream consumers (where such downstream consumers may take the form of automated trading applications). Thus, a trading signal payload may be appended to market data messages, such that consumers of the market data message receive trading signals and estimators relevant to the market data, e.g. referencing the same financial instruments. In another example embodiment trading signal messages (such as trading signal messages that contain only trading signals) may be distributed to consumers for downstream synchronization at the consumer with an independent stream of market data updates. The inventors disclose the creation and use of an innovative synchronization identifier for this purpose. This allows new trading signal solutions to be introduced into an existing trading infrastructure without changing the mechanisms that consume, normalize, enrich, and distribute financial market data.

Examples of trading signals that can be computed at low latency and high throughput using the techniques described herein include (1) a liquidity indicator that indicates a presence of a reserve order for a symbol, (2) a liquidity estimation that estimates an amount of hidden liquidity for a symbol, (3) a quote price stability estimation that estimates a duration of time for which a price quote for a symbol will be valid, and/or (4) a quote price direction estimation that estimates the direction of change in the next quote price for a symbol. It should be understood that these are merely examples of trading signals that can be computed using the techniques described herein. Other trading signals can be computed as may be desired by a practitioner using the techniques discussed below. Furthermore, example embodiments can compute these different types of trading signals in parallel with each other with respect to each relevant streaming market data event, all without adding latency to streaming normalized financial market data delivered to consuming applications that would detract from the ability of those consuming application to implement trading or other activities.

Furthermore, trading signals for Tier 2 and 3 market participants can be generated by summarizing low latency trading signals that are generated for Tier 1 market participants. These derivative trading signals may be delivered at various time intervals, such as every minute throughout a trading session for a Tier 2 market participant or once per day after the conclusion of a trading session for a Tier 3 market participant. The appropriate summarization interval may be determined by the frequency requirements of the market participant and the useable life of the derivative signal.

As an example, consider a Tier 3 market participant that seeks to observe large trades of "natural investors." These investors include active managers and corporate insiders who value stocks based on fundamental valuations. They also price in the impact of anticipated events and changes in macro conditions. A Tier 3 market participant can use this information to follow the movements of natural investors, take contrary positions to natural investors, or simply use the information as one of many inputs to more sophisticated predictive models.

To get information on natural investor transactions, Tier 3 market participants may scour Form 13F13F and Form 4 regulatory filings; for example by performing computerized searches of 13F of the Electronic Data Gathering, Analysis, and Retrieval (EDGAR) system of the United States Securities and Exchange Commission (SEC). Given the timing requirements of these regulatory disclosures—days to months after the transaction—this information is often stale and un-actionable for use as a trading signal.

Attempting to more quickly identify executions of large institutional orders by monitoring trade reports from market data feeds or end of day summaries is technically difficult—even though they represent 30% of daily volume. First, these sophisticated investors use various techniques to minimize information leakage and market impact. Execution algorithms developed in-house or by brokers slice large "parent" orders, then schedule and route the "child" orders to various trading venues. Alternatively, many trading venues offer various hidden or "dark" order types that attempt to achieve the same goals. Pile on the rapidly changing bids and offers from electronic market makers and high-frequency traders and it becomes extremely difficult to pick up the "signal" from the noise.

Reserve orders are the most prevalent hidden or "dark" order type offered by trading venues. They continue to be used widely by institutional traders to prevent information leakage and minimize market impact. A derivative signal for Tier 2 and 3 market participants can be generated by summarizing the reserve orders detected within the trading session. Since this daily information represents a faster and more complete summary of institutional trading activity than is otherwise available weeks later from regulatory filings (e.g. Form 4 and 13F filings), Tier 2 and 3 market participants can use this information to improve their ability to identify market trends and predict longer term price movements. They may use the derivative signal information directly or they may include it as an additional input to predictive machine learning models to improve their performance and/or broaden their utility.

Such derivative trading signals are predicated on the ability to predict or detect market dynamics with each market data update event. Example embodiments disclosed herein include the ability to generate derivative trading signals for Tier 2 and 3 market participants by consuming and summarizing the output of trading signals computed at low latency for Tier 1 market participants. The efficiency of this approach allows for a wide range of time intervals for delivery of derivative signals.

These and other features and advantages of the present invention will be described hereinafter to those having ordinary skill in the art.

BRIEF DESCRIPTION OF THE DRAWINGS

FIG. 27 shows a ranking of exchanges by concentration ratio.

FIGS. 28A and 28B provide an example list of trading signals that can be generated based on the detection of reserve orders in a market data feed.

FIG. 35B shows accuracy, opportunity capture, and median observed price durations for trading activity from a particular trading day for a wide range of prediction threshold values.

FIG. 38 provides accuracy metrics for short and long fuse predictions by an example embodiment for the Quote Fuse signal for each permutation of bid and offer tick direction.

FIG. 40A shows an example of Quote Fuse signaling where the user has selected 55% as the prediction threshold.

FIGS. 40B and 40C present accuracy and opportunity capture metrics for a wide range of prediction threshold values in two perspectives with reference to an example Quote Fuse signal embodiment.

DETAILED DESCRIPTION OF EXAMPLE EMBODIMENTS

Figure 1:
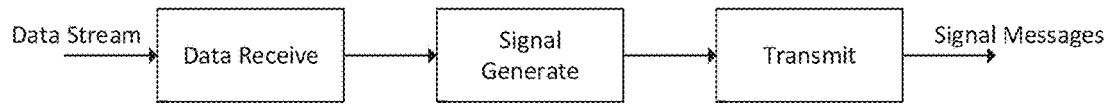
FIG. 1 shows an example signal generation pipeline where the signal generate stage is interposed between a data receive stage and a signal transmit stage, where the transmit stage sends signal messages to downstream consumers.

FIG. 1 shows in a basic form, an example embodiment of a signal generation pipeline. The pipeline produces an output stream of signal messages derived from the input data stream. When the input data stream is financial market data, an exemplary output signal message is an indication that a reserve order to buy an unknown quantity of shares of IBM stock is resting at the best bid price on the New York Stock Exchange (NYSE). This signal may be used by an automated trading application to make a trading decision and generate a trade order (e.g., sell a larger quantity of IBM stock on the NYSE than indicated by the size (or number of shares) of the best bid in the most recent quote message). Another exemplary output signal message is an estimator that gives a probability that the next update to the best offer price for AAPL stock will be higher than the current best offer price. When the probability exceeds a chosen threshold value, this signal may be used by an automated trading application to make a trading decision and generate a timely trade order (such as a trade order to buy the available shares of AAPL stock now before the price increases).

While we focus our discussion on producing trading signals and estimators from financial market data, it should be understood that the technology described herein can be applicable to other use cases. For example, when the input data stream is supply chain data from suppliers and sales data from retailers, an exemplary output signal message is an estimator of the probability of supply not meeting demand for a product. Nevertheless, for the purpose of explanation, the signals generated by example embodiments discussed below will be trading signals with respect to financial instruments.

In the embodiment of FIG. 1, a signal generate stage is interposed between a data receive stage and a transmit stage. Each stage operates in parallel, allowing multiple items from the data stream (e.g. messages) to be processed in parallel. This functional parallelism significantly increases the capacity or throughput of the signal generation computation. Consider the simple case where each pipeline stage processes one message per second. The total time required to process a message is three seconds, however the pipeline is able to sustain a computation rate of one message per second.

The data receive stage offloads the signal generate stage from the computing tasks of receiving data from a data stream. Exemplary tasks include performing network protocol stack processing such as copying a packet into a buffer, verifying the correctness of packet contents using a Cyclic Redundancy Check (CRC), resequencing packets that arrive out of order, and requesting retransmissions of missing packets from the sender. The data receive stage may also parse the input data stream to extract specific data fields that are required by the signal generate stage. The data receive stage may sub-divide its work into pipeline stages, as well as parallel pipelines, in order to maximize its throughput. The above-referenced and incorporated U.S. Pat. Nos. 7,921,046, 8,768,805, and 10,121,196 describe examples of how financial market data can be processed as part of the data receive stage.

The signal generate stage operates on one or more fields from the input data stream to produce a trading signal. The signal generate stage computes on or more signals belonging to the classes of logical or estimator signals. We describe below several example embodiments of signal generate stages. The signal generate stage produces signal messages and passes them to the transmit stage.

The transmit stage sends signal messages to downstream consumers. The transmit stage can distribute messages to consumers using solutions that achieve a variety of reliability, latency, throughput, and efficiency goals. One example embodiment of a transmit stage sends signal messages using a broadcast network that delivers all signal messages to all consumers. Another example embodiment of a transmit stage sends signal messages using one or more multicast channels that allow consumers to select a subset of signal messages by consuming the appropriate channels. For example, signal messages associated with stocks whose symbols begin with the letter 'A' can be transmitted on the first multicast channel, signal messages associated with stocks whose symbols begin with the letter 'B' can be transmitted on the second multicast channel, etc. A consumer interested in signal messages for AAPL stock only can consume the first multicast channel only, discarding signal messages for other stocks whose symbols begin with 'A'. Another example embodiment of a transmit stage only sends signal messages to a consumer when the consumer subscribes to (or registers interest in) a specific set of signal messages. The transmit stage uses a unicast connection to each consumer. For each consumer, it transmits a copy of signal messages that they have subscribed to and it filters signal messages that they have not subscribed to. The transmit stage may use a reliable unicast protocol to ensure that subscribed to messages are delivered to each consumer. Example protocols include Transport Control Protocol (TCP) and Remote Direct Memory Access (RDMA) Reliable Connection (RC). The transmit stage may sub-divide its work into pipeline stages, as well as parallel pipelines, in order to maximize its throughput. The above-referenced and incorporated U.S. Pat. Nos. 7,921,046 and 10,121,196 describe examples of how financial market data can be processed as part of the transmit stage (see also the above-referenced and incorporated U.S. Pat. No. 9,047,243).

In an example embodiment, the throughput of the data receive, signal generate, and transmit stages are equivalent to ensure that a stage does not impose a bottleneck in the pipeline. Note that the amount of computation performed by a stage may differ for various types of input data. Buffers can be used at the inputs or outputs of pipeline stages to prevent data loss when the instantaneous processing rate differs among stages.

Figure 2:
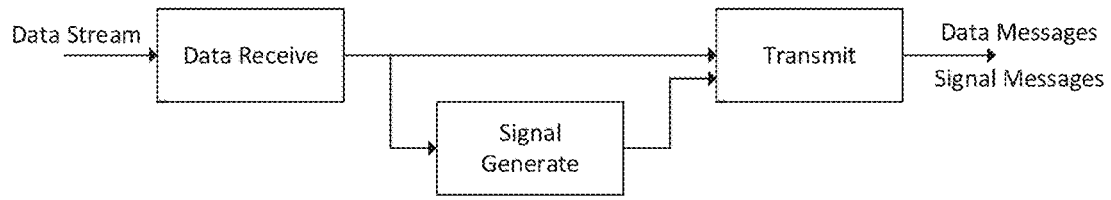
FIG. 2 shows an example signal generation pipeline where the signal generate stage is interposed between a data receive stage and a transmit stage, where the transmit stage sends both signal messages and data messages to downstream consumers. Signal generation occurs in parallel to transmitting data messages to downstream consumers.

In another example embodiment, a combination of signal messages with the input data stream can be propagated to downstream consumers, as shown in FIG. 2. This can be referred to as a "bump in the wire" architecture and it delivers several benefits for some use cases. It allows signal messages to be distributed over the same network as data messages, and it typically minimizes changes to an existing data processing and distribution infrastructure. It also minimizes or entirely eliminates delays in data message delivery to consumers that benefit from the lowest possible latency of data message delivery. These consumers may not consume signal messages. Alternatively, they may perform some actions immediately upon receipt of a data message and then perform subsequent actions upon receipt of a signal message.

For example, an automated currency (i.e. foreign exchange) trading application that performs market making may immediately cancel its order to buy a given currency when it receives a data message that a trade occurred at a lower purchase price (i.e. currency exchange rate) on a different market. This immediately removes the risk that the market maker purchases the currency at an inferior price in the marketplace. It may then use a signal message that estimates the movement of the best bid price on its market to send a new order to buy the currency at a revised price. This estimate may allow the market maker to post a superior price before other market participants, and thus capture the trading opportunity.

In the FIG. 2 embodiment, a signal generation pipeline contains a signal generate stage interposed between a data receive stage and a transmit stage. The data receive stage passes data to both the signal generate stage and the transmit stage. The transmit stage sends both signal messages and data messages to downstream consumers. Signal generation occurs in parallel to transmitting data messages to downstream consumers.

Figure 3:
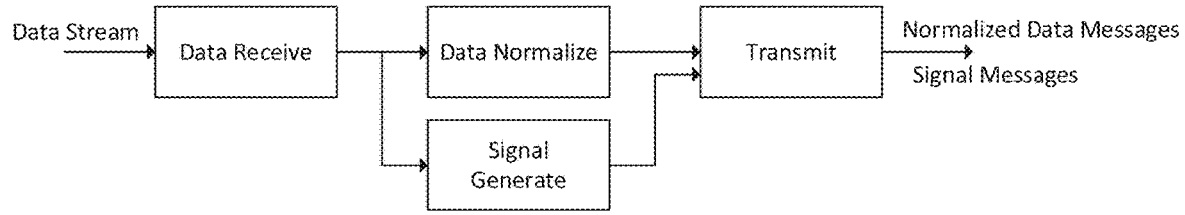
FIG. 3 shows an example signal generation pipeline where the signal generate stage is interposed between a data receive and a transmit stage, and operates in parallel to a data normalize stage. The transmit stage sends both normalized data messages and signal messages to downstream consumers.

In another example embodiment, a signal generation pipeline sends both normalized data messages and signal messages to downstream consumers as shown in FIG. 3. A signal generate stage is interposed between a data receive and a transmit stage and operates in parallel to a data normalize stage. There are a wide variety of use cases where data normalization is desirable. The above-referenced and incorporated U.S. Pat. Nos. 7,921,046 and 10,121,196 describe examples of how financial market data can be normalized. Other examples include normalizing credit card transaction data reported by multiple credit card processing firms. An example consumer of the normalized transaction data is an analytics application that is written once for a common message format that aggregates retail data and predicts future consumer behavior.

The embodiment of FIG. 3 further reduces the relative overhead of the signal generate stage by the amount of time required by the data normalize stage. If the signal generate stage completes its processing in the same amount of time or less than the data normalize stage, then signal messages can be delivered at the same time or sooner than the associated normalized data message. In this embodiment, the signal generate stage consumes input data in its native format from the data stream. In many cases, this means that the signal generate stage will also perform message parsing and field extraction operations on the message data.

Figure 4:
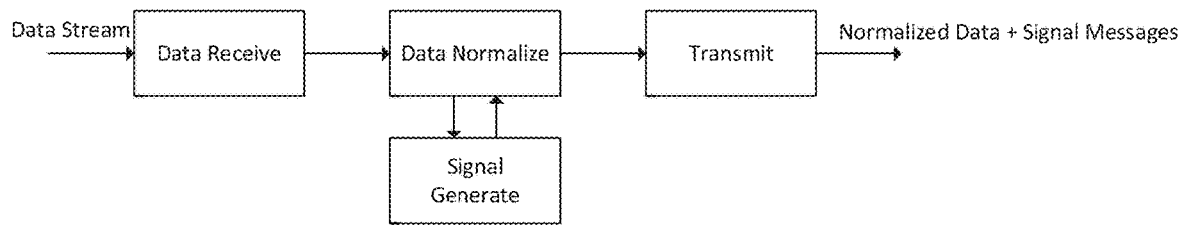
FIG. 4 shows an example signal generation pipeline where the signal generate stage is interposed between processing steps by the data normalize stage. The transmit stage sends both normalized data messages and messages containing both normalized data and signal data to downstream consumers.

In another example embodiment, the signal generate stage is interposed between processing steps by the data normalize stage, as shown in FIG. 4. This allows the signal generate stage to use the results of intermediate processing steps and cache records retrieved from memory by the data normalize stage. This allows the combination of data normalization and signal generation to be performed efficiently without redundant message parsing, field extraction, and cache record maintenance by independent pipeline stages.

Consider a financial market data example. On some financial markets, it is possible to detect via inference the presence of a reserve order by observing an order execution, followed by an order addition at the same price within the same network packet. A reserve order allows a market participant to hide the total number of shares to be bought or sold. It instructs the market to expose a small portion of the order, and when that portion is executed, immediately expose the next small portion of the order, and so on until all shares are executed or the remainder of the order is canceled. Detecting the presence of a reserve order resting at a given price in a market can be valuable information for a variety of market participants. Accordingly, an example of a trading signal that can be generated by the signal generate stage includes a liquidity indicator that indicates a presence of a reserve order for a symbol. For example, it may encourage a market participant to increase the size of an order to execute against the price with a reserve order, allowing a large trade to be completed more quickly and with more certainty as to the trade price (i.e. it reduces the risk of price "slippage".) Example embodiments regarding how a trading signal that indicates the presence of a reserve order can be used are discussed below.

The transmit stage sends both normalized data messages and messages containing both normalized data and signal data to downstream consumers. For consumers interested in normalized data only, the unwanted signal data may be removed by the transmit stage. It may also be removed by an application programming interface (API) layer at the data consumer, or simply ignored by the consumer. For consumers interested in both normalized data and signal data, delivering both data payloads in a single message can yield greater efficiency and lower data transfer latency. Typically, the transaction rate of network interface devices is significantly lower than the bandwidth (or bit rate) of network links. Because of this, it is more efficient to send a signal message of size X+Y over a computer network compared to sending two messages of sizes X and Y. There is also processing overhead for sending and receiving a message that is amortized when combining payloads into a single message, resulting in lower total latency.

Figure 5:
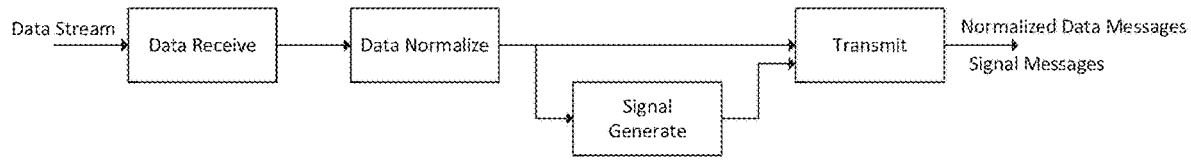
FIG. 5 shows an example signal generation pipeline where the signal generate stage is interposed between a data normalize stage and a transmit stage, where the transmit stage sends both signal messages and normalized data messages to downstream consumers. Signal generation occurs in parallel to transmitting normalized data messages to downstream consumers.

In another example embodiment, the signal generate stage is interposed between a data normalize stage and a transmit stage, allowing signals to be generated from normalized data, as shown in FIG. 5. This minimizes the computational resources required to implement some types of signals by leveraging the message parsing, data type conversions, and other processing steps performed by the data normalize stage. The transmit stage sends both signal messages and normalized data messages to downstream consumers. For data consumers exclusively interested in normalized data messages, the data normalize stage sends output messages directly to the transmit stage, in addition to the signal generate stage. This eliminates any additional data latency contribution from the processing time of the signal generate stage.

Figure 6:
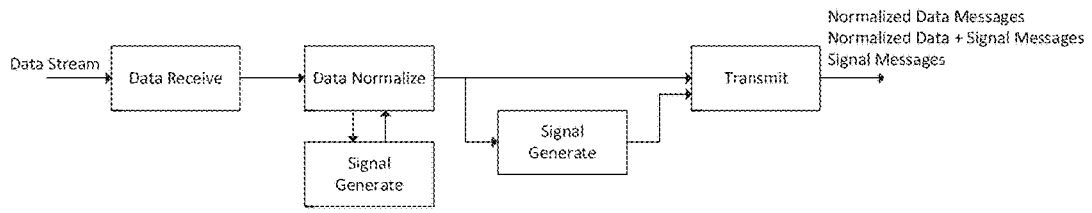
FIG. 6 shows an example signal generation pipeline with two independent signal generate stages. The first signal generate stage is optionally interposed between processing steps by the data normalize stage. The second signal generate stage is interposed between the data normalize stage and a transmit stage and it operates in parallel to transmitting messages output from the data normalize stage to downstream consumers. The transmit stage sends normalized data messages, signal messages, and messages containing both normalized data and signal data to downstream consumers.

In another example embodiment, the signal generation pipeline contains two independent signal generate stages, as shown in FIG. 6. The first signal generate stage can be interposed between processing steps by the data normalize stage. The second signal generate stage is interposed between the data normalize stage and a transmit stage. This second signal generate stage generates additional signals from the normalized data received from the data normalize stage. It may also use signal data that was generated by the first signal generate stage and appended to the normalized data message. For example, the second signal generate stage can produce an estimate of the size of a reserve order. The inputs to this estimate are a reserve order indicator trading signal produced by the first signal generate stage as previously described, as well as normalized market data fields produced by the data normalize fields. Examples of fields used by the reserve order size estimator may include the price and size of the portion of the reserve order that was executed and the price and size of the next portion of the reserve order that is now visible in the marketplace.

The signal generate stage may also compute and maintain state fields in memory that enable it to produce an estimate of reserve order size. Example state fields may include (1) the sum of reserve order portions that have been executed since the reserve order indicator was enabled for the given symbol on the given market and (2) the average size of reserve orders that have been executed on the given symbol in the given market. Logic in the signal generation stage can update and store these state fields, preferably in parallel to generating and passing a signal message to the data transmit stage. Example embodiments for estimating reserve order size are discussed below.

The transmit stage sends normalized data messages, signal messages, and messages containing both normalized data and signal data to downstream consumers. As described above, the transmit stage is able to deliver data produced by the data normalize stage and first signal generate stage. This minimizes data latency for data consumers that have not registered interest in the output of the second signal generate stage.

Figure 7:
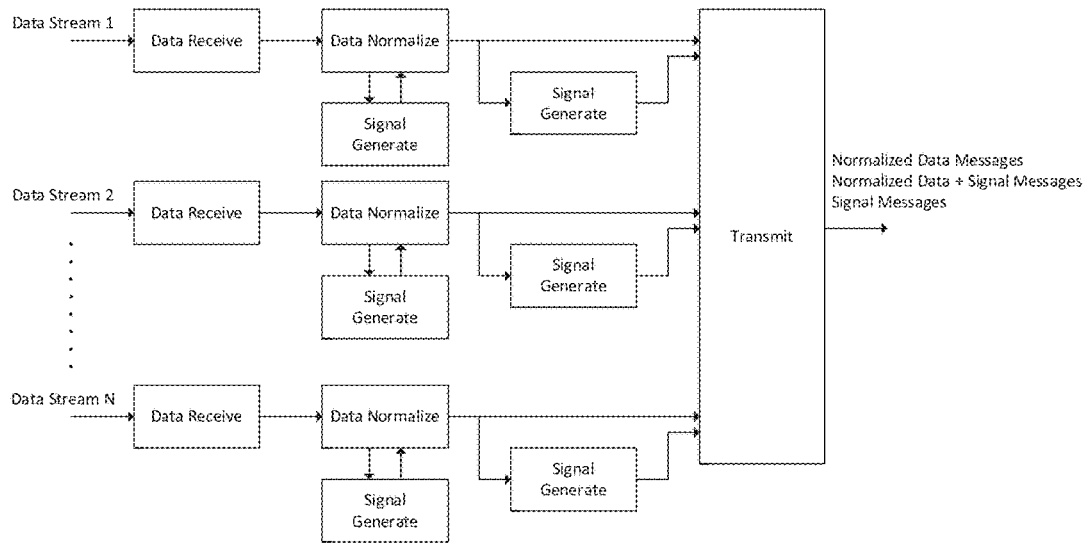
FIG. 7 shows multiple example independent signal generation pipelines operating in parallel, processing independent data streams. The transmit stage delivers messages from each pipeline to downstream consumers, where a given consumer may receive messages from one or more pipelines.

In another example embodiment, multiple independent signal generation pipelines operate in parallel, as shown in FIG. 7. This increases data throughput when processing multiple input data streams. Note that this embodiment can also be used when a single input data stream is partitioned into multiple data streams. For example, a financial market data feed may transmit updates for one thousand financial instruments on a single UDP multicast channel. This feed may be partitioned into multiple data streams based on the financial instruments to which the update messages apply. For example, the feed may be partitioned into eight data streams where each data stream has an update rate of approximately one eighth of the feed. If the multiple input data streams of FIG. 7 have the same data rate, then this embodiment achieves a throughput that is N times higher than the embodiment of FIG. 6. The above-referenced and incorporated U.S. Pat. No. 10,121,196 describes examples of how feeds can be partitioned in such a fashion.

The transmit stage delivers messages from each pipeline to downstream consumers, where a given consumer may receive messages from one or more pipelines. The above-referenced and incorporated U.S. Pat. No. 7,921,046 and 10,121,196 describe examples of how such transmission and processing may occur. As described above, the transmit stage for this example extends that work by allowing data consumers to also specify the set of signals that they are interested in consuming.

Figure 8:
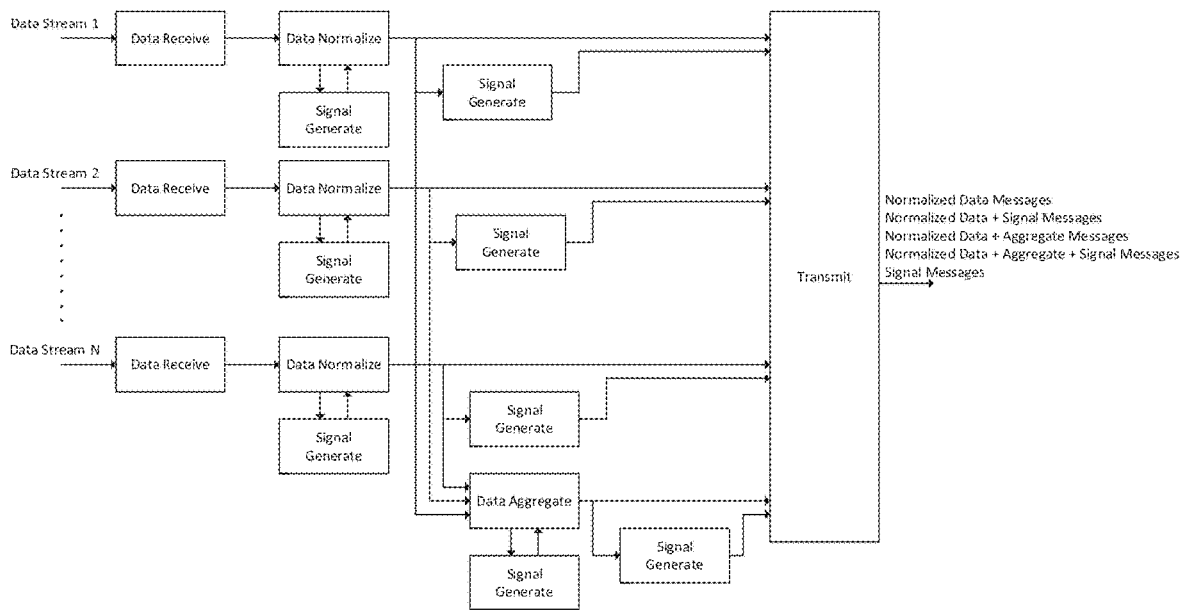
FIG. 8 shows an example data aggregate stage consuming the output of multiple independent pipelines. A signal generate stage is optionally interposed between processing steps by the data aggregate stage. Another signal generate stage is interposed between the data aggregate stage and a transmit stage and it operates in parallel to transmitting messages output from the data aggregate stage to downstream consumers.

In another example embodiment, a data aggregate stage consumes the output of multiple independent pipelines, as shown in FIG. 8. One example of data aggregation for financial market data is the computation of the National Best Bid and Offer (NBBO)—the highest price of all resting orders to buy and lowest price of all resting orders to sell a given security on any market in the National Market System (NMS). As described earlier, the NBBO are the reference prices that dictate compliance with Regulation NMS for broker-dealers of securities subject the regulation. Fast computation of changes to the NBBO prices have high value for a wide variety of market participants that trade securities subject to Reg NMS. When transacting trades, exchanges, dark pools, and Alternative Trading Systems (ATS) must either match or improve those prices or route the orders away to a market with a superior price. Similarly, arbitrage trading strategies must be able to identify superior and inferior prices across multiple markets in order to identify profitable trading opportunities. The above-referenced and incorporated U.S. Pat. Nos. 7,921,046 and 8,768,805 describe how market data messages can be aggregated and enhanced, such as by computing aggregate pricing views such as the NBBO at high speed and throughput, as well as further explanations of their value. (See also the above-referenced and incorporated U.S. Pat. No. 10,229,453). Note that the computation of aggregate pricing views and the value of fast computations and predictive signals applies to any fungible financial instrument that trades across multiple markets. Examples include currencies (i.e. the FX market), some fixed income instruments such as on-the-run treasury bonds, as well as stocks and options in the United States, Canada, Europe, and Japan.

In the example of FIG. 8, a signal generate stage is interposed between processing steps by the data aggregate stage. Like the previous examples of interposing signal generate steps between processing steps of a data normalize stage, this embodiment allows signals to be efficiently generated from results of data aggregation operations. An example includes computing to total number of identified reserve orders to both buy and sell a stock across all markets upon which it trades. Similarly, the total estimated size of reserve orders to both buy and sell a stock can be efficiently computed by this signal generate stage.

FIG. 8 shows another signal generate stage that is interposed between the data aggregate stage and a transmit stage. This allows signals to be produced from the messages output from the data aggregate stage, as well as any signal data appended to those messages. An example includes a signal that indicates the alignment or divergence of price direction predictions for an underlying stock and option contracts to buy or sell the stock at future times. In this example, the data aggregate stage computes the NBBO and its parallel signal generate stage produces price direction predictions. The output messages contain both NBBO price updates and price direction predictions. The downstream signal generate stage maintains a lookup table of records that contain the most recent price direction predictions for the NBBO of underlying stocks. A record is retrieved by mapping option contract symbols to their underlying stock symbol. When the downstream signal generate stage receives a normalized message that contains an update for the NBBO prices of an option contract and the associated price direction predictions in the signal data, it retrieves the record containing the most recent price direction predictions for the NBBO of the underlying stock. It compares the price direction predictions and, if they differ, it appends indicators for divergent predictions on the bid price direction, offer price direction, or both price directions to the signal data portion of the message.

The stages of FIGS. 1-8 can be deployed in parallelized processing logic on at least one of a reconfigurable logic device, GPU, and/or CMP as noted above.

Example Message Formats and Synchronization

Figure 9:
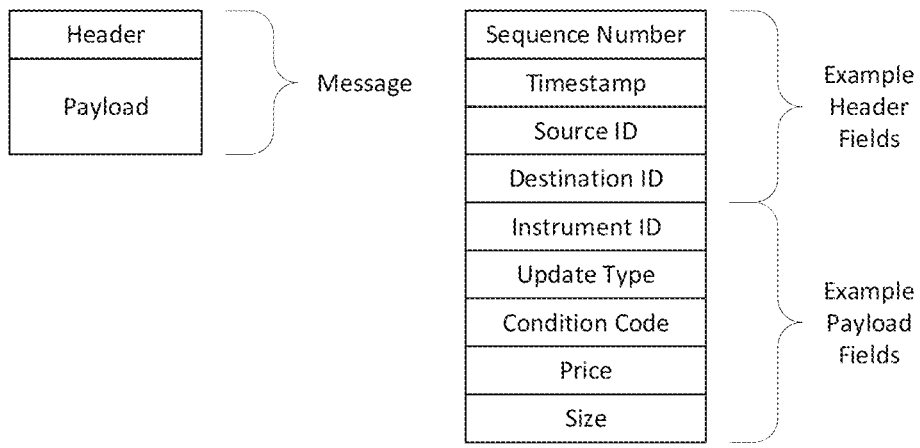
FIG. 9 shows an example of a normalized data message for financial market data.
Figure 10:
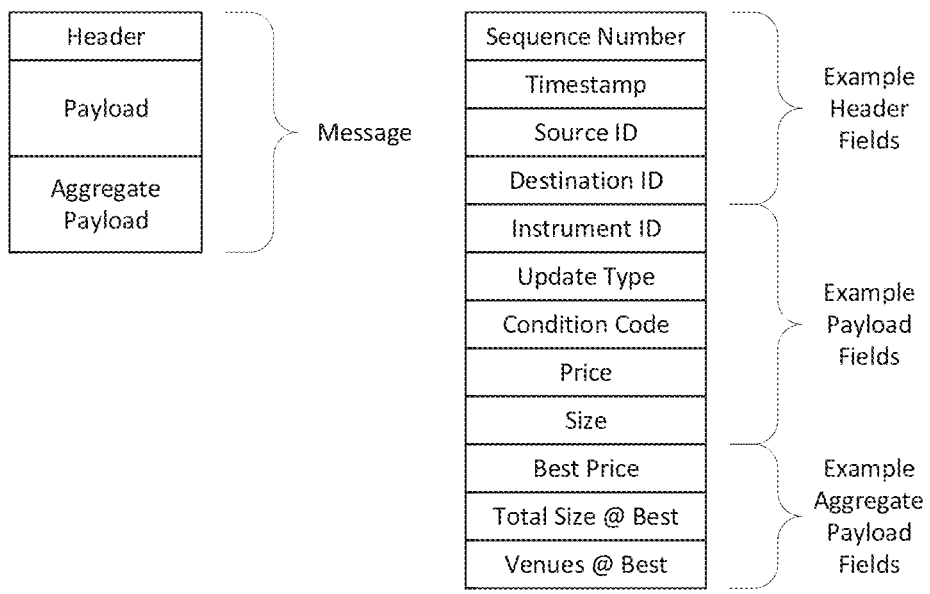
FIG. 10 shows an example of a normalized data message with appended aggregated data for financial market data.

FIG. 9 shows an example of a representative message format for normalized financial market data. A group of header fields typically contain data fields useful for message routing and delivery, such as a Source ID, and data fields useful for ensuring the timeliness and completeness of received data by consumers, such as a timestamp and sequence number. FIG. 10 shows an example of a representative normalized message for financial market data with appended aggregate data. As previously discussed, appending aggregate data to the normalized data in a financial market data message can yield greater efficiency for both the data generator and transmitter, as well as data routers and receivers. In the example of FIG. 10, aggregate data fields include a best price (such as a National Best Bid), a total size at the best price that is the sum of the sizes of orders at the best price on all markets, and a count of venues containing at least one order at the best price. The above-referenced and incorporated U.S. Pat. No. 8,768,805 describe examples of how financial market data messages can be enhanced with aggregate data (see also the above-referenced and incorporated U.S. Pat. Nos. 7,840,482 and 10,229,453).

Figure 11:
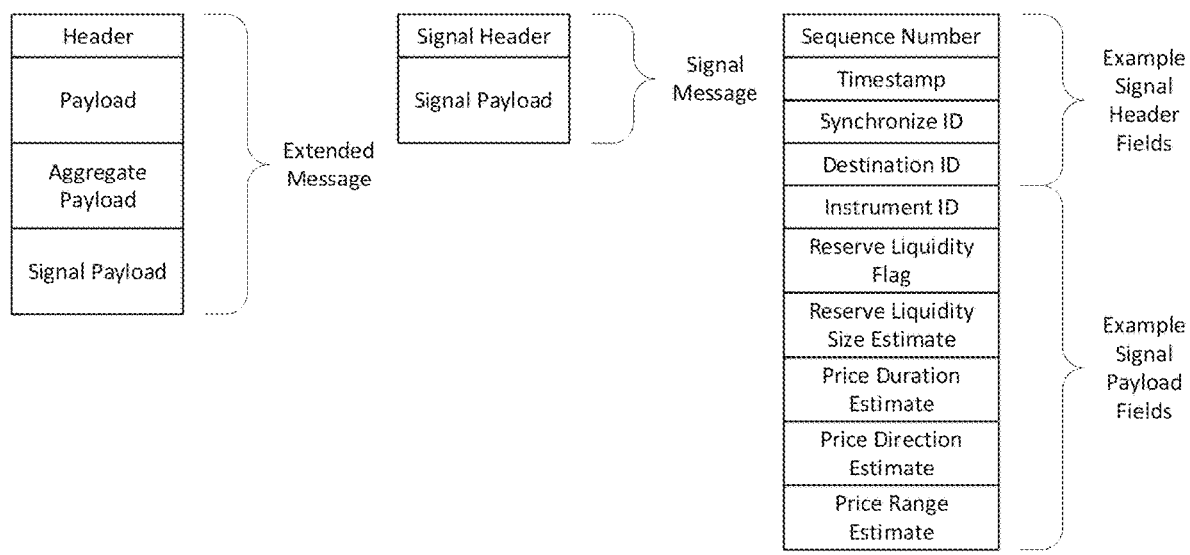
FIG. 11 shows an example of a normalized data message with appended aggregated data and appended signal data for financial market data. It also shows an example of an independent signal message for financial market data.

FIG. 11 shows an example of a representative message format for normalized financial market data, aggregate data, and signal data. As previously discussed, appending signal data to the financial market data payload can yield the same efficiency benefits mentioned above. It also greatly simplifies the presentation of normalized financial market data and associated signal data to consuming trading applications at the same time. Specifically, it removes the possibility that the market data (e.g. the current prices for the financial instrument) and a trading signal (e.g. a prediction of price movement) fall out of synchronization whereby signal data generated from an event with sequence number X is used by the trading application when using market data from the event with sequence number Y. Appending signal data to the message containing the associated normalized market data also removes any computations required by the consuming application to synchronize market data and signal data to prevent the aforementioned scenario.

Appending signal data to market data messages does mean that data consumers will be utilizing market data that flows through the signal generating device. There are a number of reasons why this may not be desirable. Market data infrastructure is typically viewed as mission-critical by trading firms. Firms may be interested in incorporating new trading signals into their trading strategies without disrupting their existing market data infrastructure. Similarly, vendors producing new trading signals want to minimize the obstacles to delivering new signals to customers. Requiring trading firms to swap out their market data infrastructure may slow down or eliminate opportunities to win new customers. Accordingly, a technical solution is desirable where trading signals can be integrated into the trading firm's existing market data infrastructure with minimal disruption and modifications of such market data infrastructure.

For such reasons, there exists a need for efficient techniques of synchronizing real-time market data messages with real-time signal messages that were generated from, or are correlated to, the market data messages. A desirable example solution to this problem does not require any changes to the devices that process and deliver market data or the format of normalized market data messages. Furthermore, a desirable example solution would not require that a full copy of the normalized market data message be transmitted along with the signal data to consuming applications. This would consume a significant amount of data transmission capacity of the signal generator, network bandwidth for the signal data distribution network, data reception capacity and processing resources of the data consumers.

Figure 12:
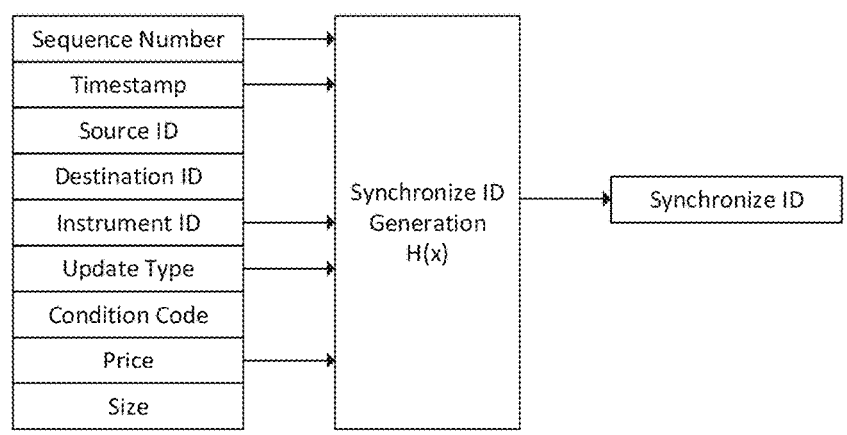
FIG. 12 shows an example of generating a synchronize identifier (ID) from fields of a normalized market data message.

In some cases, market data feed sources or market data normalizers assign a unique sequence number to each market data message for a given financial instrument. In these cases, the signal generator can simply include the market data message sequence number in the signal message as a synchronize identifier (ID) to link the market data and signal data. However, more typically, a unique sequence number per message is not available; and a synchronize ID would need to be generated by some other means. FIG. 12 shows an example embodiment for solving this synchronization problem. The signal generator produces a synchronize ID from a subset of fields in the normalized data message, where this subset of fields, in combination, uniquely identify the market data message. In the example of FIG. 12, the processing logic performs a hash function using the market data message fields as input. Hashing techniques such as those described in the above-referenced and incorporated U.S. Pat. No. 7,921,046 can be used for the hashing function, albeit where the hashing function of FIG. 12 maps input data to a synchronization ID rather than a ticker symbol or memory address.

The subset of fields that uniquely identify a market data message may vary by feed source or market data normalization source. The fields selected for inclusion in the hash function can depend on the specified source. In the example of FIG. 12, the subset of fields includes the sequence number, timestamp, instrument ID, update type, and price. This hash function is performed by the signal generator and the resulting synchronize ID is included as a field in the signal message transmitted to consuming applications. Consuming applications compute the same hash function on the same subset of fields when processing market data messages. The applications then compare the computed Synchronize ID for the market data messages with the Synchronize ID field in the signal message to find correspondences therebetween to align market data messages with signal messages. As examples, this functionality in downstream applications is shown by the Message Synchronize logic blocks in FIG. 20 and FIGS. 22A-22B.

Estimator Trading Signal Computation

Trading signals that provide estimates have high value and broad applicability to trading applications. A wide variety of artificial intelligence (AI) and machine learning (ML) techniques can be used to build estimators. Real-time financial market data imposes constraints and requirements that narrow the scope of applicable methods. The first and most challenging requirement is to minimize latency such that estimator signals can be included in the decision-making of a trading application without inducing delays that prevent it from capturing profitable opportunities. Closely related is the requirement to compute estimators at high throughput, desirably at the same throughput that market data is normalized and distributed. Also, regulations require some market participants, such as broker-dealers, to document the algorithms they use for managing customer orders and to attest that they have the ability monitor and control those algorithms. These regulations may preclude estimation methods with opaque or non-deterministic computations such as the broad class of unsupervised learning methods.

By contrast, supervised learning methods such as logistic regression can meet the regulatory standard of transparency and determinism. One can engineer example embodiments of these supervised learning methods to meet the low latency and high throughput requirements of generating estimators from real-time market data. Supervised learning methods are generally developed by:

1. Building a set of features that are likely to be correlated and predictive of the target variable
2. Identifying combinations of features that are correlative and predictive of the target variable
3. Evaluating the accuracy of features and combinations of features for predicting a target variable by using a cost function
4. Selecting the set of features and combinations of features, relative weight of each selected feature or combination, and coefficients (for combining the weighted features into a probability) such that the cost function is optimized
5. Regularizing the weights to reduce the risk of overfitting the model to the training data.

Supervised learning methods use training data and known outcomes, or data labels, to perform the task of evaluating the accuracy of features and combinations of features for predicting a target variable. The efficacy of a specific set of parameters resulting from training is evaluated by using these parameters on test data sets that differ from the training data set, also known as out of sample testing. Regularization produces a set of penalties to apply to each weight. This provides a smoothing or damping of the models' response to out of sample inputs. For example, L2 and L1 regularization can be performed to achieve a suitably parsimonious model (e.g., the fewest number of features that yields a near-optimal predictive power and avoids over-fitting the model).

Figure 29A:
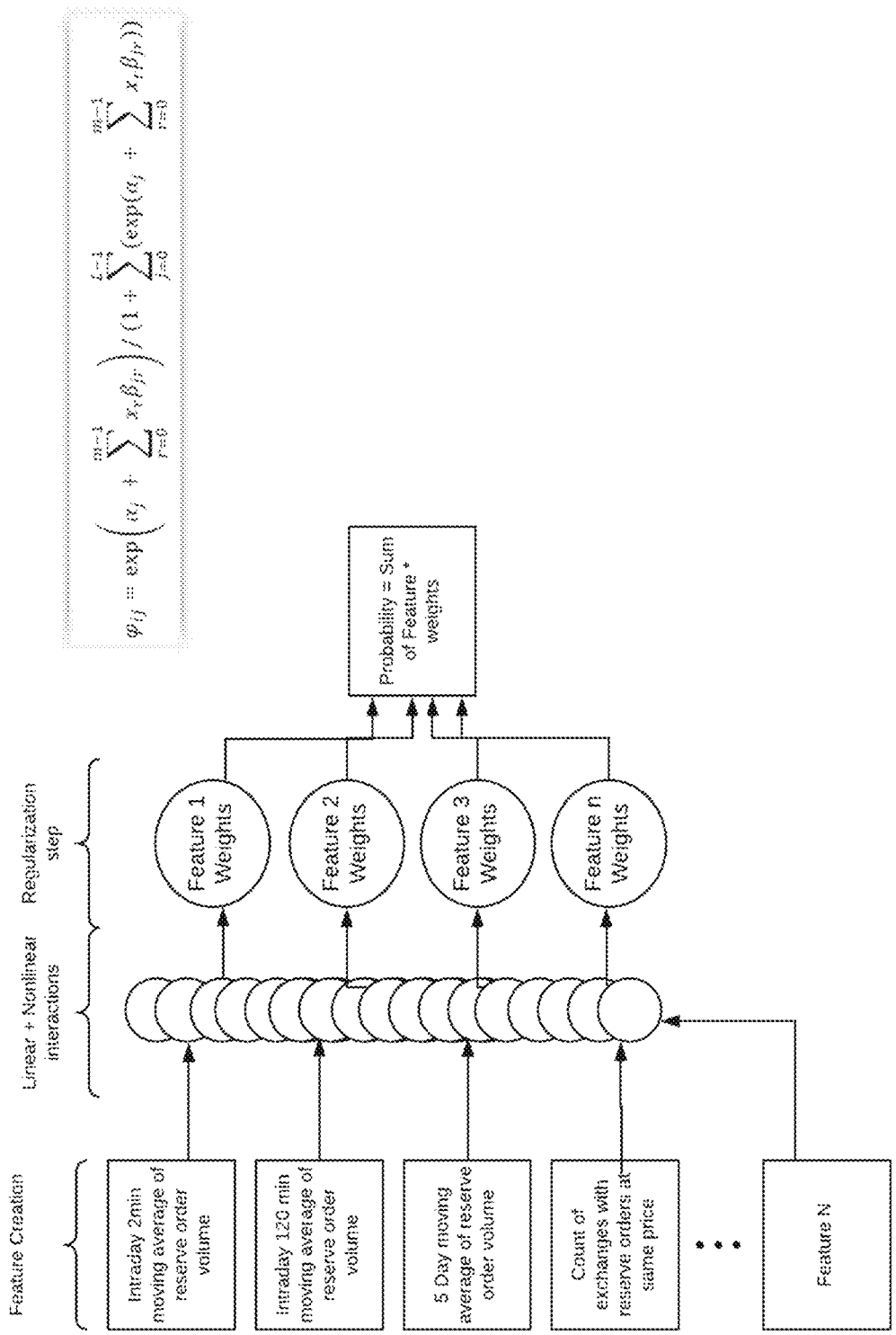
FIG. 29A shows an example embodiment of a signal generate stage which includes parallelized processing logic uses a supervised machine learning model to compute an estimate of the size of a reserve order that has been detected.

FIG. 29A shows sample processing logic for computing an estimate of the size of a detected reserve order. As discussed above, AI and ML techniques can be used for computing estimates, such as supervised learning, to develop a model that estimates the probability of a detected reserve order having a particular size. The supervised learning model can be used as part of a neural network to compute the estimator trading signals. Additional examples of the use of machine learning models to estimate quote price duration and quote price direction are discussed in greater detail below.

Figure 29B:
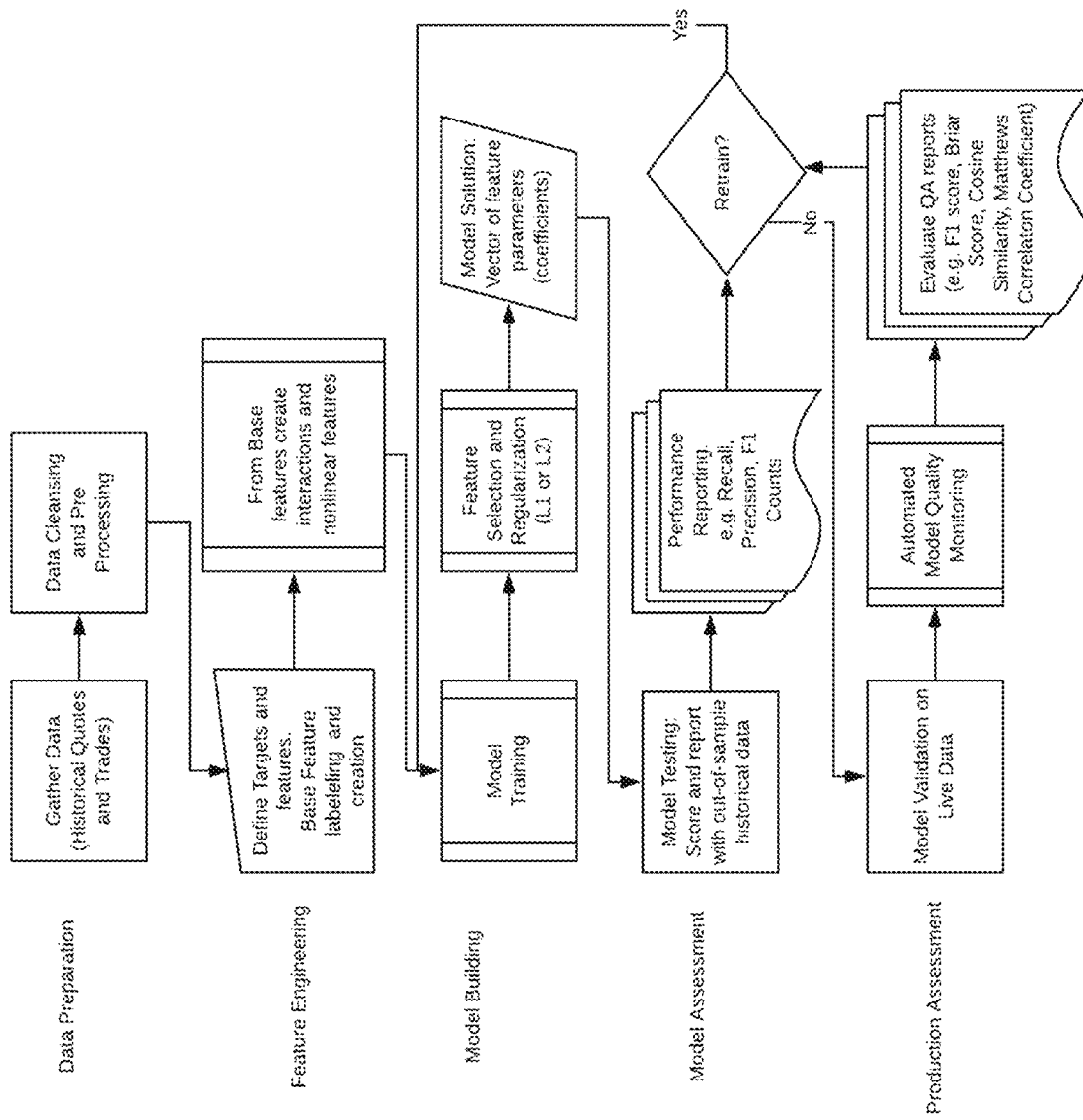
FIG. 29B shows an example embodiment of the steps used to build and maintain a supervised machine learning model.

FIG. 29B shows an example embodiment for the steps used in the creation of these supervised machine learning models. In this explanation, we use the equity (stock) markets in the United States as an example, but it should be understood that the steps can be applied to develop estimators for other regional markets and asset classes.

Step 1: Data Preparation

Historical normalized market data is collected in machine-readable format where the market data contains quote and trade event data from all markets contributing to the National Best Bid and Offer (NBBO) and the NBBO quote event data. The data files go through a cleansing and preprocessing step that ensures that all data fields are normalized, events are listed in sequential order according to a selected field (e.g. a timestamp), and so on.

Step 2: Feature Engineering

The feature engineering step is where base features are identified and created. Base features are field values or the result of a mathematical computation or combinatorial logic operation on multiple field values that are likely to be correlated and predictive of the target variable, yet uncorrelated to one another. The notional value of a detected reserve order being less than $25,000 is one example of a target variable. The development of these base features is typically based on domain knowledge, such as the microstructure of financial markets and the protocols of electronic trading. Examples of base features include:

Moving average over a 2 minutes window of volume of reserve order shares executed since the reserve order was detected Moving average over a 120 minutes window of volume of reserve order shares executed since the reserve order was detected Moving average over a 5 days window of volume of reserve order shares executed since the reserve order was detected Count of exchanges with reserve orders at the same price Step 3, Model Building The example of FIG. 29A uses an Adjacent-Category model where $\varphi_{ij}$ represents the model's estimated probability for the ith observation and jth ordinal category (ordinal levels). The probability estimates are formed from a regression model that includes intercept terms $\alpha_j$ for each of the j=1 to L−1 sub-ranges (of the notional value range); $x_{ir}$ is the feature value for the ith observation and the rth feature, along with weights $\beta_r$ for each r=0 to m−1 predictive features. In this example, note that the intercept and weights for the j=0 component are always 0. To compute the weights used by the model, a logistic regression technique can be used that samples training data from diverse periods of market dynamics.

Step 4, Model Assessment

The resulting model solution is applied to out-of-sample historical market data, where the out-of-sample data are forward in time versus training data. For example, the training data can be sampled from a selected time period (e.g., August-November 2018) whereas the testing data comes from any date after this time period. The scored output of test data is benchmarked against key performance indicators such as precision, recall, F1, Brier scores, Matthews Correlation Coefficient, etc. A model that passes out-of-sample testing undergoes back testing. Back testing applies the model to many years of historical market data to ascertain its efficacy over multiple market cycles. The back testing dates can encompass both training and testing dates.

Step 5, Production Assessment

The model solution is deployed into production usage as an estimator in a signal generator using an embodiment as described herein. An automated model quality monitoring system produces daily performance reports to validate the efficacy of the estimators against production data, also called forward testing. Live models are monitored for decay or for material change in any key performance indicators (KPI). Each KPI allows for either objective or subjective determination of performance decay or material change. In the example of FIG. 29B, the decision to retrain is a human decision, but this may be automated. As the model is re-trained with additional, newly available labeled data, the performance accuracy of the model can improve over time.

Figure 13:
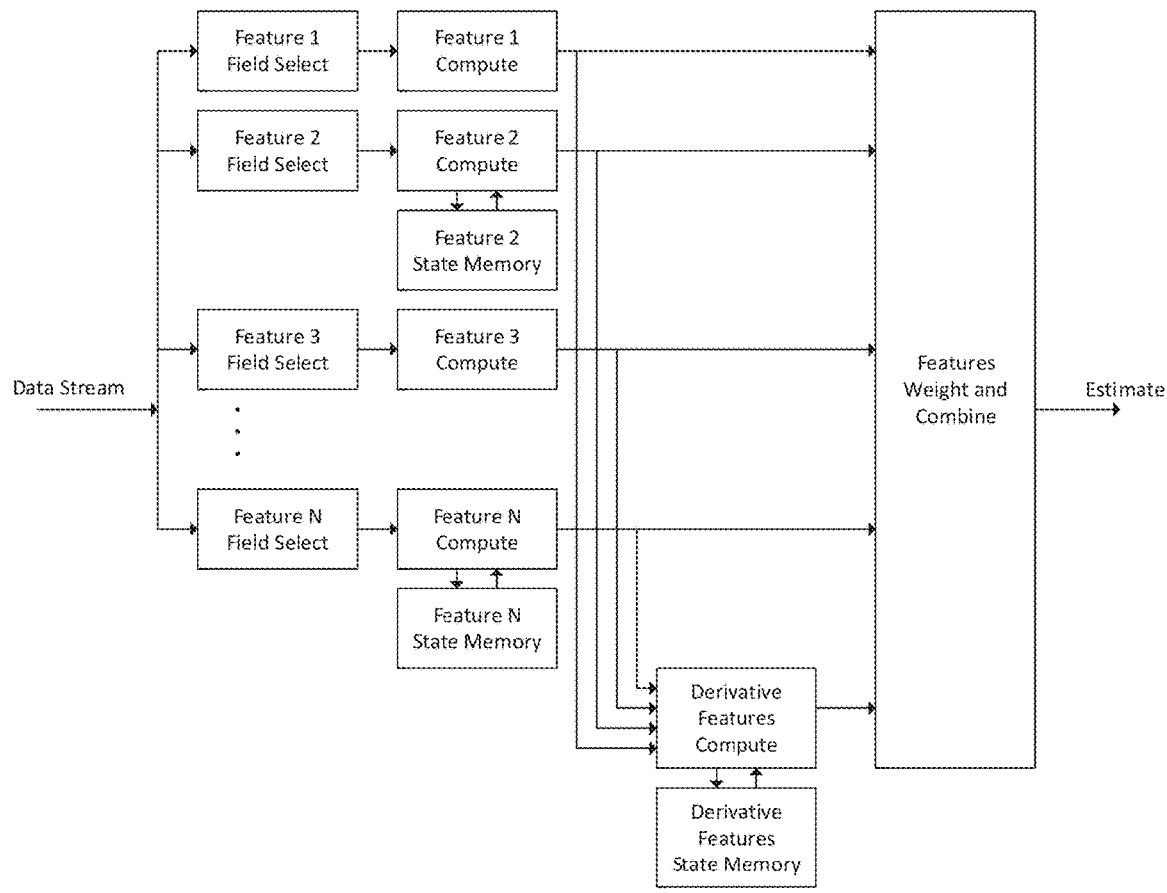
FIG. 13 shows an example estimator pipeline generating an estimate from messages in an input data stream. Features are computed in parallel by multiple instances of pipelines that include a field select stage and a feature compute stage.

An embodiment of a real-time estimate generate stage that uses supervised learning methods and can meet the latency and throughput requirements of real-time market data is shown in FIG. 13. In this example, an estimator trading signal is generated by computing a set of N features, then combining the features, assigning a weight to each combination, and accumulating the weighted results. The estimation result can be delivered directly, such as a probability value (e.g., a probability value that the next price move will be in a positive direction). The estimation result may also be delivered in a summarized fashion as a Boolean signal (e.g., by comparing the probability value to a threshold value in order to compute a Boolean signal, such as a TRUE/FALSE signal that the size of a reserve order is greater than 10,000 USD in notional value).

As shown in FIG. 13, market data messages are delivered to one or more field select stages. These stages select the fields from the input market data messages that are used as inputs for the associated feature computations. U.S. Pat. No. 8,374,986, the entire disclosure of which is incorporated herein by reference, describes examples of field selection modules that can serve as the field selection stages. The selected fields are passed to one or more feature compute stages, some of which may maintain state variables such as a moving average of field values for a specified time window.

Examples of feature computations that can be performed by different ones of the feature compute stages include:
   Time since the previous bid price shift
   Time since the previous offer price shift
   Time since the maximum bid size was posted for the current bid price
   Time since the maximum offer size was posted for the current offer price
   Moving average of bid price durations for the past ten bid price changes
   Moving average of offer price durations for the past ten offer price changes As an example, these features can be used to support the computation of a trading signal that is an estimate of a duration of a current best bid price for symbol across one or more markets, examples of which are discussed in greater detail below. However, it should be understood that the list of features above is merely an example, and other features may be computed if desired by a practitioner.

The outputs of feature compute stages can be delivered to both a derivative features compute stage and a feature weight and combine stage. The derivative features compute stage produces one or more combinations of the results of one or more upstream feature computations, as specified by the training parameters. Similarly, the features weight and combine stage assign weights to each of the feature results and derivative features results and accumulated the weighted results to produce an estimate.

In an example embodiment, each computational stage reflected in FIG. 13 is performed in a parallel path such that both functional and data-level parallelism is exploited. For example, each stage may be implemented as an integrated circuit, interconnected to its upstream and downstream stages, and deployed on a reconfigurable logic device such as an FPGA. Alternatively (or additionally), each stage may be implemented in a compute core of a GPU that contains thousands of interconnected compute cores. Other example embodiments may include software implementations on GPPs whereby stages are computed in sequence with the intermediate results from stages being stored in memory.

It should be understood that practitioners may choose to include more, fewer, or different parallel paths as part of a signal generate stage than those shown by FIG. 13. Similarly, more, fewer (including none), or different derivative feature compute stages may be included as part of the signal generate stage than those shown by FIG. 13.

Figure 14:
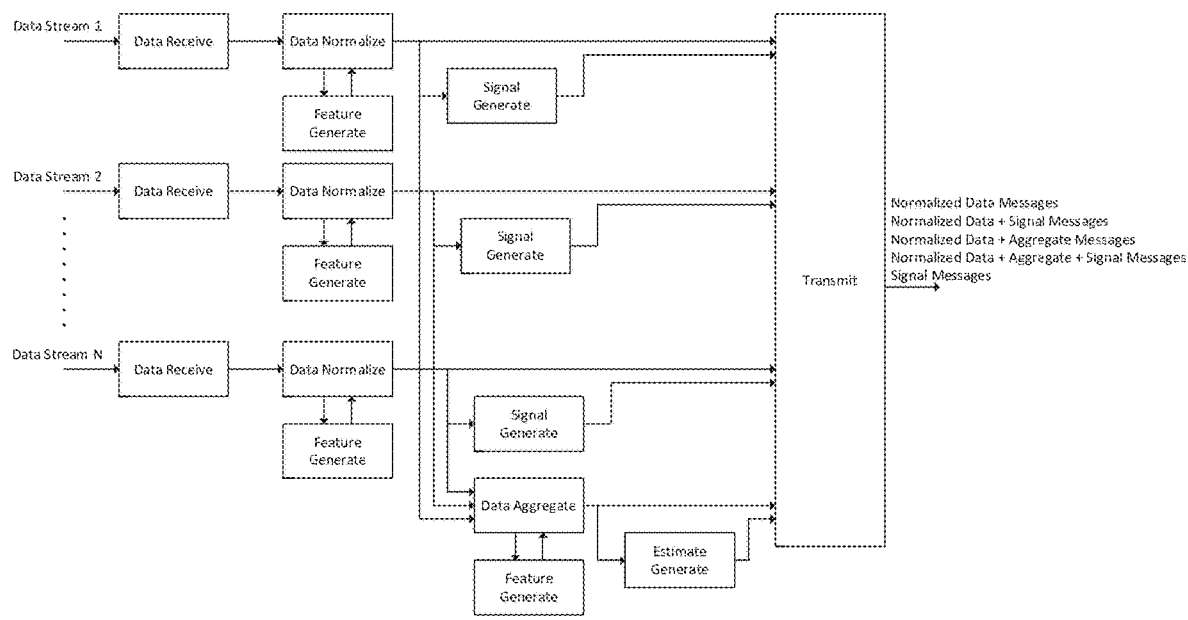
FIG. 14 shows an example financial market data, signal, and estimator pipeline that produces and distributes normalized data, signals, and estimates. It is comprised of multiple independent pipelines for data normalization, feature generation, and signal generation, as well as a data aggregate stage and at least one estimate generate stage.

When integrating the computation of estimators with the normalization of market data, significant efficiencies can be gained when distributing the computation of features as shown in FIG. 14. As previously described with regard to signal generate stages, feature generate stages may be optionally interposed in message processing by data normalize and data aggregate stages. This allows feature generate stages to leverage the message parsing and intermediate processing results of the data normalize and data aggregate stages, eliminating redundant processing by the feature generate stages. Similar to signal data, feature data may be appended to messages flowing through the pipeline to be delivered to the derivative features compute and features weight and combine stages within the estimate generate stage. In the example of FIG. 14, the estimate generate stage is interposed between the data aggregate and data transmit stages. This arrangement enables estimates to be generated from normalized aggregate data such as estimating next price direction for NBBO prices.

Example Implementations in Ticker Plants and Trading Application Servers

Figure 15:
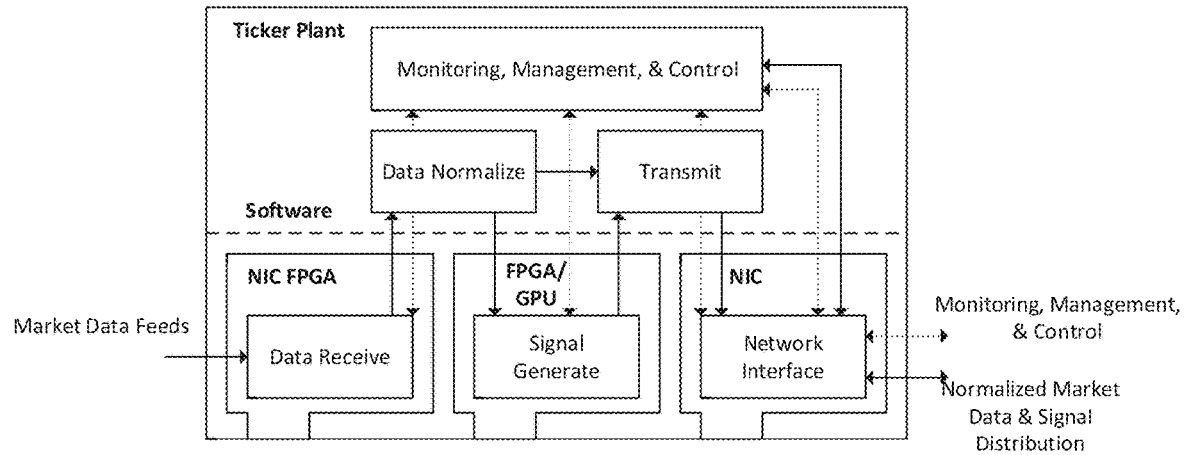
FIG. 15 shows an example embodiment of a financial market data and signal pipeline that uses a combination of Network Interface Cards (NICs), FPGAs, software on commodity CPUs, and GPUs.

FIG. 15 shows an example embodiment of a ticker plant that includes both financial market data and signal pipelines. The embodiment uses a high-performance server platform with a combination of Network Interface Cards (NICs), FPGAs, software on commodity CPUs, and GPUs. Each of these components are widely available from multiple vendors and may be assembled in a variety of form factors. In this embodiment, a NIC containing an FPGA is connected to a computer network that provides access to one or more market data feeds. The data receive processing is performed by firmware deployed on the FPGA device hosted on the NIC card. Market data messages are passed to one or more data normalize stages that are implemented in software and executed on one or more general purpose processing cores. The output messages from the data normalize stages are passed to both a transmit stage and a signal generate stage. The transmit stage is implemented in software and executed on one or more general purpose processing cores. One or more signal generate stages can be implemented in an FPGA. Alternatively (or additionally), one or more signal generate stages can be implemented in a GPU. The output messages from the signal generate stages are passed to the transmit stage. The output messages from the transmit stage are delivered by a NIC to data consumers through a normalized market data and signal distribution network. The same NIC may provide network connectivity for monitoring, management, and control of the ticker plant.

The advantages of the FIG. 15 embodiment are its flexibility and scalability. The speed and capacity of market data normalization can be increased or decreased by allocating more or fewer general-purpose processing cores to the data normalize stages, respectively. By implementing the signal generate stages in a separate FPGA or GPU card, the speed and capacity of signal generate stages can be tuned without impacting data normalization performance. Furthermore, consumers of normalized market data only can experience no relative performance impact from signal generation. The above-referenced and incorporated U.S. Pat. No. 7,921,046 describes examples of how data can be streamed from one compute resource to another at low latency and high throughput (see also U.S. Pat. No. 7,954,114, the entire disclosure of which is incorporated herein by reference).

For consumers of normalized market data and signal data, the latency of signal data is primarily determined by the computational time in the FPGA or GPU, as well as message transfer time across the system interconnect from host to device (FPGA/GPU) and device to host. The one-way transfer time can be optimized to be a few hundred nanoseconds in current server platforms, but for some trading applications, this becomes a considerable portion of their overall data latency budget.

Figure 16:
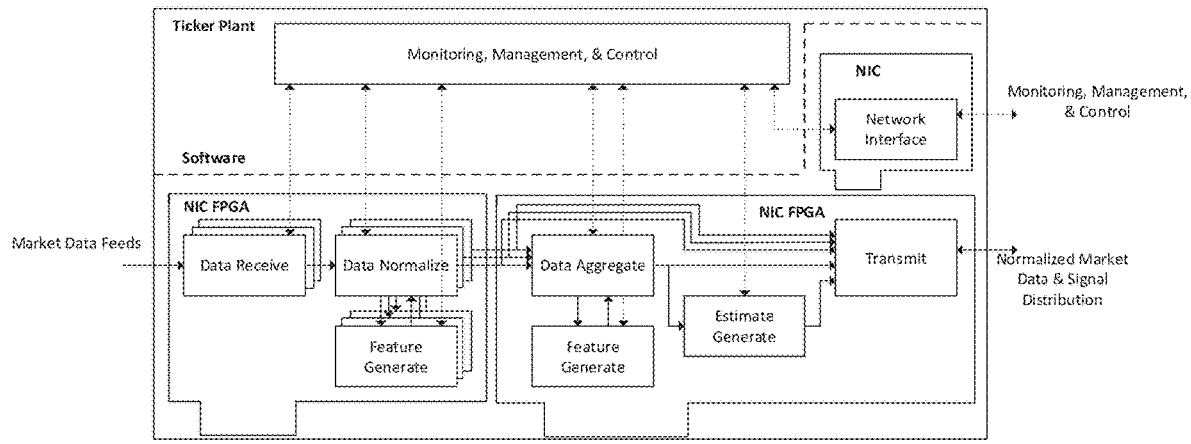
FIG. 16 shows an example embodiment of a financial market data, signal, and estimator pipeline that uses a combination of NICs and FPGAs. In this embodiment, most market data messages are processed in firmware logic only.

FIG. 16 shows an example embodiment that eliminates these data transfer latencies for signal generation. In this embodiment, the data normalize stages are incorporated in the FPGA hosted on the input NIC. Furthermore, feature generate stages can be interposed by the data normalize stages. Note that these may also be signal generate stages as previously described. Output messages are passed directly to a second FPGA hosted on the output NIC. The messages are delivered to both the transmit stage and a data aggregate stage. The data aggregate stage may interpose a feature generate stage. Note that this may also be a signal generate stage as previously described. The output messages of the data aggregate stage are passed to the transmit stage as well as an estimate generate stage. The transmit stage has the ability to deliver messages to consuming applications that contain normalized market data, aggregate data, signal data, or any combination thereof. In this embodiment, a separate NIC is used to provide monitoring, management, and control access. Note that this traffic may also be handled by the output NIC that contains an FPGA device.

The advantages of this embodiment are the reduction in data latency by performing all data normalize, data aggregate, and signal generate operations in firmware hosted on FPGAs. This typically comes with higher development costs to produce more sophisticated firmware designs, as well as higher implementation costs as more or larger FPGA devices may be needed to provide sufficient logic gate capacity for the more sophisticated firmware designs.

Figure 17:
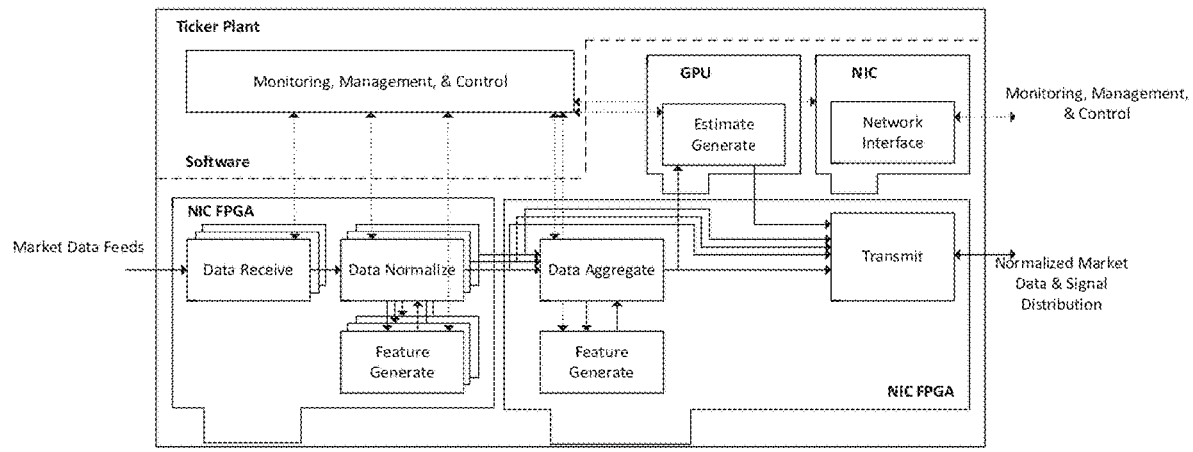
FIG. 17 shows an example embodiment of a financial market data, signal, and estimator pipeline that uses a combination of NICs, FPGAs, and GPUs. In this embodiment, most market data messages are processed in firmware logic or GPU logic only.

FIG. 17 shows an example alternative embodiment that implements the estimate generate stage in a GPU. This allows for more flexibility in the estimate implementation and reduces the required logic gate capacity of the FPGA in the output NIC. The latency of normalized data messages is identical to that of the embodiment in FIG. 16. The relative latency of the signal data may be higher due to the data transfer latencies to and from the separate GPU. This may be deemed acceptable due to the aforementioned cost reduction and flexibility gains.

Figure 19:
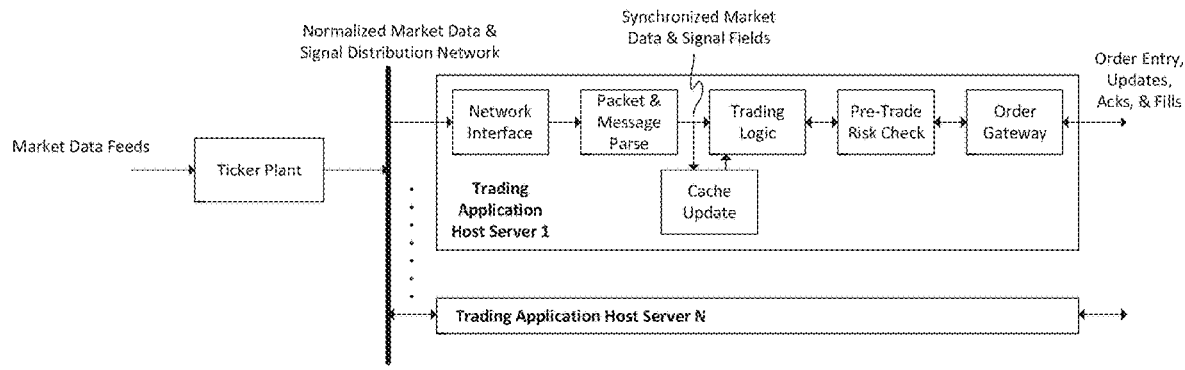
FIG. 19 shows an example embodiment of a trading application pipeline that consumes messages that were generated by a ticker plant and contain both normalized market data and signal data. The application parses the message format used by the ticker plant to extract desired message fields.

When a ticker plant delivers both normalized market data and signal data in the same messages, the synchronous presentation of market data and signal data is greatly simplified. FIG. 19 shows an example embodiment of a trading application pipeline that consumes messages that were generated by a ticker plant and contain both normalized market data and signal data. The application receives messages via a network interface and parses the message format used by the ticker plant to extract desired message fields. Some applications maintain a local cache containing records of the current state of financial instruments for which it subscribes to updates from the ticker plant. In this case, the message fields are used to update the retrieved record from the cache.

The trading logic of the application can receive messages in a variety of ways. In one embodiment, a callback function is executed. The trading application specifies the actions to be performed upon receipt of a message within the callback function. This includes retrieval of one or more fields from the normalized market data in the message, signal data in the message, or market data or signal data in the cache record. In another embodiment, the application actively checks the occupancy of a receive buffer and processes the message at the head of the receive buffer when the occupancy is not empty. The above-referenced and incorporated U.S. Pat. No. 10,037,568 describes how trading logic can be distributed across multiple types of compute resources.

Orders generated by the trading logic are passed to the pre-trade risk check stage. The pre-trade risk stage ensures that the actions resulting from the orders do not violate a variety of policies defined by regulations, account margins, open positions, etc. The above-referenced and incorporated U.S. Pat. No. 8,374,986 describes an example architecture for a rules engine that can implement pre-trade risk check logic. The order gateway stage transmits orders to the appropriate receiver at the trading venue and it passes messages from the trading venue back to the trading application.

Figure 21:
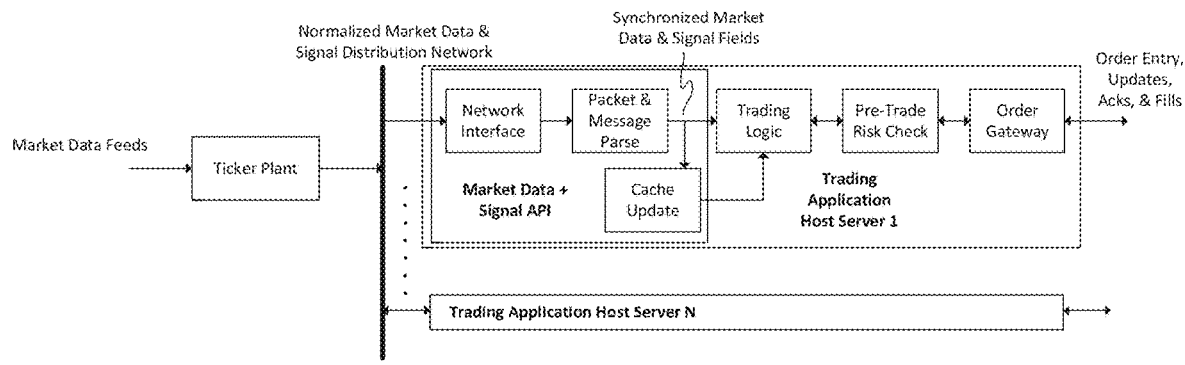
FIG. 21 shows an example embodiment of a trading application pipeline that consumes messages that were generated by a ticker plant and contain both normalized market data and signal data. An Application Programming Interface (API) parses the message format used by the ticker plant to extract desired message fields and delivers them to the application.

FIG. 21 shows an example embodiment where the trading application server includes an Application Programming Interface (API) that abstracts the trading application from the message parsing and cache updating operations. This simplifies the task of developing new trading applications. It also enables new market data and fields, as well as new signals and fields to be added to messages without impacting existing trading applications that do not use the new content.

Figure 20:
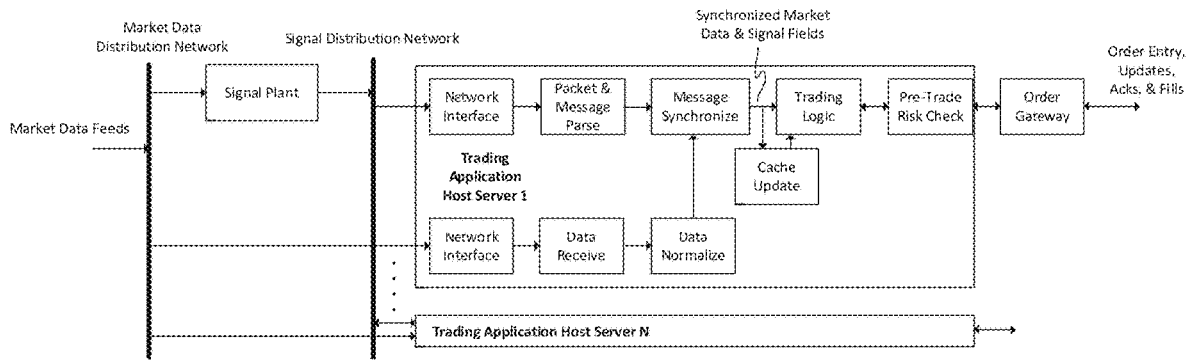
FIG. 20 shows an example embodiment of a trading application pipeline that consumes messages that were generated by a signal plant and contain signal data. The application also consumes market data feeds, normalizes market data messages, and synchronizes normalized market data messages to signal messages.

When trading applications consume market data from a separate source, signal generation is performed by a signal plant that delivers signal messages, as shown in FIG. 20. In this embodiment, market data feeds are delivered to both the signal plant as well as the trading application host machine. The trading application performs the data receive and data normalize steps locally to minimize market data latency. It synchronizes market data messages to signal messages by computing a synchronize ID from a subset of market data fields as described above in connection with FIG. 12 (see Message Synchronize logic in FIG. 20). Depending on its trading strategy and the relative latency of signal messages to normalized market data messages, the trading application may choose to act on some market data messages without determining its synchronized signal message (and vice versa).

Figure 22A:
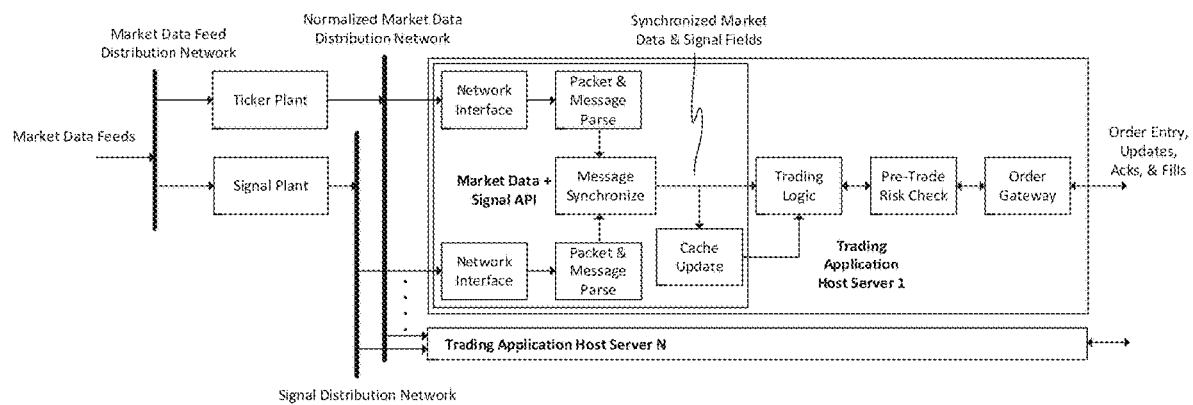
FIG. 22A shows an example embodiment of a trading application pipeline that consumes messages that were generated by a ticker plant and contain normalized market data, as well as messages that were generated by a signal plant that contain signal data. An Application Programming Interface (API) parses the message format used by the ticker plant, parses the message format used by the signal plant, synchronizes normalized market data messages to signal messages, extracts desired message fields, and delivers them to the application.

FIG. 22A shows an example embodiment where separate ticker plant and signal plant devices are used. As previously discussed, this embodiment is useful when a trading firm desires to add a signal plant to an existing trading infrastructure with a ticker plant. The Application Programming Interface (API) abstracts the trading application from the data receive message parsing, message synchronize, and cache updating operations. This provides trading applications with the same benefits of more rapid development and testing, as well as insulation from changes to market data and signal data content that are not applicable to the trading strategy.

Figure 22B:
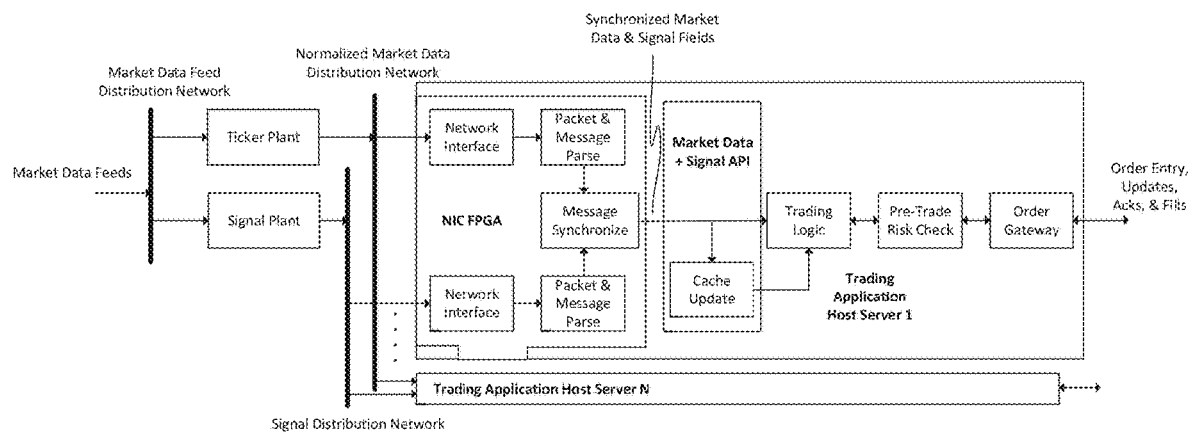
FIG. 22B shows an example embodiment of a trading application pipeline that consumes messages that were generated by a ticker plant and contain normalized market data, as well as messages that were generated by a signal plant that contain signal data, using a NIC FPGA. Firmware deployed on the NIC FPGA parses the message format used by the ticker plant, parses the message format used by the signal plant, synchronizes normalized market data messages to signal messages, and delivers the synchronized messages to an Application Programming Interface (API). The API updates local cache records, extracts desired message fields, and delivers them to the application.

FIG. 22B shows an example embodiment that reduces the latency and increases the capacity of the data receive message parsing and message synchronize operations. Firmware deployed on a NIC FPGA parses the message format used by the ticker plant, parses the message format used by the signal plant, synchronizes normalized market data messages to signal messages, and delivers the synchronized messages to the Application Programming Interface (API). If broadcast or multicast protocols are used by the Ticker Plant or Signal Plant to distribute normalized market data messages or signal data messages, then the firmware deployed on the NIC FPGA may also perform a filtering function whereby only the desired messages are delivered to the API. The API updates local cache records, extracts desired message fields, and delivers them to the application. By implementing these functions in firmware on a NIC FPGA, the trading application receives synchronized market data and signal data faster. Furthermore, it reduces the consumption of computational resources required on the trading application host server.

Market participants that require the fastest speeds seek to eliminate any and all contributors to data latency from their electronic trading infrastructure. The data latency through a ticker plant and across a normalized market data distribution network have become too large for some market participants, such as electronic market makers. To eliminate these contributors to data latency, market data feeds are delivered directly to the machine that hosts the trading application. The market data processing is implemented on the same host machine, as well as the order handling to transmit orders to buy and sell back to the trading venue. For the purpose of this discussion, we refer to this as an integrated trading platform.

Figure 18:
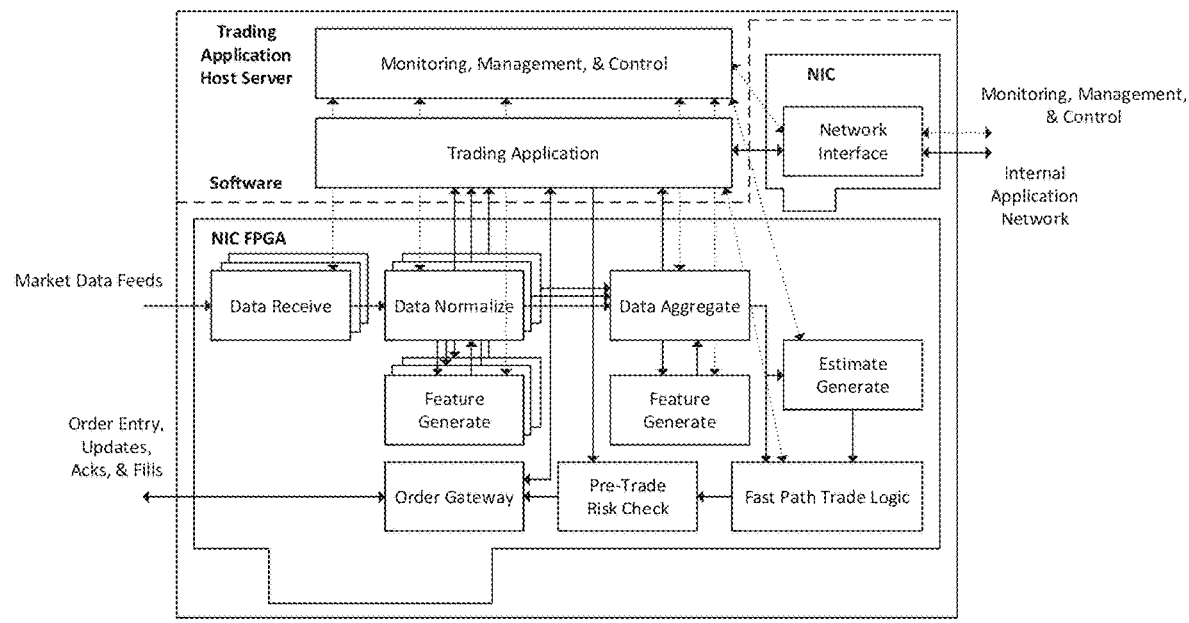
FIG. 18 shows an example embodiment of an automated trading pipeline that uses a combination of NICs, FPGAs, and software on commodity CPUs. In this embodiment, some fast path trading decisions are processed in firmware logic only.

FIG. 18 shows an example embodiment of an integrated trading platform that includes trading signal and estimator generators. Similar to the ticker plant embodiment in FIG. 16, the data receive, data normalize, feature generate, data aggregate, and estimate generate stages are implemented in firmware and deployed on an FPGA hosted by the NIC. Additional processing stages complete the data path of the integrated trading platform—a fast path trade logic stage, a pre-trade risk check stage, and an order gateway stage. Note that such a platform may be focused on a single market or subset of instruments such that the capacity requirements for the platform are far less than a ticker plant. This allows the market data processing and signal generation stages to be implemented for lower throughput and thus consume fewer logic gates. This in turn enables the additional stages for trading logic and order handling to be hosted in the same FPGA.

The fast path trade logic stage implements a subset of latency-critical operations to add, modify, and cancel orders as specified by the trading application. The remainder of trading decisions are performed by trading application logic implemented in software and hosted on one or more cores in the GPP of the host machine (see, for example, the above-referenced and incorporated U.S. Pat. No. 10,037,568). With FIG. 18, for the fast path logic stage, the trading application specifies a set of logical conditions and the resulting order action. For example, the trading application may specify that pending sell orders be modified to increase the price by one tick increment when a message contains a signal that estimates an increase in best offer price in the marketplace. Orders generated by the fast path trade logic are passed to the pre-trade risk check stage and a notification is passed to the trading application. As noted above, the pre-trade risk stage ensures that the actions resulting from the orders do not violate a variety of policies defined by regulations, account margins, open positions, etc.; and the order gateway stage transmits orders to the appropriate receiver at the trading venue and it passes messages from the trading venue back to the trading application.

Reserve Order Detection (Liquidity Lamp)

As discussed above, an example of a trading signal that can be generated by an example embodiment is a liquidity indicator that indicates a presence of a reserve order for a financial instrument. Such a liquidity indicator can be referred to as a "liquidity lamp".

In order to attract liquidity, particularly large blocks of liquidity, to their markets, many exchanges offer an order type known as a reserve order. Such reserve orders are also known as icebergs. Reserve orders allow traders to minimize the market impact (on price) of a large order by hiding the total size of the order, without taking on the complexity of slicing their own order into smaller orders and choosing when and where to send the smaller orders for execution. Reserve orders specify the size (number of shares) to expose while the order is resting on the order book. When the exposed size is filled, the next chunk of the reserve order is exposed; and this process repeats itself until the full size of the reserve order has been filled (or the remainder of the order has been canceled). The size of each chunk may be fixed or variably sized to further disguise the presence of the reserve order (e.g., by randomizing the sizes of each exposed chunk).

Detecting the presence of a reserve order resting at a given price in a market can be valuable information for a variety of market participants as this indicates the presence of hidden liquidity in the market for the subject financial instrument. For example, detection of a reserve order may encourage a market participant to increase the size of an order to execute against the price with the reserve order, allowing a large trade to be completed more quickly and with more certainty as to the trade price (i.e. it reduces the risk of price "slippage"). However, the ability to detect the existence of reserve orders is a technical challenge given the speed and volume of order activity on exchanges and the intentional hiding of reserve orders by exchanges. This technical challenge is further amplified when one also factors in that it is desirable to detect the existence of such reserve orders at sufficiently low latency that allows a trader to take advantage of knowledge about the reserve orders.

As part of a solution to this problem, the signal generate stage can deploy parallelized processing logic on compute resources such as reconfigurable logic devices (e.g., FPGAs), GPUs, multi-core GPPs, and/or CMPs, where such parallelized processing logic is configured to detect conditions with financial market data messages that indicative of the presence of a reserve order. For example, on some financial markets, it is possible to detect via inference the presence of a reserve order by observing an order execution, followed by an order addition at the same price within the same network packet.

Figure 23A:
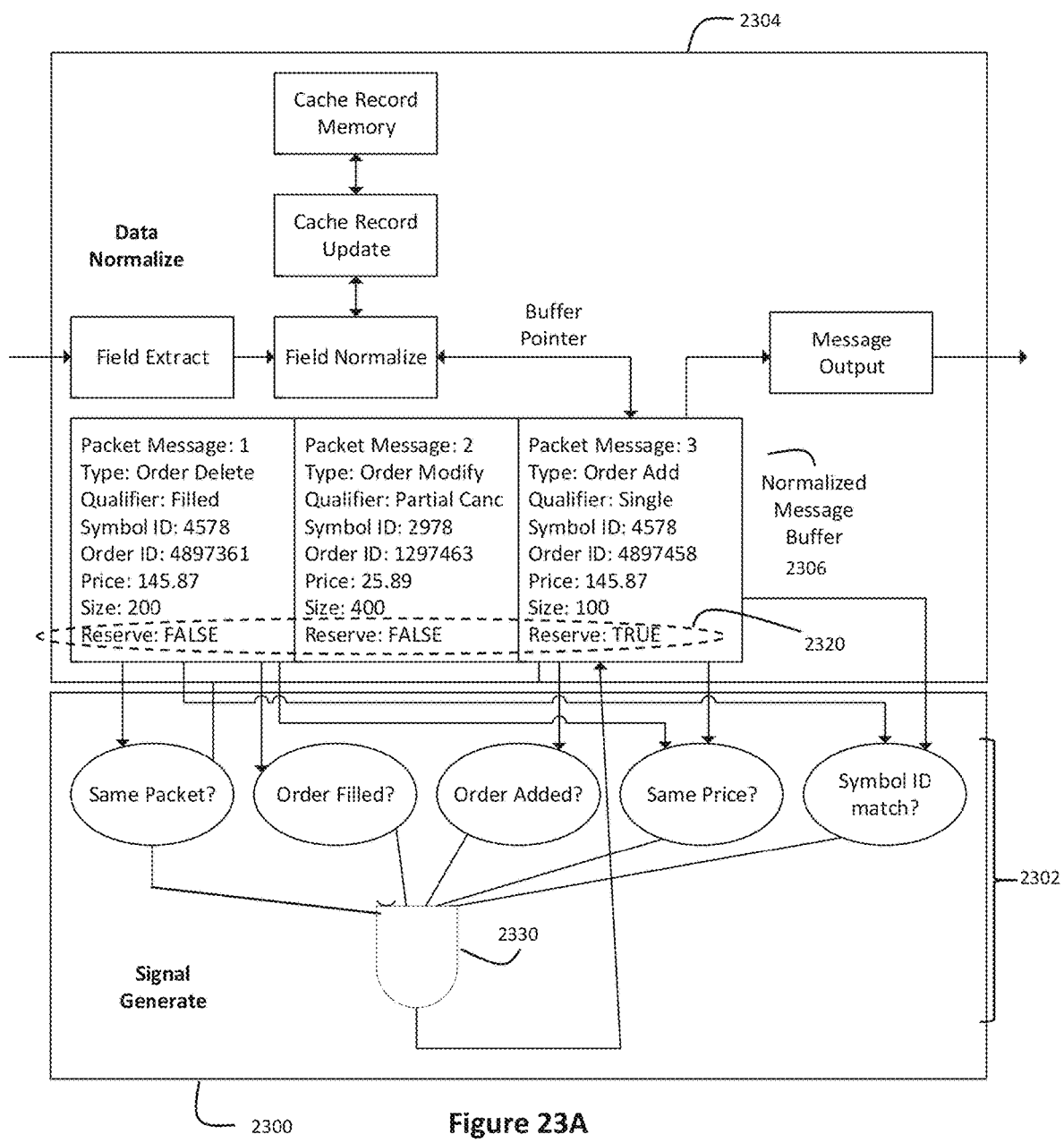
FIGS. 23A-C show example embodiments of a signal generate stage which includes parallelized processing logic that tests a number of conditions against the message data to determine whether a conclusion should be drawn that a reserve order is present.

FIG. 23A shows an example of parallelized processing logic 2302 that can be implemented in a signal generate stage 2300 in order to detect reserve orders. In this example, the signal generate stage 2300 cooperates with a data normalize stage 2304, where the data normalize stage updates cache records and generates normalized output messages. The data normalize stage can parse incoming packets that are received from a market data feed into individual messages, parse these messages into fields, and convert the field values into standard data types (e.g., see the above-referenced and incorporated U.S. Pat. No. 7,921,046). These normalized field values for each message can then be copied into standard locations in the normalized message buffer 2306 (e.g., see Packet Messages 1-3 in FIG. 23A.

The parallelized processing logic 2302 can then test a number of conditions against features derived from the streaming financial market data (e.g., field values buffer message data from buffer 2306) to determine whether a conclusion should be drawn that a reserve order is present. This logic 2302 can include (1) logic that tests whether two of the messages are from the same single network packet, (2) logic that tests whether these two messages represent (i) an order deletion due to an execution (trade fill) of a symbol at price P followed by (ii) an order addition for the same symbol at the same price P. The outputs of these logic tests also serve as features derived from the streaming financial market data. When these conditions are detected, the signal generate stage 2300 can generate a trading signal which indicates that a reserve order is resting at price P on the market for the subject symbol. The outputs of the individual tests for these conditions can be combined via AND logic 2330 so that the existence of a reserve order can be detected when all of the conditions are satisfied. The state of this trading signal can then be appended to the normalized market data message output from the data normalize stage (see field 2320 for the messages in buffer 2306).

Figure 23B:
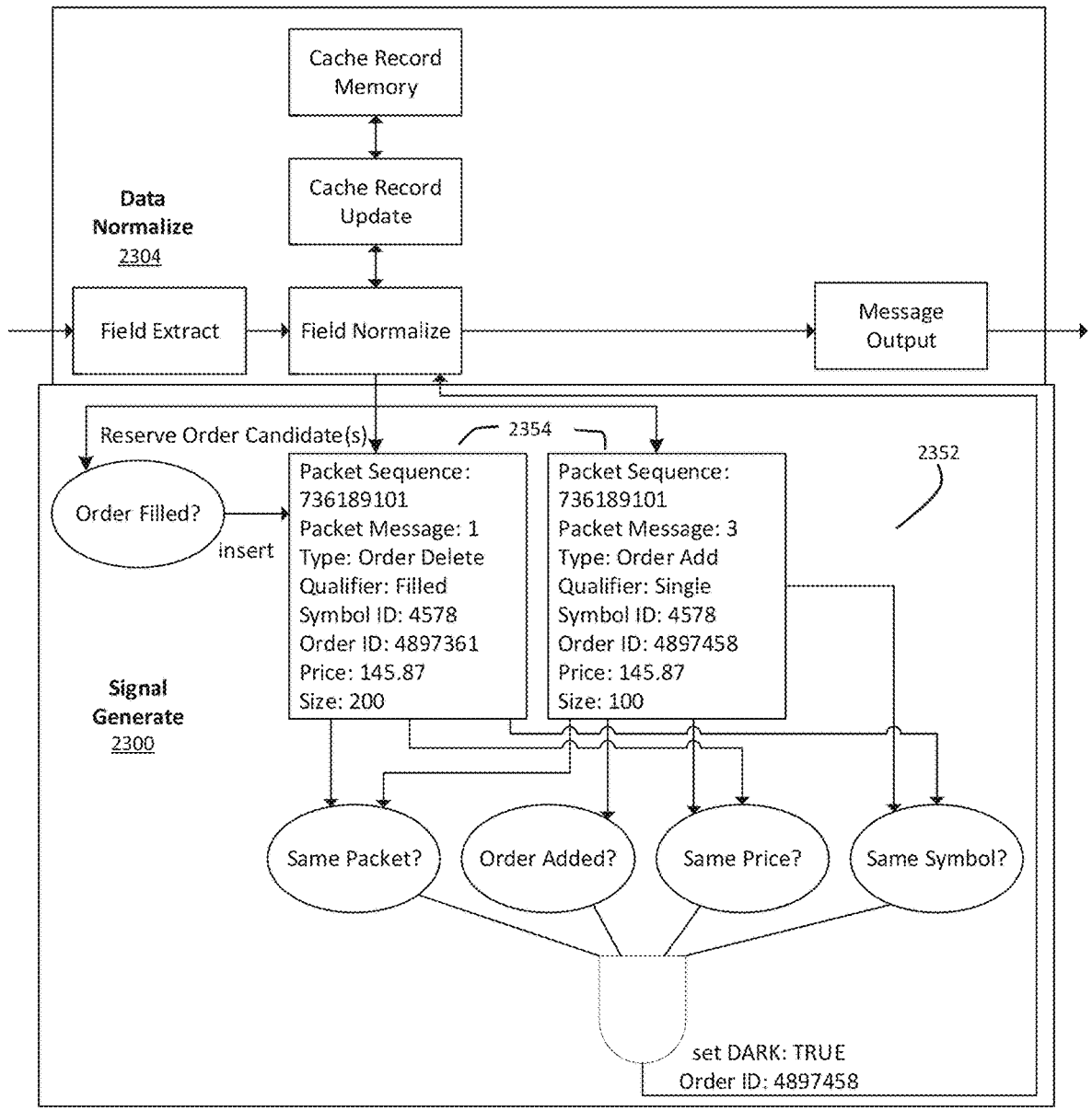

FIG. 23B shows another example of parallelized processing logic 2352 that can be implemented in a signal generate stage 2300 in order to detect reserve orders. In this example, the signal generate stage 2300 cooperates with a data normalize stage 2304 in a manner that does not necessitate "store and forward" processing (which induces extra latency). With the example of FIG. 23B, the detection and flagging of reserve orders can be perform in a "cut through" manner whereby signal generate stage 2300 remembers field values for reserve order candidates that have already been processed and forwarded on. As noted above, the data normalize stage 2304 can parse incoming packets that are received from a market data feed into individual messages, parse these messages into fields, and convert the field values into standard data types. These normalized field values for each message can then be used to update a cache record retrieved from the Cache Record Memory as described in the above-referenced and incorporated U.S. Pat. No. 7,921,046. The normalized field values can also be passed to the signal generate stage that contains parallelized processing logic 2352 to detect reserve orders.

The parallelized processing logic 2352 first determines if the current message represents a new candidate to detect reserve orders by checking whether the normalized field value for the message type comprises an order fill condition. If so, it saves selected field values into a Reserve Order Candidates register or buffer 2354. The register/buffer 2354 serves to record temporary state data that tracks message data representing order activity that qualifies as a reserve order candidate. In parallel, the logic 2352 can then test a number of conditions against the message data from the current contents of the Reserve Order Candidates register/buffer 2354 to determine whether a conclusion should be drawn that a reserve order is present. This logic 2352 can include (1) logic that tests whether two of the messages are from the same single network packet, and (2) logic that tests whether these two messages represent (i) an order deletion due to an execution (trade fill) of a symbol at price P followed by (ii) an order addition for the same symbol at the same price P. When these conditions are detected, the signal generate stage 2300 can generate a trading signal which indicates that a reserve order is resting at price P on the market for the subject symbol. The outputs of the individual tests for these conditions can be combined via AND logic 2356 so that the existence of a reserve order can be detected when all of the conditions are satisfied. The state of this trading signal can then be provided to the data normalize stage 2304 and appended to the normalized market data message output from the data normalize stage. The state of this trading signal can also be saved in the cache record associated with the Order ID. Note that additional summarized cache records, such as a record of the aggregate volume at the price P, may store the state of the trading signal.

For ease of illustration, FIG. 23B shows parallelized processing logic 2352 for only message 1 in packet 736189101 (as a previously received Reserve Order Candidate) and message 3 in packet 736189101 as the current message. However, it should be understood that this parallelized processing logic 2352 can be replicated for other pairs of messages comprised of additional Reserve Order Candidates and the current message. This allows each message to be simultaneously tested for the detection of a possible reserve order against multiple reserve order candidates that were previously received.

Figure 23C:
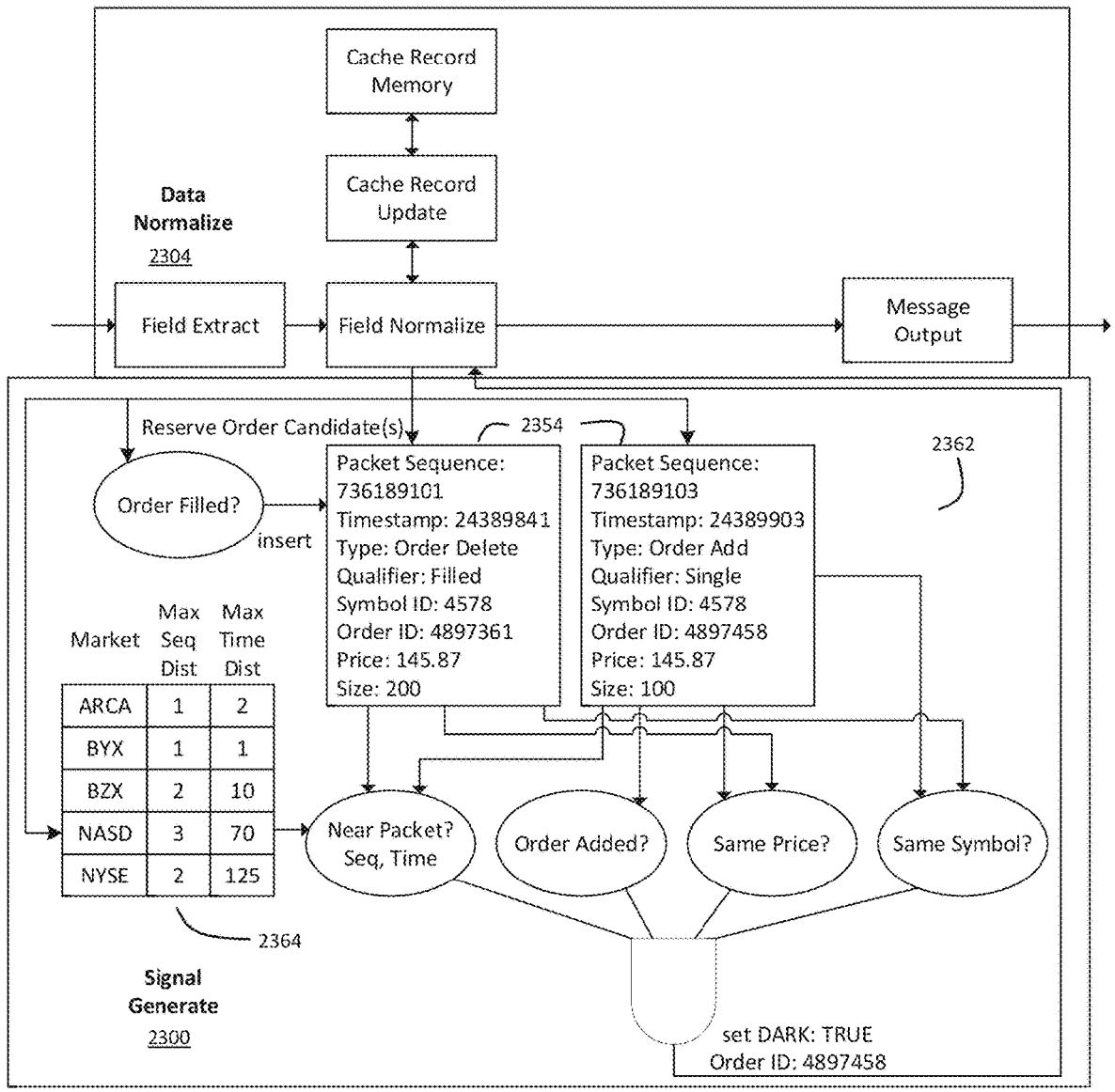

FIG. 23C shows another example embodiment of a signal generate stage 2300 which includes parallelized processing logic 2362 that tests a number of conditions against the message data to determine whether a conclusion should be drawn that a reserve order is present. The example of FIG. 23C extends the logic 2362 to detect the presence of a reserve order in a manner that accounts for conditions that may cause the order add message that represents the next portion of a reserve order being exposed to be contained in a separate packet from the preceding order execution message that represents an exposed portion of a reserve order being executed. This condition may arise for a plurality of reasons, including congestion within the exchange infrastructure that generates the market data feed as well as deliberate actions by an exchange to obscure the presence of reserve orders.

In the example of FIG. 23C, the parallelized processing logic 2362 is extended to perform a lookup of parameter values based on the market associated with the current message. Parameters can be set that govern which packets are deemed sufficiently close to each other in sequence and/or time to be candidates for a possible continuation of activity for a reserve order. For example, a difference in packet sequence number and/or packet timestamp can be used to judge whether a given packet qualifies as a "near" packet that might contain messages that represent additional activity for a reserve order. These parameters can be exchange-specific as indicated by parameter table 2364 of FIG. 23C. In this example, table 2364 defines a first parameter that bounds a maximum difference in packet sequence numbers for packets containing the messages to be assessed for potential reserve order status. Table 2364 also defines a second parameter that bounds a maximum difference in timestamps associated with packets containing the messages containing the messages to be assessed for potential reserve order status. Thus, the logic 2362 can use the parameter values from table 2364 for the applicable exchange to judge whether a given message is part of a packet that is sufficiently "near" a packet that contained a previous reserve order candidate message.

In the example of FIG. 23C, a reserve order candidate (i.e. an order execution message) and the current order add message are shown, where both are from the same NASD market. The parameters in table 2364 for the NASD market specify the bounds for the "Near Packet" logical test. In this example, the difference between packet sequence numbers for the two messages is 2 (the difference between 736189101 and 736189103), which is less than the maximum sequence distance value in the lookup table 2364 for the NASD exchange (which is a maximum value of 3). Also, the difference in timestamps for the two messages is 62 (which is the difference between 24389841 and 24389903), which is less than the maximum time distance value in the lookup table 2364 for the NASD exchange (which is a maximum value of 70). Therefore, the Near Packet logic test is satisfied for the message under consideration. The remaining logic tests for reserve order detection shown by logic 2362 operate as discussed above in connection with FIG. 23B.

For ease of illustration, FIGS. 23A-C show parallelized processing logic 2302/2352/2362 for only assessing reserve order status as between only two messages. However, it should be understood that the parallelized processing logic 2302/2352/2362 can be replicated for other pairs of messages in the streaming data (such as the pair (Packet Message 1, Packet Message 2) and the pair (Packet Message 2, Packet Message 3), and so on with reference to FIG. 23A). This allows each message from the normalized stream to be simultaneously tested for the detection of a possible reserve order.

Also, while FIGS. 23A-C show the computed liquidity indicator being fed back to the data normalize stage to augment the outgoing normalized messages, it should be understood that this need not be the case. For example, the signal generate stage 2300 can generate its own liquidity indicator trading signal as output as shown by embodiments such as FIGS. 1-3 and 5.

The liquidity indicator trading signal is able to identify reserve orders when they rest at the top of book. Once identified, the individual order can be tagged as a reserve order in the system or appliance cache and tracked over its lifecycle. This implies that reserve orders may be tracked at multiple levels of the order book as the market price moves away from the reserve order price before the reserve order is completely executed. This reserve order indication may also be provided in other summary views of the order book, such as the price aggregated book and top-of-book Best Bid and Offer (BBO) quote.

It is believed that the value for the liquidity indicator trading signal will be particularly strong for liquidity-seeking trading strategies of the liquidity indicator trading signal is not only effective at detecting reserve orders but also that the execution of reserve orders represents a significant percentage of the trading activity in major US stocks.

Figure 24:
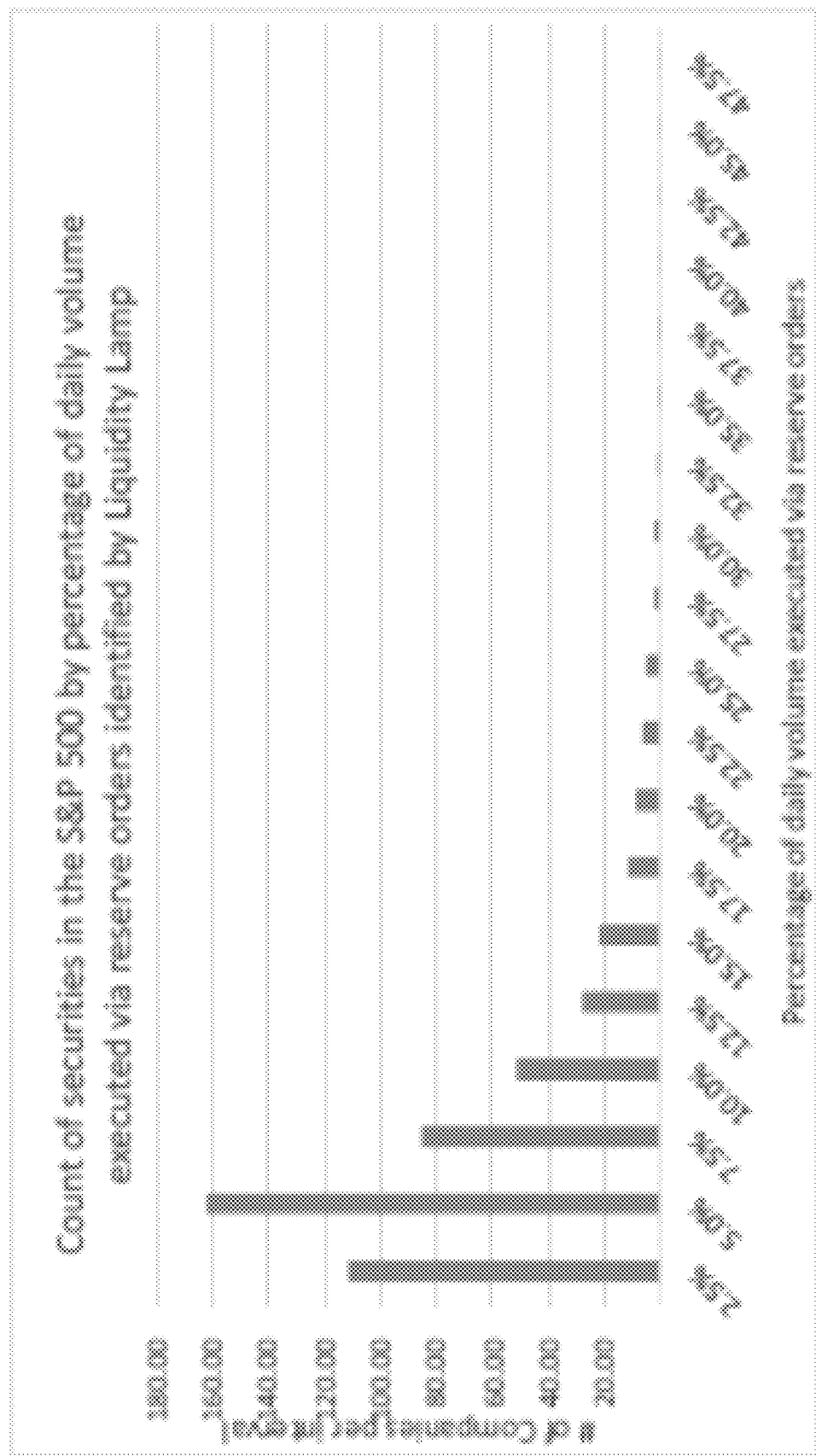
FIG. 24 shows a distribution of companies in the S&P 500 index by percentage of daily volume executed via reserve orders detected by the liquidity indicator trading signal.

In order to determine this, we back-tested multiple days of normalized trading data to compute liquidity indicators for that trading data. This analysis was focused on the securities comprising the S&P 500 index. For each security in the S&P 500 index, we asked "what percentage of the daily volume was executed as part of a reserve order that was detected by the liquidity indicator trading signal. The results are reflected in FIG. 24. On average, there were 90 companies with 10% or more of their daily volume being executed as reserve orders detected by the liquidity indicator trading signal. For example, the histogram of FIG. 24 shows that 52 companies had reserve orders account for 7.5% to 10.0% of the daily volume for the subject time period. Further supporting the validity of the liquidity indicator trading signal, we observed 209 unique companies from the S&P 500 that had at least one day in which 10% or more of their volume was executed as reserve orders detected by the liquidity indicator trading signal.

Thus, FIG. 24 indicates that reserve orders can represent a significant proportion of the executed order types for a given security. Next we ask if identifying a reserve order that rests at the top of the order book begets a concentration of execution activity. In order to quantify this phenomenon, we define a new metric—concentration ratio—to be the percentage of daily volume executed via reserve orders detected by the liquidity indicator trading signal compared to the percentage of trading session time that the liquidity indicator trading signal is "lit" (e.g., a detected reserve order rests at the top of the book). For example, if 10% of the daily volume is executed via reserve orders and the liquidity indicator trading signal is "lit" for 1% of the trading session time, then the concentration ratio is 10:1.

In aggregate across the S&P 500 securities during the studied period, the liquidity indicator trading signal detected reserve orders resting at the top of the book for 1.78% of the trading session time while accounting for 11.39% of the daily volume or a 6:1 ratio. Furthermore, we noted that the concentration ratio can be as high as 23:1 in the case of the Bats EDGA exchange. See the first table of FIG. 27 for a ranking of exchanges by concentration ratio. This supports our assertion that reserve orders form the epicenter of concentrations of trading activity, and thus the liquidity indicator trading signal is an effective signal that a burst in executions will occur.

Figure 25:
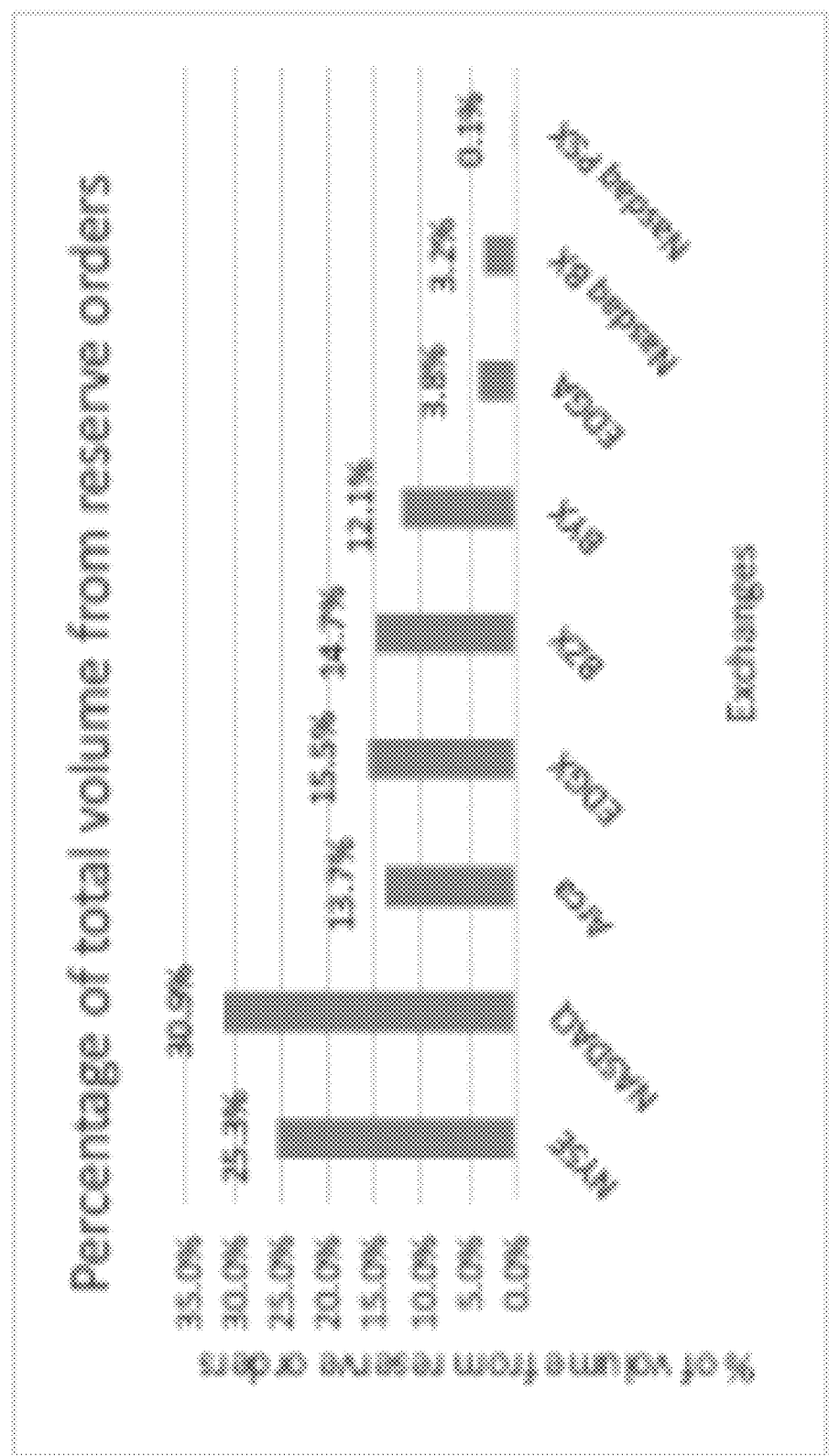
FIG. 25 shows how various exchanges differ in terms of percentage of total volume by reserve orders via the liquidity indicator trading signal.

As we examined the concentration ratio data, we noted that the bursts of execution activity did not evenly distribute volume across the exchanges comprising the National Market System (NMS). Specifically, five of the exchanges accounted for more than 90% of all reserve order executions detected by the liquidity indicator trading signal. As shown in FIG. 25 below, over 56% of all reserve order executions happened on the two largest listing markets—the NYSE and Nasdaq. Specifically, almost one-third of the total volume on the Nasdaq market were reserve order types detected by the liquidity indicator trading signal.

The significant imbalance in the distribution of reserve order executions underscores the value of the liquidity indicator trading signal being generated and delivered on a per-symbol, per-market basis. Liquidity-seeking applications, such as Smart Order Routers (SORs), can leverage the per-symbol, per-market precision of the liquidity indicator trading signal to aggressively interact with hidden liquidity pools on specific markets while retaining standard slicing and routing logic for other markets.

Figure 26:
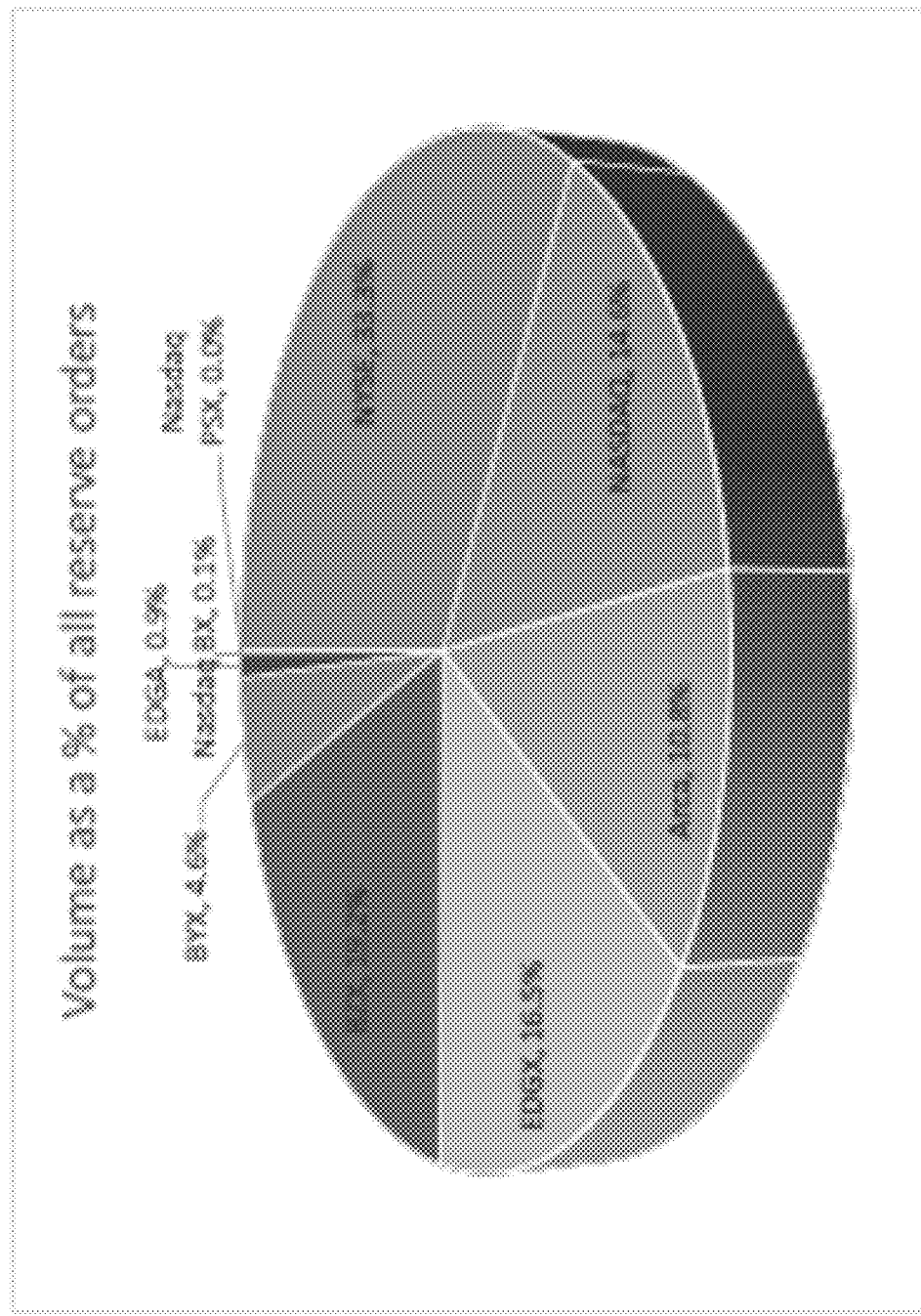
FIG. 26 shows a chart of market share of all detected reserve order executions across NMS exchanges for a sample data set.

Similarly, we examined the reserve order "market share" of the NMS exchanges, e.g., the distribution of all reserve order executions across the exchanges. As shown in FIG. 26, the NYSE had the largest share of the total reserve order volume for the subject period (at approximately one-third). The Bats Z and EDGX exchanges accounted for the next third of the market share during the subject period. When designing trading logic to interact with reserve orders, the knowledge that can be derived from the liquidity indicator trading signal helps to understand where reserve orders are routed (and where they are not).

FIG. 27 shows a set of tables that rank exchanges on various criteria relating to detected reserve orders over the course of the time period applicable to FIGS. 25-27. It can be seen that the exchange rankings for 3 of the 4 tables have the same top 5 constituents—alphabetically: ARCA, BZX, EDGX, NASDAQ, and NYSE. These top 5 exchanges: (1) account for 94% of all detected reserve order executions on an absolute basis, (2) have the largest concentration of detected reserve orders (e.g., 18.02% of Bats Z volume are detected reserve orders, and (3) occupy the largest share of time spent at top of book by detected reserve orders during a trading session. This leads to a conclusion that trading algorithms that are seeking to interact with reserve orders may want to target these 5 exchanges.

Accordingly, it should be understood that the concentration ratio quantifies the clustering of trades around the detection of a reserve order. The larger the concentration ratio, the stronger the correlation of execution activity occurring when the liquidity indicator trading signal indicates that a reserve order is resting at the top of the book. With reference to FIG. 27, the concentration ratio suggests that when the liquidity indicator trading signal is "lit" at the EDGA exchange, the probability of getting a larger proportion of reserve orders is higher than at NASDAQ. Though the absolute volume may be higher on NASDAQ, EDGA may provide better fill rates when the liquidity indicator trading signal is "lit".

Furthermore, as users consider designing trading logic to leverage the liquidity indicator trading signals, it is natural to ask, "how long do we have to respond?" In this regard, embodiments disclosed herein are capable of generating the liquidity indicator trading signals and delivering them synchronously with normalized market data with virtually no latency impact. If the liquidity indicator trading signals exhibit a short duration that would require trading logic to respond in microseconds, the value of liquidity indicator trading signals might be limited to a small subset of high-frequency and/or high-speed trading use cases. However, we were surprised to find that the median duration of a given liquidity indicator trading signal staying "high" was 14.8 seconds. While "first mover advantage" likely applies, this time period opens the door for a wide variety of agency execution and smart order routing (SOR) applications that can leverage the liquidity indicator trading signals.

We have also found that the reserve orders detected by the liquidity indicator trading signals can be effective signals of large, natural traders in the marketplace.

Examples of use cases for the manners by which the liquidity indicator trading signals can be advantageously used include the following:

EXAMPLE USE CASE 1: Smart Order Router (SOR) applications may use the hidden liquidity indications to improve fill rates and execution quality by selectively routing orders based on the detection of reserve orders via the liquidity indicator trading signal. Accordingly, the liquidity indicator trading signal enables more aggressive slicing and routing strategies by identifying opportunities to execute larger slices of orders at preferred venues. The aggressiveness of the algorithm may be dynamically tuned using the hidden order execution metrics—for example, orders may be sliced more finely as the executed hidden volume at the price approaches the average reserve order size.

EXAMPLE USE CASE 2: Liquidity seeking algorithms that target multiple levels of a price book can operate more aggressively, with lower risk, if they operate based on detection of and greater visibility into hidden liquidity present at multiple price levels. This includes visibility and tracking of hidden liquidity as the market moves away from reserve orders before the full amount is executed.

EXAMPLE USE CASE 3: Traders can use the presence and execution of reserve orders as a proxy to gauge the interest of natural investors and as a leading indicator of price direction and momentum.

Further still, it should be understood that the liquidity indicator trading signal can be computed for both the bid-side and ask-side of an order book, in which case the signal generate stage 2300 can generate bid liquidity indicators and ask liquidity indicators. Moreover, the signal generate stage 2300 can be configured to generate a fuller set of liquidity indicator data that not only indicates the presence of a reserve order but also quantifies additional aspects of the detected reserve order, such as detected volumes for the reserve orders, detected fills for the reserve orders, etc. These additional data values can be computed via aggregation from various fields of the message's data fields (such as size fields and the like). FIGS. 28A and 28B provide an example list of trading signals that can be generated based on the detection of reserve orders in a market data feed.

The liquidity indicator data set can be delivered as value-added, normalized data fields via an interface such as a client API. Upon detection of a reserve order, the signal generate stage can set a Boolean value to true (e.g., "lighting the liquidity lamp"). This Boolean value can remain true until one of the following conditions renders the liquidity indicator trading signal false: (1) the detected reserve order is exhausted (at the top of the book) when either the quoted price changes inferiorly (a lower bid or higher ask), or (2) the reserve order size is completely executed.

When a reserve order is detected, the liquidity indicator trading signal tracks the order at the price book level, e.g., after detecting an iceberg order at $10.09 bid, a higher bid subsequently arrives and pushes the iceberg order to the second price book level. The liquidity indicator trading signal tracks the iceberg indefinitely until either the order is cancelled or it returns to the top of book where it can be executed. Thus, a liquidity indicator trading signal can and will be true at multiple levels, on both sides of the book, allowing market participants to target multiple layers of hidden liquidity. Furthermore, FIGS. 28A and 28B show examples of additional contextual data that further quantifies aspects of detected reserve orders. These fields can be passed as outputs via a client API or the like.

Hidden Liquidity Size Estimation (Searchlight)

As discussed above, an example of an estimator trading signal that can be generated by embodiments disclosed herein is an estimate that is indicative of the size of a detected reserve order, which can be referred to as a hidden liquidity size estimation. Thus, if the purpose of the liquidity indictor trading signal discussed above is to signal market conditions that beget concentrations of execution activity, then the hidden liquidity size estimation trading signal can serve as a useful companion signal that enables customers to respond to the liquidity indicator trading signal with high efficacy and low risk.

As discussed above, FIG. 29A shows example processing logic for computing an estimate of the size of a detected reserve order. AI and ML techniques can be used for computing such estimates, such as supervised learning as shown in FIG. 29B to develop a model that estimates the probability of a detected reserve order having a particular size.

The first step in developing the model is to build a large set of features that are likely to be correlated and predictive of the target variable—the notional value of the reserve order that has been detected, where the notional value represents the estimated number of shares encompassed by the reserve order multiplied by the subject price. The development of these features can be based on knowledge of financial markets and trading mechanics. For example, the features used for computing the hidden liquidity size estimation can represent a cumulative volume of reserve orders for the financial instrument or a market for the order data and/or a volume of orders executed as part of a currently detected reserve order for the financial instrument. In this regard, example features can include:

Moving average over a 2 minutes window of volume of reserve order shares executed since the reserve order was detected Moving average over a 120 minutes window of volume of reserve order shares executed since the reserve order was detected Moving average over a 5 days window of volume of reserve order shares executed since the reserve order was detected Count of exchanges with reserve orders at the same price Feature creation logic 2902 shown by FIG. 29 can be configured to compute and/or extract these features from the message data fields.

In this example of predicting reserve order size, accuracy is assessed by whether or not the model correctly predicts the notional values of the reserve orders. Rather than attempting to predict a specific notional value, this example divides the range of possible notional values into ordered sub-ranges. After evaluating the accuracy across each sub-range, a partition point is selected between two sub-ranges such that the sum of the accuracies for the sub-ranges on either side of the partition are approximately balanced. This allows the model to make a binary estimate of predicting whether or not a detected reserve order is larger or smaller in notional value than the value associated with the partition.

Example embodiments of the hidden liquidity size estimation trading signal produce high accuracy (e.g., correct predictions of liquidity pool size around 75-80% of the time) with tight variances (e.g., around 2% standard deviation) for the vast majority of symbols and across the venues where the liquidity indicator trading signal is available.

Figure 30:
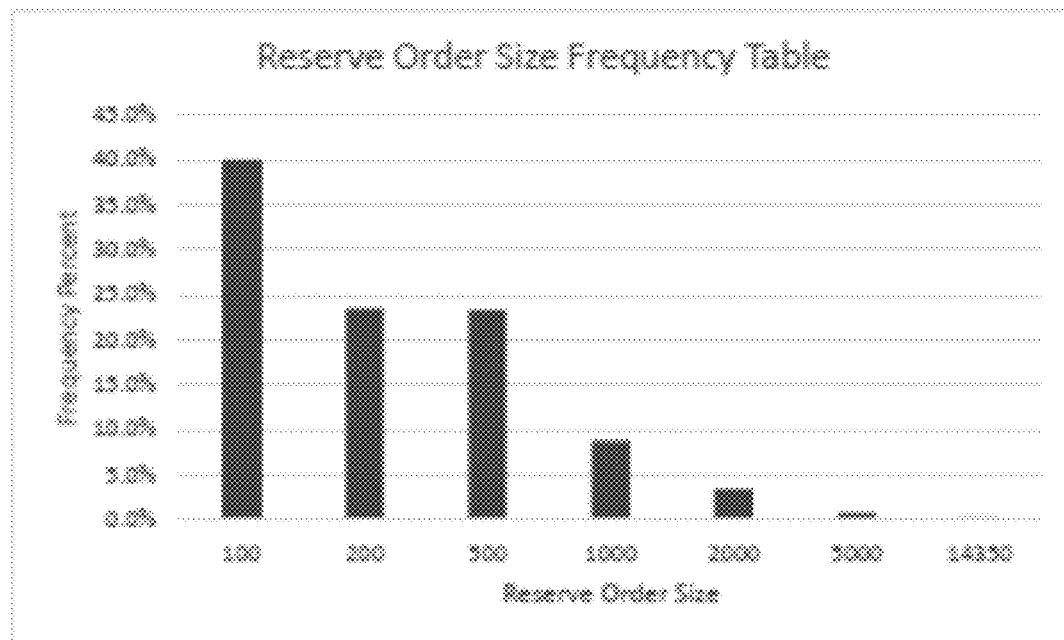
FIG. 30 shows a frequency of reserve orders at different order sizes.

Our studies have shown that reserve orders are not dominated by huge trades as measured by share quantity, but rather reserve orders are commonly used for trades with quantities ranging from 100-500 shares. FIG. 30 shows the frequency of reserve orders at each order size.

Thus, as indicated by FIG. 30, our aim to distinguish and alert our customers of opportunities to engage with large pools of liquidity would not be well served by a target variable of an arbitrary "large quantity", e.g. a 1000 share prediction for a stock priced at $5.00 is materially different from a stock priced in the $100's. Thus, we concluded that using the notional value of a reserve order would be more in line with determining the size of liquidity pools available rather than absolute quantities of shares. When exposing the hidden liquidity size estimation trading signal via a client API, we have the ability to supply data values that represent the estimated notional value, estimated share count, or both, as the hidden liquidity size estimation.

Figure 31:
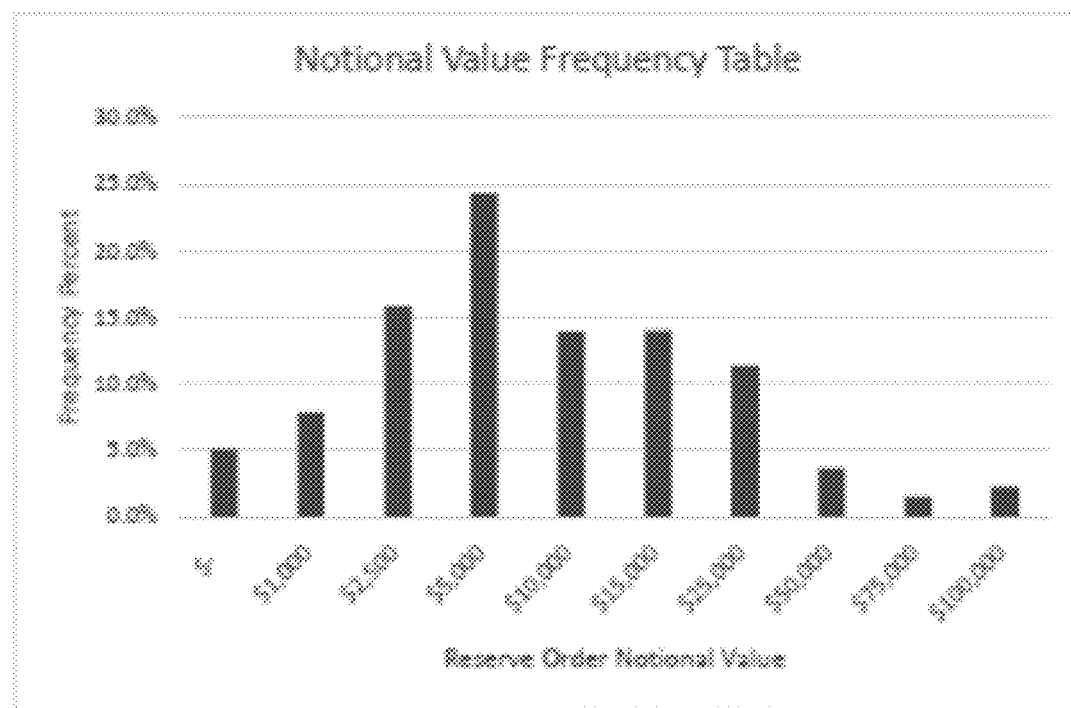
FIG. 31 shows a frequency of reserve orders executed at different notional value intervals.

FIG. 31 shows the frequency of reserve orders executed at notional value intervals. We observe that 81% of all reserve orders have a notional value under $25,000. We also see a dramatic drop off in the frequency of reserve orders exceeding the $50,000 notional value interval. Our target variable can be trained to distinguish the rare "Large" liquidity pools from the "Small to Middle" (SMID) liquidity pools. This partitions the notional value range, top third vs bottom two thirds, according to the historically observed reserve order values.

Figures 32, 33:
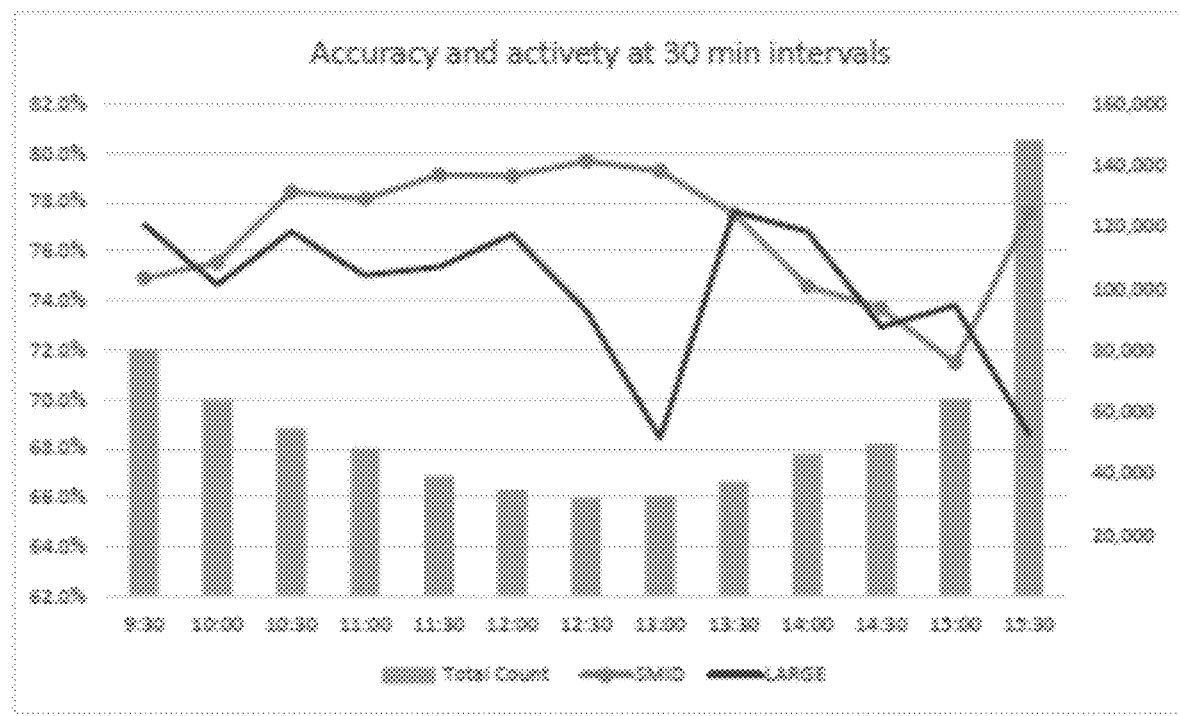
FIG. 32 breaks down the accuracy of an example embodiment for the hidden liquidity size estimation trading signal for different buckets of notional value.
FIG. 33 plots the accuracy of an example embodiment for the hidden liquidity size estimator trading signal at 30 minute intervals throughout a typical trading day.

Our partitioning of the notional value range into the top third and bottom two thirds permits the development of a binary predictive model driven by machine learning techniques as discussed above. This approach enables the hidden liquidity size estimation signal to achieve consistently high accuracy results. FIG. 32 breaks down the scoring of accuracy of the example embodiment for the hidden liquidity size estimation trading signal discussed above by Overall, Large (top third of notional value), and SMID (bottom two thirds of notional value), where the hidden liquidity size estimations were computed from a sample set of trading activity over approximately one-month for the S&P 500 and Russell 2000.

Based on these results, we observe the following:
Consistently High Accuracy: The ability of the hidden liquidity size estimation trading signal to predict with high precision for both Large and SMID liquidity pools enables alpha-seeking trading strategies to operate in diverse market conditions.
Little Volatility in a Volatile Market: The hidden liquidity size estimator was tested during days of low and high market volatility, and it proves to remain highly predictive with a tight range of accuracy. The model's overall range of 4.2% had a peak to trough accuracy of 80%-75.8%. This consistency was observed for predicting both Large and SMID liquidity pools.
High Opportunity with Low Risk: The hidden liquidity size estimator does not suffer from seasonality due to volatility in the marketplace as evidenced by the tight standard deviation of only 1.9%. This allows alpha-seeking trading strategies to minimize the risk of being too conservative or too aggressive when targeting hidden liquidity pools.

We further note that the hidden liquidity size estimation trading signal remains suitably consistent under the various trading conditions that occur throughout a typical day. FIG. 33 plots the accuracy of the hidden liquidity size estimator at 30 minute intervals throughout a typical trading day. FIG. 33 also plots the accuracy of predicting Large and SMID liquidity pools independently. These plots are interposed on the histogram of liquidity events (both Large and SMID) at each 30 minute interval. This indicates that the accuracy of the hidden liquidity size estimator remains consistent through opening auctions, mid-day announcements, and closing auctions. We expect this to reduce the complexity of designing trading strategies that leverage the hidden liquidity size estimation trading signal to interact with available liquidity pools.

Quote Price Duration Estimation (Quote Fuse)

Another example of an estimator trading signal that can be generated by embodiments disclosed herein is an estimate that predicts when the current NBBO prices will change for a symbol. This can be referred to as an estimation of quote price duration or stability. In a first embodiment, price duration can be defined as the elapsed time from the posting of a new best price to a change in that price, regardless of changes in the orders supporting that price level. In the case of NBBO, price duration is also independent of changes in the attribution of the best price (i.e., the exchange attributed as setting that best price). The quote price duration estimation trading signal can be referred to as a Quote Fuse signal, and the Quote Fuse signal can predict if a quote (e.g., the best price in the NMS for a US security) will change faster (e.g., a "short fuse") or slower (e.g., a "long fuse") than a defined threshold T (e.g., 2 milliseconds, 50 milliseconds, other values, etc.) relative to the time that the quote was posted. This price duration estimation can be computed in real-time using a predictive model driven by supervised machine learning techniques, and it can be delivered synchronously with normalized market data as discussed above.

The model used for computing the price duration estimation can be computed like that discussed above for FIG. 29A-B with respect to the hidden liquidity size estimator, albeit with different features and weights. FIG. 13, discussed above, shows an example of processing logic in this regard, and the features used for quote price duration estimation can be features that represent timing data for current quote price durations and size data for order activity with respect to the quote. In this regard, an example set of features for the price duration estimation can include:
Time since the previous bid price change
Time since the previous offer price change
Difference between the current bid size and the maximum bid size posted for the current bid price
Difference between the current offer size and the maximum offer size posted for the current offer price
Logarithm of the elapsed time since the most recent offer price change that occurred during the current bid price duration Logarithm of the elapsed time since the most recent bid price change that occurred during the current offer price duration As discussed above for the hidden liquidity size estimator, the supervised machine learning model for the price duration estimate can use logistic regression, sampled training data for a variety of market conditions where the data is labeled with the measured price duration for each quote, regularization (e.g., L1 and L2 regularization) to develop weights for the model and achieve a suitably parsimonious model (e.g., fewest number of features that yields near-optimal predictive power and avoids over-fitting the model). Furthermore, the model can be re-trained based on additional training data that is labeled with the known price duration for quotes to improve the performance accuracy of the model over time.

An example embodiment of the Quote Fuse signal can deliver a pair of probabilities—the probability of a short fuse bid price and the probability of a short fuse offer price. It should be understood that other example embodiments of the Quote Fuse signal can deliver the probability of a long fuse bid price and the probability of a long fuse offer price. Still other combinations are possible. The probability of a long fuse quote is simply the complement of the short fuse quote—namely, one minus the short fuse probability.

We will now discuss the relationship between signal accuracy and "opportunity capture" (which is also known as recall). Signal accuracy is the percentage of predictions that are correct, while opportunity capture is the percentage of price durations in the market that are correctly predicted as short or long fuse (see also FIG. 42 discussed below, where the principles described below in connection with the Quote Vector signal vis a vis the relationship between accuracy and opportunity capture is also relevant to the Quote Fuse signal). For example, consider a series of 40 quote price updates, 10 of which are short fuse and 30 of which are long fuse. Of the 10 short fuse quotes, assume the Quote Fuse signal predicts six short fuse quotes. Of the 30 long fuse quotes, assume the Quote Fuse signal predicts two short fuse quotes. Accuracy and opportunity capture of short fuse quotes for this example would be 80% (6 of 8) and 60% (6 of 10), respectively. Accuracy and opportunity capture of long fuse quotes for this example would be 87.5% (28 of 32) and 93% (28 of 30), respectively.

We also describe how applications can select a prediction threshold to strike an optimal tradeoff among accuracy and opportunity capture for a given use case. The prediction threshold can be the lower limit of probability used to predict a short fuse quote price. For example, an application with a high tolerance for false positive predictions of short fuse prices may choose a threshold that delivers an accuracy of 53% (where 47% of predictions are false positives) and allows it to correctly identify 41% of the short fuse prices that occur in the market (over 500,000 opportunities in a single trading day). Conversely, an application with a low tolerance for false positive predictions of short fuse prices can select a prediction threshold that delivers 72% accuracy, but this allows it to correctly identify approximately 9% of the short fuse prices that occur in the market (over 160,000 opportunities in a single trading day).

Figure 49:
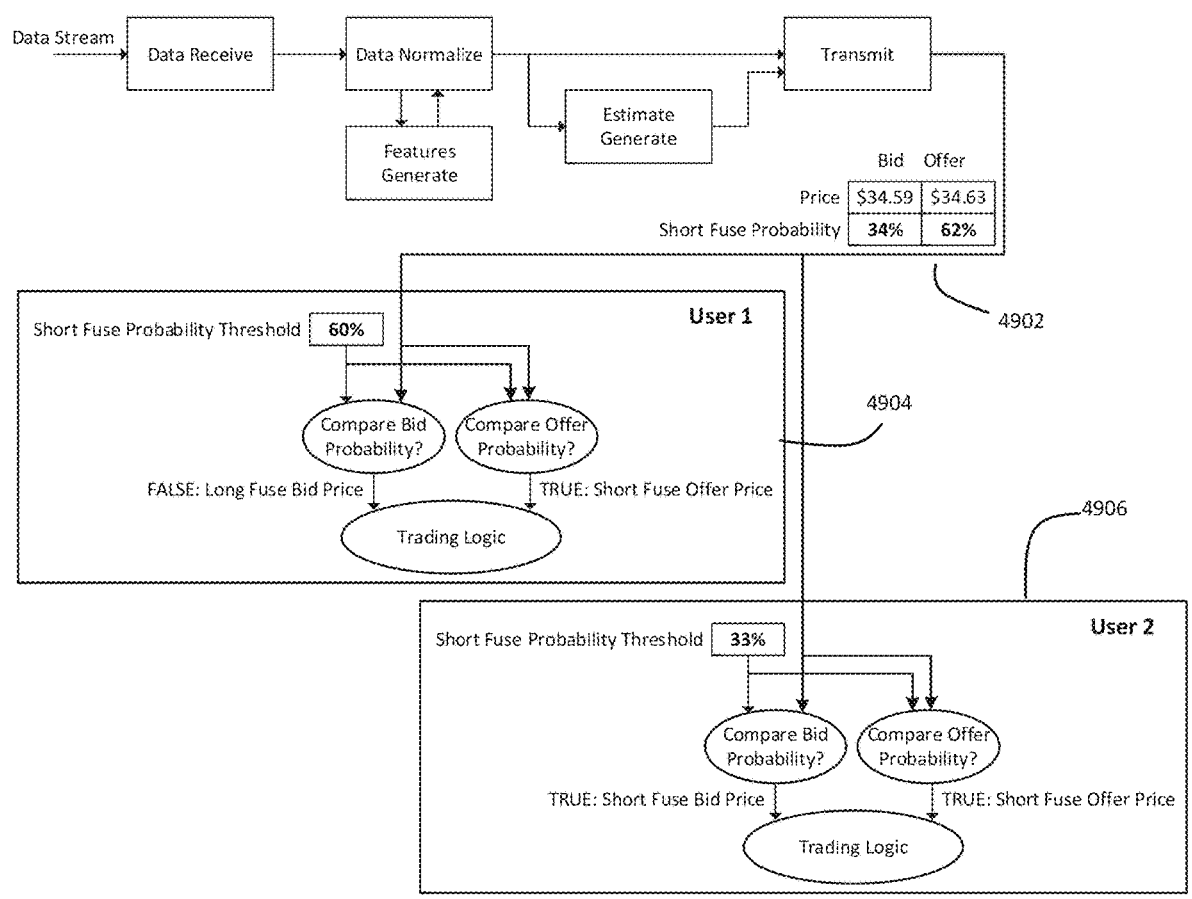
FIG. 49 provides an example embodiment where two users choose a different prediction threshold value for predicting if the bid and offer prices represent short fuse quotes that will change in less than the defined target time value.

FIG. 49 shows an example embodiment where a quote message contains bid and offer prices of $34.59 and $34.63, respectively. The Quote Fuse probabilities generated by the Features Generate and Estimate Generate stages produce short fuse probabilities for the bid and offer prices of 34% and 62%, respectively. The output normalized quote message 4902 contains both the prices and short fuse estimates, and this message 4902 is delivered to two different users (computer systems 4904 and 4906). User 1 chooses a short fuse probability threshold of 60%. The User 1 trading application compares the short fuse estimates in the normalized quote message 4902 to its selected short fuse probability threshold. The comparisons result in a prediction of a short fuse offer price that will change sooner than the specified target time. This signal is used by the trading logic to make a trading decision prior to the predicted offer price change. User 2 chooses a short fuse probability threshold of 33%. The User 2 trading application compares the short fuse estimates in the normalized quote message to its selected short fuse probability threshold. The comparisons result in a prediction of a short fuse bid price and a short fuse offer price that will change sooner than the specified target time. These signals are used by the trading logic to make a trading decision prior to the offer price changes.

Long fuse accuracy and opportunity capture are far less sensitive to the selection of a prediction threshold. For the full range of prediction thresholds that we studied, accuracy ranges from 73% to 82% and opportunity capture ranges from 68% to 99% (3.4 to 4.5 million opportunities in a single trading day). For applications able to leverage from reliable predictions of stable prices, the Quote Fuse signal delivers unprecedented accuracy and millions of opportunities per trading day to profit.

We have designed an example embodiment for the Quote Fuse signal to serve as an optimizing input to market makers, execution algorithms, smart order routers, and order management systems. We envision multiple scenarios where the ability to assess the duration of NBBO prices can be leveraged for better trading results:

Matching—Optimize matching engine performance with a proactive view of route-away requirements and future movements of mid-point pricing in dark pools and alternative trading systems (ATSs)

Sweeping—Enable aggressive execution strategies that minimize market impact by selecting either dark or lit venues based on the stability of NBBO pricing.

Posting—Enable discretionary order types that protect passive orders from unfavorable price movements and seize price improvement opportunities when available.

Routing—Maximize fill rates by differentiating prices as stable or stale.

Furthermore, while the Quote Fuse signal shares similarities to other known techniques of identifying unstable NMS prices, these are important differences and advantages that the example embodiments of the Quote Fuse signal described herein provide relative to such conventional techniques of identifying unstable NMS prices due to its low latency/high throughput ML-based design. Notable examples of such distinctions include:

The Quote Fuse signal can deliver equivalent accuracy on both "crumbling" and "improving" price changes.

The Quote Fuse signal can deliver probabilities on every NBBO price change, rather than firing Boolean signals on just a subset of NBBO price changes.

The Quote Fuse signal can be made directly available to user applications (rather than enabling specific order types on a single market)

The Quote Fuse signal can be generated from proprietary (direct) exchange feeds or the Securities Information Processor (SIP) feeds, enabling users to minimize associated market data fees from exchanges. For example, as disclosed in the above-referenced and incorporated patents, hardware-accelerated logic can synthesize quote data from direct market data feeds for each protected market in the NMS. This quote synthesis can deliver a faster view of the NBBO relative to SIP feeds by reducing data propagation delays and performing NBBO computations via hardware-acceleration.

Figure 34A:
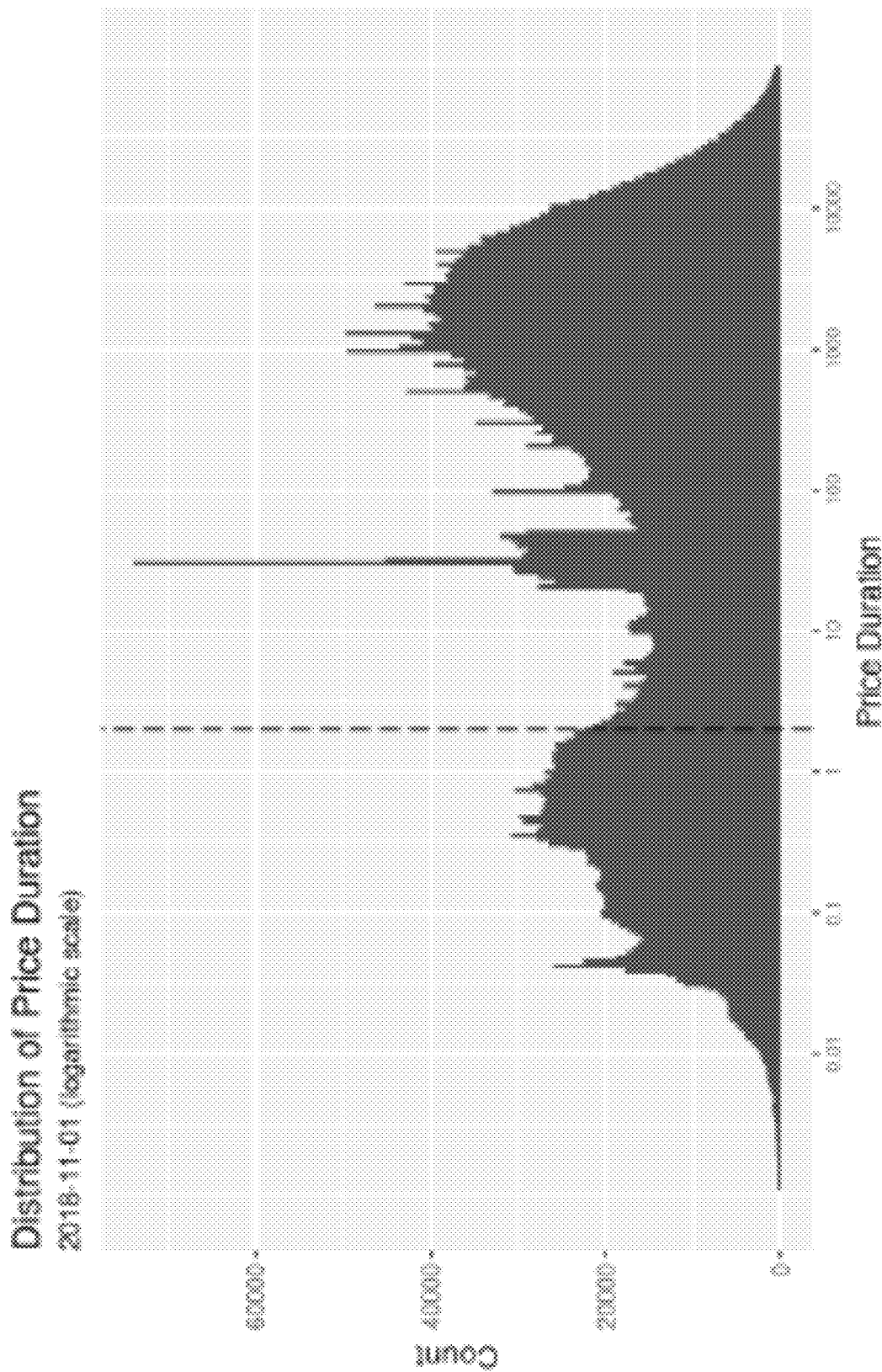
FIG. 34A shows a distribution of National Best Bid price durations for a studied set of securities on a particular trading day.
Figure 34B:
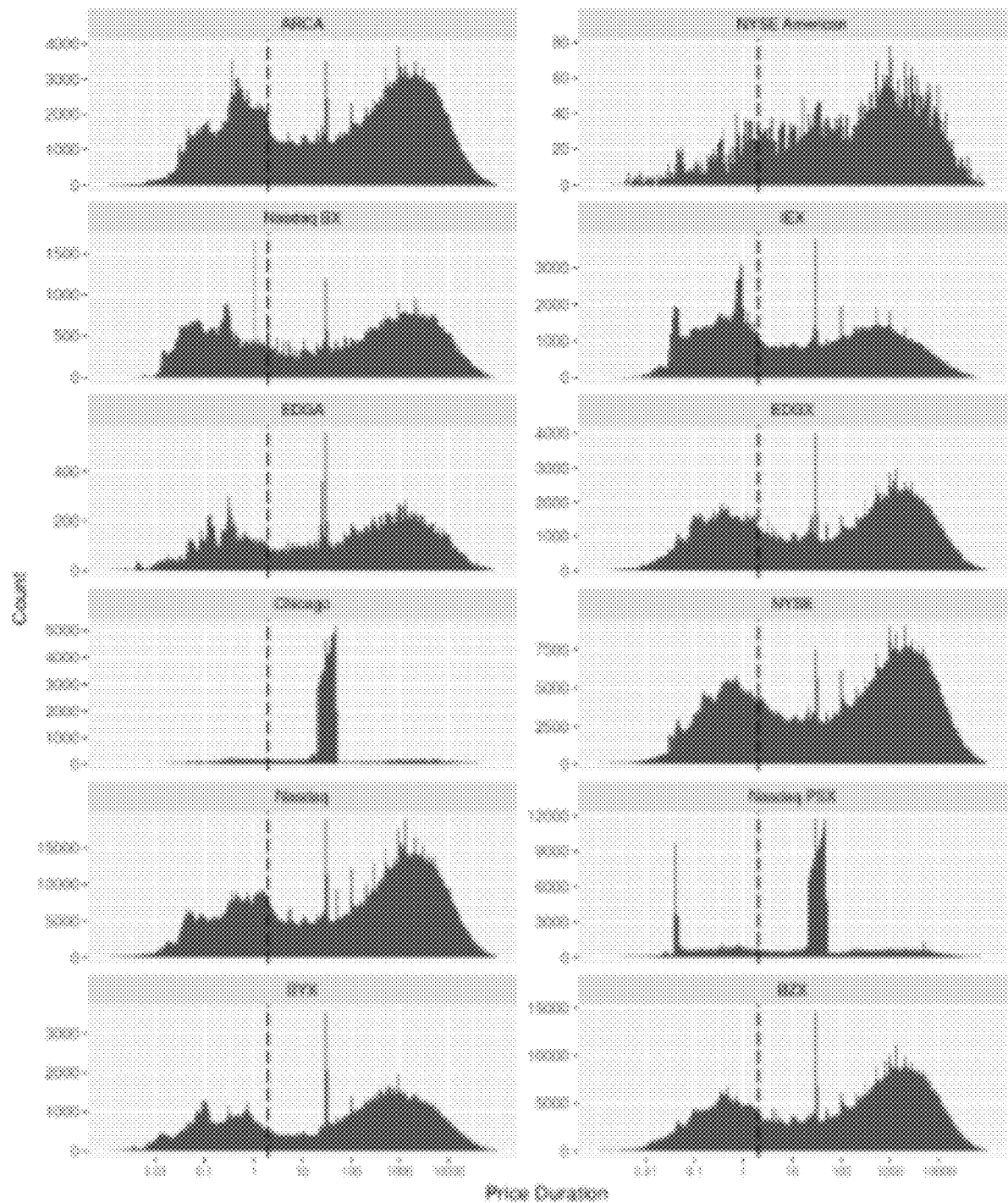
FIG. 34B shows a distribution of National Best price durations per market for a number of different exchanges.

We have found from an analysis of NBBO price durations for major US stock indexes, the S&P 500 and Russell 2000, as well as a selection of major Exchange Traded Funds (ETFs) that price duration consistently has a bimodal distribution. FIG. 34A shows the distribution of National Best Bid prices for studied set of securities on a particular trading day. This bimodal distribution has a median 99.5 milliseconds. In addition to the consistent bimodal distribution, we also noted a consistent cluster of price durations around 20 milliseconds. To gain a better understanding of this artifact, we partitioned the data based on the exchange attributed as setting the National Best price. The per-exchange distributions are shown in FIG. 34B.

A practitioner has a number of options for setting the defined threshold T that defines the length of the "fuse". For example, an example embodiment for the Quote Fuse signal can be configured to predict if a new quote price would have a price duration shorter (short fuse) or longer (long fuse) than the median of the applicable bimodal distribution. Such an embodiment can employ a binary model with a fixed prediction threshold of 50%. At the instance of a price change, if the probability was greater than 50% that the price duration would be shorter than the median, then the model predicts a short fuse. We found that such a model correctly predicted the price duration of quotes, either short fuse or long fuse, 66% of the time. Over the study period, the accuracy ranged from 65.5% to 66.7% with a standard deviation of only 0.4%. This level of accuracy remained stable as the time between the training data set and target data set increased. The short fuse signal fired on 45.4% of the price changes, resulting in an opportunity capture of 30.64% of the short fuse quote instances.

However, some users may desire a Quote Fuse signal that exhibits more consistency of the median price duration across symbols, markets, and time. To facilitate this, we quantified the range of movement of the median price duration across these factors. After exploring solutions to this issue, for another example embodiment of the Quote Fuse signal, we selected a fixed time point as the boundary between short fuse and long fuse price durations. This removes variability in the meaning of the signal and allows users to more easily design applications and trading infrastructure to take advantage of it. Data propagation delays are generally consistent, thus the fixed boundary approach provides applications with a consistent window of time to respond to the Quote Fuse signal.

We then selected a boundary point to maximize the utility of the Quote Fuse signal. First, we considered the data propagation delays between the data centers that host the US securities exchanges that comprise the NMS. Depending on networking technology, the propagation delays between data centers range from 100 to 500 microseconds. Round trip time (RTT) is at least double that. Assuming that most "fast" algorithmic trading applications will respond to new prices in less than one millisecond suggests that the boundary between short and long price durations be set at two milliseconds or less. In the description below, we consider use cases where lower boundary points (e.g. 200 microseconds or lower) may have utility.

For exchanges that exhibit odd price duration behavior for time periods (e.g., a study has shown that the Nasdaq PSX and Chicago Stock Exchange may exhibit odd price duration behavior that is concentrated between 10 and 20 milliseconds—see FIG. 34B). In order to insulate the Quote Fuse signal from these market dynamics, the boundary should not be set in this time range.

Figure 35A:
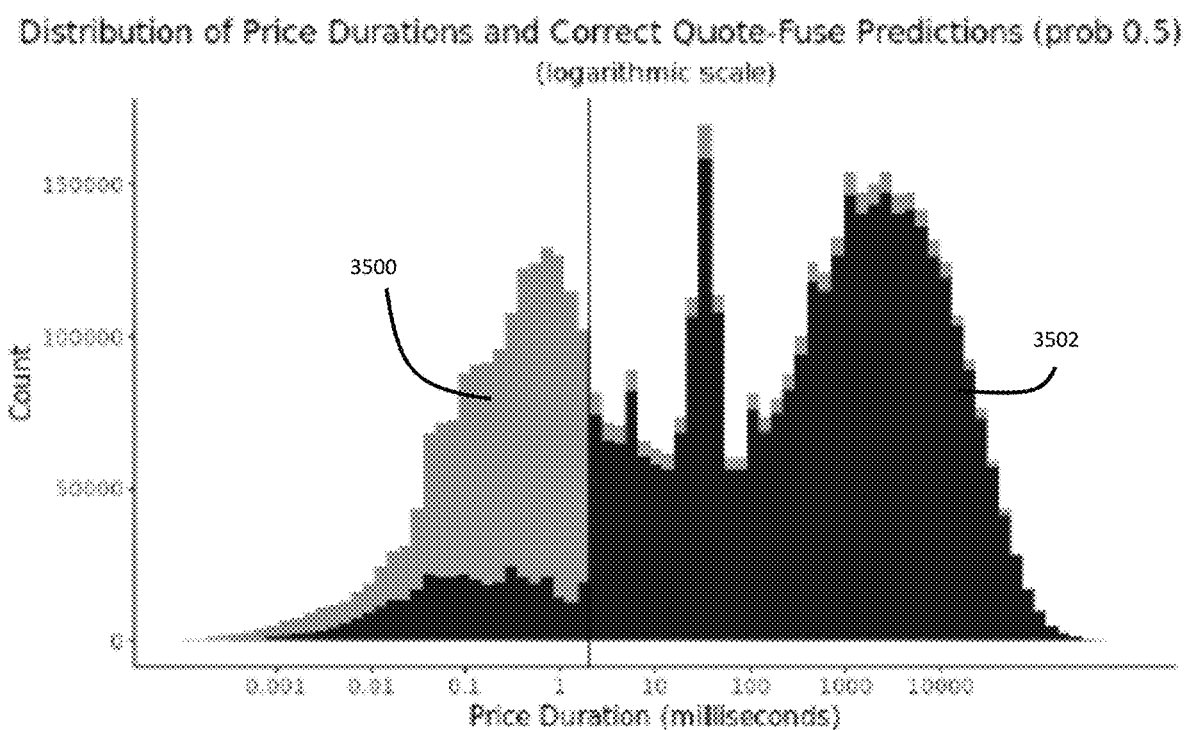
FIG. 35A shows a distribution of price durations and opportunity capture with respect to an example embodiment of the Quote Fuse trading signal, where the prediction threshold is 50%.

Setting the boundary at two milliseconds results in approximately one third of the observed NMS quotes being defined as short fuse with the remaining two thirds defined as long fuse. FIG. 35A shows the price duration distribution in grey (3500) with a two millisecond boundary shown as a vertical divider. It also shows the correct predictions (opportunity capture) in blue (3502) when using this boundary definition and a prediction threshold of 50%. In our description below, we elaborate on the selection of a prediction threshold and its impact on signal frequency, accuracy, and opportunity capture.

First, we walk through a potential use case to illustrate the potential power of the Quote Fuse signal—where the use case involves maximizing fill rates by identifying stale quotes. One challenge faced by a number of agency execution businesses is the issue of "stale" quote prices. We define "stale" to mean new NBBO prices that the executing broker would not be able to capture if they sent an order to exchange(s) with the posted best price. The order(s) setting the price are modified or canceled before an order from the broker is executed against them.

When a new NBBO price is posted, the Quote Fuse signal delivers a new set of probabilities that the bid and offer prices are short fuse quotes. As described below, the broker algorithm can select a prediction threshold that strikes the right balance of accuracy and false positives. A conservative algorithm may choose a low prediction threshold of 34%. This selection allows it to correctly identify 54% of the short fuse quotes that it would not be able to capture, significantly improving its fill rates and overall execution quality. This selection also allows it to correctly identify 76% of the long fuse quotes. We note that the high degree of long fuse quote accuracy may be particularly valuable as it allows a trading algorithm to act immediately on those prices with a high degree of confidence that the posted prices are stable. In this regard, the Quote Fuse signal can further improve execution qualify by removing other less reliable mechanisms for defending against stale quotes.

Optimizing fill rates of agency execution algorithms is just one example of a use case for the Quote Fuse signal. As noted above, an example embodiment of the Quote Fuse signal can deliver a pair of probabilities—the probability of a short fuse bid price and the probability of a short fuse offer price. Users can determine if a price is predicted to be short or long fuse by comparing a probability value to a chosen threshold. For example, if the application chooses a prediction threshold value of 32% and the short fuse probability is 25%, then the prediction is a long fuse price. Assume that the new short fuse probability triggered by the next price update is 43%. The prediction now is a short fuse price. Note that the probability values for the bid and offer prices are independent. Applications can select unique thresholds for bid and offer predictions if their use case benefits from this approach.

Selection of a prediction threshold determines the accuracy (percentage of predictions that are correct) and opportunity capture (the percentage of price changes that are correctly predicted as short or long fuse). As reflected in FIG. 35B (which shows accuracy, opportunity capture, and median observed price durations for trading activity from a particular trading day for a wide range of prediction threshold values, where the defined threshold T is 2 milliseconds), accuracy increases as the prediction threshold is raised. A prediction threshold of 70% delivers an accuracy of over 72% for short and long fuse quotes. As accuracy increases, opportunity capture decreases. If a user desires increased certainty that a short fuse prediction is correct, then the number of short fuse predictions shrinks.

As noted, the probability of a long fuse price is the complement of the short fuse probability. Raising the prediction threshold for short fuse predictions increases the accuracy of short fuse predictions and decreases the accuracy of long fuse predictions. Note from FIG. 35B that the accuracy of short fuse predictions leads the prediction threshold by 11% to 15%. For the 40% range of prediction thresholds, there is a concomitant 52.7% range in short fuse prediction accuracy. For long fuse predictions, the accuracy range is much tighter at <10%. This reduced sensitivity to the prediction threshold is because approximately 72% of the events (quote price durations) are defined as long fuse (longer than two milliseconds). This allows applications to dial-in the desired accuracy and concomitant opportunity capture for short fuse predictions with less impact to the accuracy and opportunity capture for long fuse predictions.

The false positive rate is the complement of accuracy. Note the relationship between false positive predictions and opportunity capture shown by FIG. 35B. As applications decrease the prediction threshold in order to increase opportunity capture, false positive rates also increase. Applications seeking to take advantage of additional opportunity will thus need to tolerate a larger number of false positive predictions.

Figure 36:
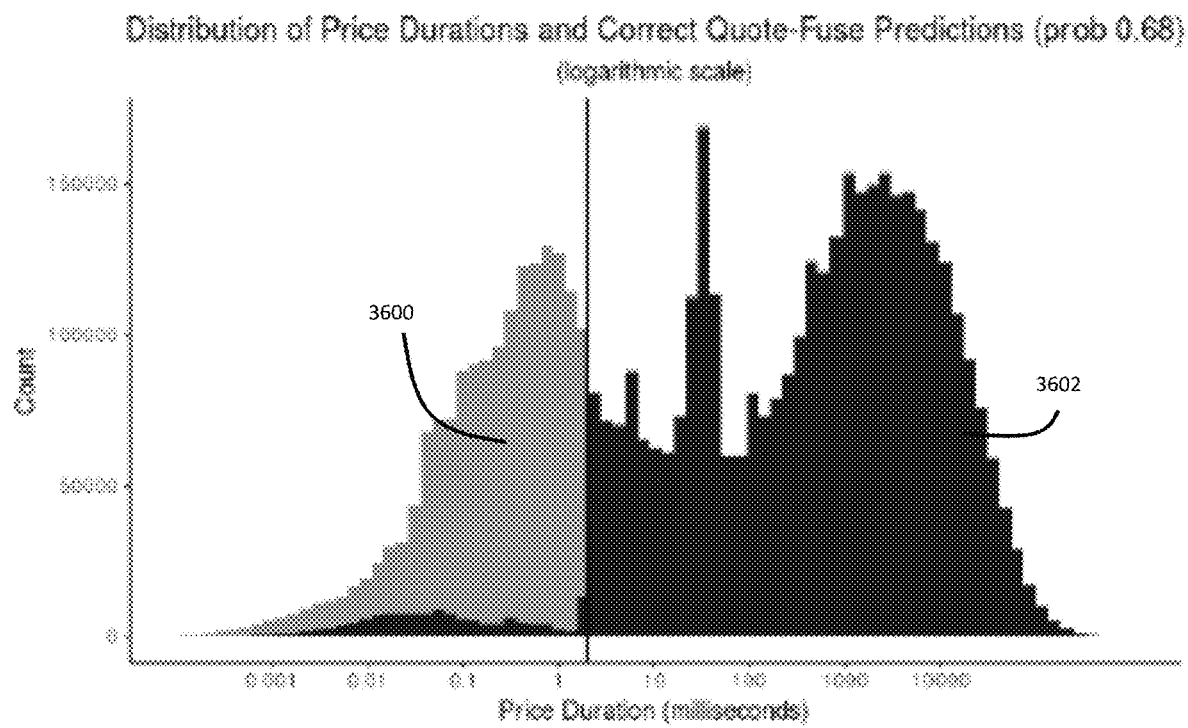
FIG. 36 shows a distribution of price durations and opportunity capture with respect to an example embodiment of the Quote Fuse trading signal, where the prediction threshold is 68%.

FIG. 36 shows the price duration distribution in grey (3600) and the correct predictions in blue (3602) for an example where the prediction threshold is increased from 50% to 68%. When compared to FIG. 35A at the 50% prediction threshold, we note a number of substantial differences:

Opportunity capture for short fuse quotes has decreased by 16.9 to 9.0% of quotes False positive predictions of short fuse quotes (the portion of the distribution 3600 to the right of the two millisecond partition) has decreased by 11.61% (complementary to the increase in accuracy)

Opportunity capture for long fuse quotes has only increased by 5.55% to a near-perfect 98.65%

False positive predictions of long fuse quotes (the visible portion of the distribution 3600 to the left of the two millisecond partition) has also increased by 2.84%

Increasing the prediction threshold to 68% results in a short fuse accuracy of approximately 72%, however only 3.6% of events exceed the threshold. This allows an application to leverage a correct prediction of a short fuse quote on 9.0% of the quotes (opportunity capture). By identifying prices that may not be captured by sending orders to public markets, this may represent a meaningful edge to improve fill rates and increase price improvement rates for execution algorithms and matching engines in ATSs and dark pools.

Figure 37:
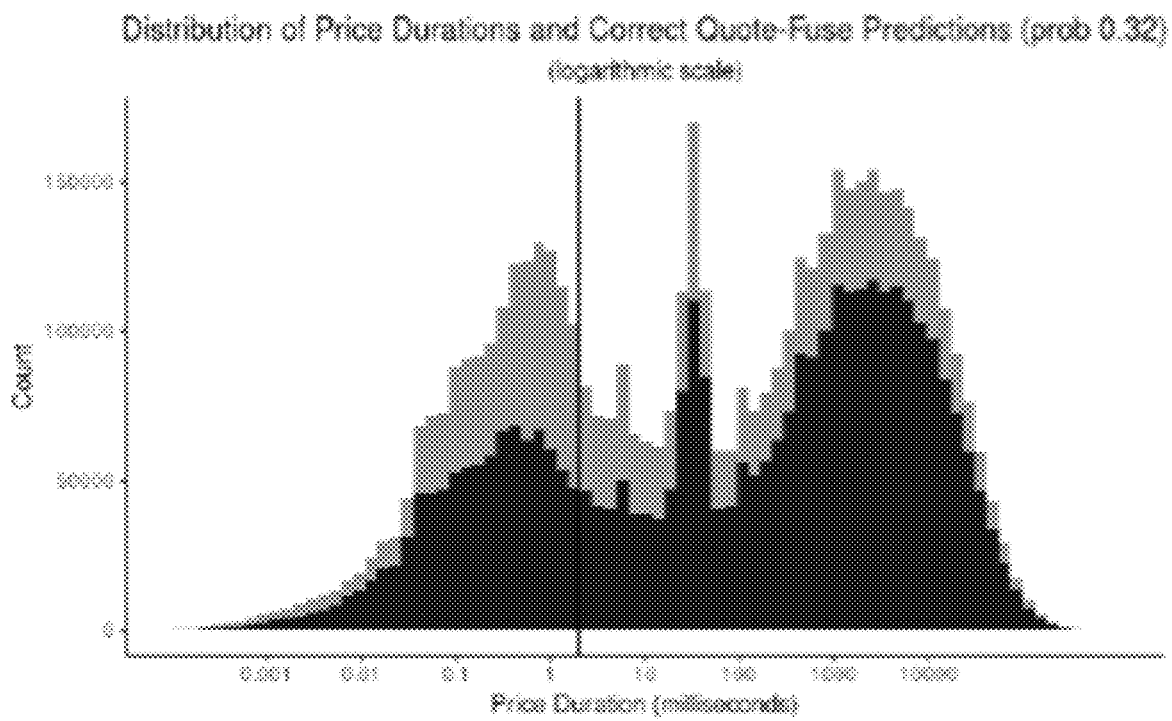
FIG. 37 shows a distribution of price durations and opportunity capture with respect to an example embodiment of the Quote Fuse trading signal, where the prediction threshold is 32%.

Decreasing the prediction threshold increases opportunity capture for short fuse quotes, but also increases the false positive predictions. When the prediction threshold is reduced to 32% (see FIG. 37), the results approximate a random guess as to whether or not a new NMS quote price will have a short or long fuse. Accuracy is approximately 50% (and thus, so is the false positive rate) and opportunity capture is approximately 25%. This scenario is represented in FIG. 37.

A benefit of Quote Fuse signal is its ability to predict the duration of NBBO quote prices regardless of the direction of the next tick. It is conceptually easier to envision a machine learning algorithm predicting a price degradation, or a "crumbling quote". For example, a National Best Bid price only degrades (or crumbles) when all of the available liquidity at all NMS markets at that price is taken (or canceled). When this occurs, the next best price at one or more markets sets the new National Best Bid. Prior to this occurring, the algorithm is able to observe the taking or canceling of liquidity at the markets supporting the National Best Bed price.

Figure 38:
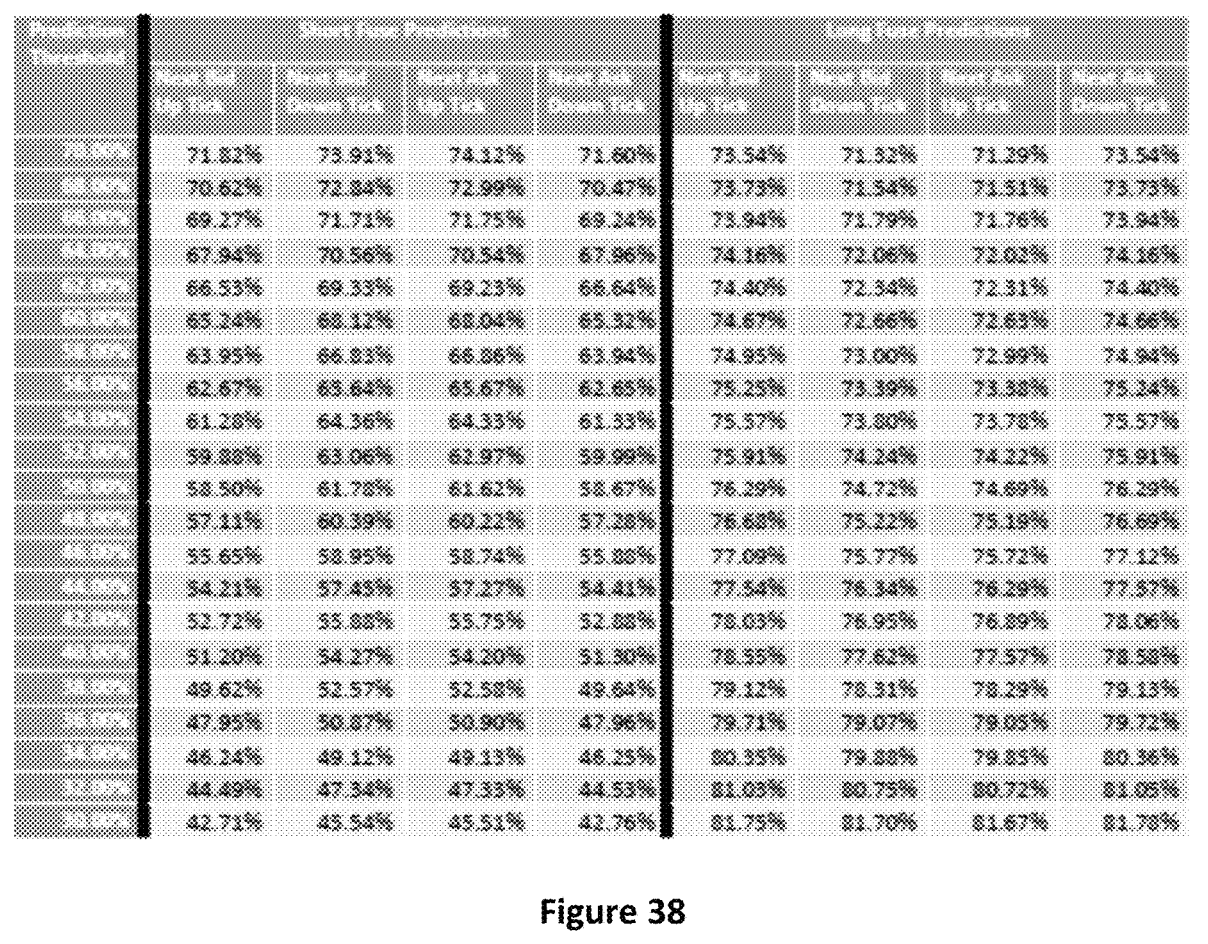

Conversely, it only requires a single order submitted to a single NMS market to improve an NBBO price. This is conceptually more difficult to predict. Two market dynamics that makes prediction possible are momentum and consistency of the spread between the bid and offer. The machine learning algorithm employed to compute the Quote Fuse signal is able to leverage these market dynamics, among others, to predict price improvements just as accurately as "crumbles." FIG. 38 provides accuracy metrics for short and long fuse predictions for each permutation of bid and offer tick direction.

In an example embodiment, a change in NBBO price can trigger the generation of a new Quote Fuse signal event that provides short fuse probabilities for the bid and offer prices. In addition, the Quote Fuse signal event can include the following fields that enable users to correlate the signal to real-time market data: Symbol (the unique identifier for the security), Reference Feed Sequence Number (the sequence number of the event from the feed that triggered the update to the NBBO price), and Reference Feed Identifier (the unique identifier of the feed that triggered the update to the NBBO price).

Figure 39:
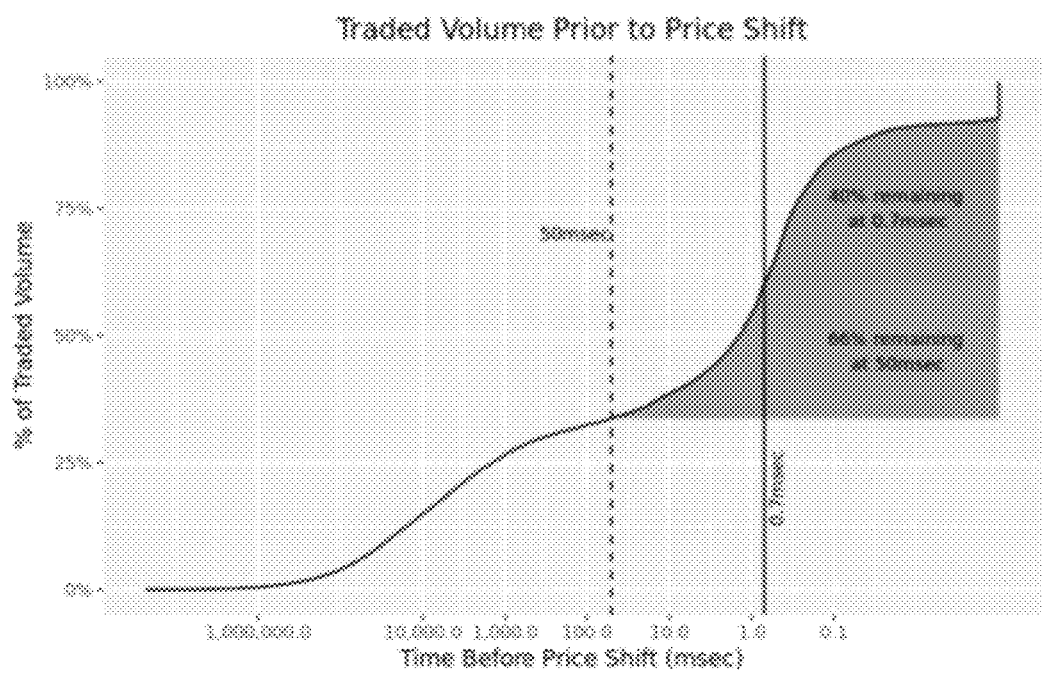
FIG. 39 plots the percentage of traded volume in US equities versus the time at which the trades occur (measured as the time until the next change in NBBO price).

As another example for choosing a value for the defined threshold T, we note that a value of 50 milliseconds can be useful. Our research shows that approximately two-thirds of the daily volume traded in US equities occurs during the 50 millisecond prelude to an NBBO price change. This is shown by FIG. 39 which plots the percentage of traded volume in US equities versus the time at which the trades occur (measured as the time until the next change in NBBO price). Note that the x-axis in FIG. 39 is logarithmic.

FIG. 39 answers the question, "what % of trades occur during the prelude to an NBBO price change"? The dashed vertical line in FIG. 39 is the 50-millisecond prelude that defines the target of the Quote Fuse prediction. As shown in FIG. 39, 66% of the Traded Volume occurs in the 50-millisecond prelude to an NBBO price change.

The solid vertical line in FIG. 39 is the median duration of the Quote Fuse signal when a 50% accuracy threshold is selected by the user. This is the time measured from when the Quote Fuse probability exceeds a 50% accuracy threshold (i.e. the signal "fires") and the next NBBO price change. We view this median duration as the typical reaction time for users to perform an action triggered by the Quote Fuse signal. As shown in FIG. 39, the median duration for a 50% accuracy threshold is 785 microseconds. Approximately 40% of the Traded Volume occurs in the median duration prelude to an NBBO price change.

Consider the data propagation delays between the data centers that host the US securities exchanges that comprise the National Market System (NMS). Depending on networking technology, the propagation delays between data centers range from 92 to 181 microseconds (through fiber). Round trip time is at least double that, meaning it is desirable to give customers at least 400 microseconds to react to short-fuse predictions. A selection of a 50 millisecond target accomplishes this goal.

Figures 40A, 40B:
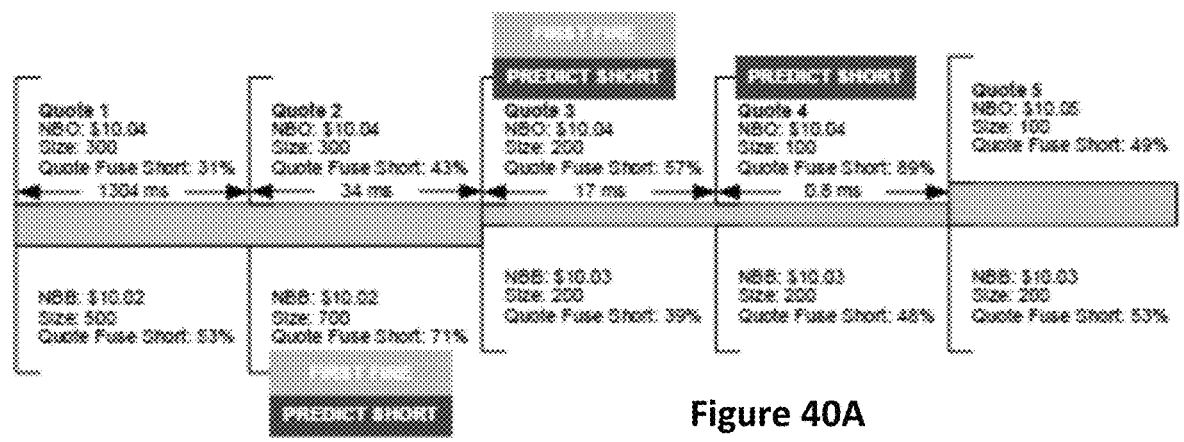

Furthermore, new Quote Fuse signals can be delivered with every normalized quote event. FIG. 40A shows an example price series for successive quote events coordinated with the Quote Fuse signal where the user has selected 55% as the prediction threshold for short fuse price changes. For FIG. 40A, the Quote Fuse signal will thus "fire" when the Quote Fuse probability crosses the user-selected prediction threshold. The first instance of a probability crossing the user-selected prediction threshold is the "first fire" instance in FIG. 40A.

In the example of FIG. 40A, we begin with an NBBO quote 1 of 500 shares bid at $10.02 and 300 shares offered at $10.04. At the time this quote was delivered, the Quote Fuse probabilities of the next price change for the bid and offer occurring in less than 50 milliseconds are 53% and 31%, respectively. Again, these probability values can be delivered synchronously with the normalized quote event fields via a Client API. The time to compute these Quote Fuse probabilities adds less than a microsecond to the normalization and distribution latency of the quote event.

As noted, for this example, we assume that the user has selected 55% as the threshold for imminent (short-fuse) price predictions. By extension, any probability values below the 55% threshold predict stable prices that will not change within the next 50 milliseconds. For Quote 1, the Quote Fuse probabilities for the NBB and NBO do not cross the thresholds for next price change predictions, and indeed the quote prices remain stable for 1.3 seconds until the next quote event arrives.

The next NBBO quote 2 for this instrument increases the number of shares bid to 700. Note that NBB and NBO prices have not changed, but both bid and offer Quote Fuse probabilities are updated to 71% and 43%, respectively. In this intuitive example, increased support for the NBB price increases the probability that more buyers will arrive with equal or better bids. The new Quote Fuse probability for the NBB exceeds the user-selected threshold, thus a "short-fuse" signal fires for the first time—the "first fire" instance in FIG. 40A. Note that in our performance analysis of Quote Fuse, we include metrics for the first fire accuracy (see FIG. 40C). We expect that many algorithms will take decisive action on the first signal of an imminent price change.

The next NBBO quote 3 presents a price change for the NBB to $10.03, but no price change for the NBO. In this example, Quote Fuse correctly predicted that the next NBB price change would occur in less than 50 milliseconds (as quote 3 arrives 34 milliseconds after quote 2). With this new quote come new Quote Fuse probabilities of 39% and 57% for the NBB and NBO, respectively. Again, for the sake of intuition, this example shows that since the NBB price changed, as of this quote, the probability that the next NBB price change will be in less than 50 milliseconds is reduced until more data arrives to predict the next change. The Quote Fuse probability for NBO has increased, however, showing that the model predicts the offer price to change as a result of the rising bid price.

The example of FIG. 40A continues on to show a subsequent quote that only updates sizes, but results in a new Quote Fuse probability for the NBO that exceeds the user-selected threshold and fires a short-fuse prediction. That prediction is strengthened by a subsequent quote 4 that arrives just 0.8 milliseconds ahead of the NBO price change.

As a final note on this example, we refer to the sequence of quotes that retain the current price, but update the size and attribution (i.e. venue setting the best price) as a price series. A price series ends when the price changes. We treat the NBB and NBO independently, such that a quote that changes the NBO price but retains the current NBB price begins a new NBO price series and continues the current NBB price series. As mentioned above, the Quote Fuse probabilities for both the NBB and NBO are updated with every quote. In general, the accuracies of the Quote Fuse probabilities improve with each quote that is added to a price series. The new information delivered with each quote, e.g. adding share size to the NBO, provides the underlying machine learning model with more fuel to generate an accurate prediction.

As reflected by FIGS. 40B and 40C, accuracy increases as the prediction threshold is raised. A prediction threshold of 70% (and a defined threshold T of 500 milliseconds) delivers an accuracy 74.8% for short fuse quotes and 90.8% for long-fuse quotes. As accuracy increases, opportunity capture decreases. If a user desires increased certainty that a short-fuse prediction is correct, then the number of short-fuse predictions shrinks.

Note that the probability of a long-fuse price is the complement of the short-fuse probability. Raising the prediction threshold for short-fuse predictions increases the accuracy of short-fuse predictions and decreases the accuracy of long-fuse predictions. FIGS. 40B and 40C present the accuracy and opportunity capture metrics for a wide range of prediction threshold values in two perspectives; "Overall" metrics is inclusive of every quote prediction whereas "First Fire" are metrics derived from only the first quotes to meet or exceed the threshold per price series.

Note, there is no opportunity capture metric for First Fire since the numerator and denominator would equal. The denominator would equal the population of the first quote in a price series that exceeded the threshold and were less than 50 milliseconds from a price change (which equals the numerator). Notice that the accuracy of short-fuse predictions leads the prediction threshold at every threshold where the delta of accuracy minus threshold shrinks as the threshold increases. The false positive rate is the complement of accuracy. Note the relationship between false positive predictions and opportunity capture. As applications decrease the prediction threshold in order to increase opportunity capture, false positive rates also increase. Applications seeking to take advantage of additional opportunity will need to tolerate a larger number of false positive predictions.

Quote Price Direction Estimation (Quote Vector)

Another example of an estimator trading signal that can be generated by embodiments disclosed herein is an estimate that predicts the direction of the next price change of the NBBO for a security. This quote price direction estimation trading signal can be referred to as a Quote Vector signal.

Thus, when paired with the Quote Fuse signal discussed above, not only can example embodiments predict a duration for the current price (via the Quote Fuse signal), but example embodiments can also predict whether the next price for the subject quote will be up or down (via the Quote Vector signal). Furthermore, example embodiments can predict the next price direction for every quote for a listed security, which means that embodiments can provide over 500 million Quote Vector signals per trading day without impeding the flow of market data to consumers.

The quote price direction estimation can be computed in real-time using a predictive model driven by supervised machine learning techniques, and it can be delivered synchronously with normalized market data as discussed above.

The model used for computing the price direction estimation can be computed like that discussed above for FIGS. 29A-B with respect to the hidden liquidity size estimator, albeit with different features and weights. FIG. 13, discussed above, shows an example of processing logic in this regard, and the features used for quote price direction estimation can be features that represent (1) previous direction changes in price for the quote, and (2) indications of updates to the quote since a most recent price change for the quote. In this regard, an example set of features for the price direction estimation can include:

For the bid price estimator, the direction of the most recent bid price change: −1=down, 0=no change, 1=up For the offer price estimator, the direction of the most recent offer price change: −1=down, 0=no change, 1=up For the bid price estimator, the direction of the second most recent bid price change: −1=down, 0=no change, 1=up For the offer price estimator, the direction of the second most recent offer price change: −1=down, 0=no change, 1=up For the bid price estimator, the direction of the most recent offer price change: −1=down, 0=no change, 1=up For the offer price estimator, the direction of the most recent bid price change: −1=down, 0=no change, 1=up For the bid price estimator, the direction of the second most recent offer price change: −1=down, 0=no change, 1=up For the offer price estimator, the direction of the second most recent bid price change: −1=down, 0=no change, 1=up For the bid price estimator, the count of the number of bid quote updates since the most recent price change For the offer price estimator, the count of the number of offer quote updates since the most recent price change As discussed above for the hidden liquidity size estimator and the price duration estimator, the supervised machine learning model for the price direction estimate can use logistic regression, sampled training data for a variety of market conditions where each quote event is labeled with the known direction of change for the bid and offer prices, regularization (e.g., L1 and L2 regularization) to develop weights for the model and achieve a suitably parsimonious model (e.g., fewest number of features that yields near-optimal predictive power and avoids over-fitting the model). Furthermore, the model can be re-trained based on additional training data that is labeled with the known price directions for quotes to improve the performance accuracy of the model over time.

With an example embodiment, a trading application can choose a probability threshold that controls when the Quote Vector signal is "fired"—when a directional prediction is made because the probability is greater than the chosen threshold value. The description below provides an analysis of prediction accuracy that highlights how an application developer can manage the tradeoffs between signal accuracy and frequency.

For the Quote Vector signal, the "signals" delivered with every new NBBO quote event can be two probability values: the probability that the next change to the bid price will be up and the probability that the next change to the offer price will be up. It should be understood that other example embodiments of the Quote Vector signal can deliver the probability that a next change to the bid price will be down and the probability that a nest change to the offer price will be down. Still other combinations are possible. The probabilities that the next change to the prices will be down are simply the complement of the "up" probabilities. Note that these probability values change, even when the bid and offer price do not change.

Figure 41:
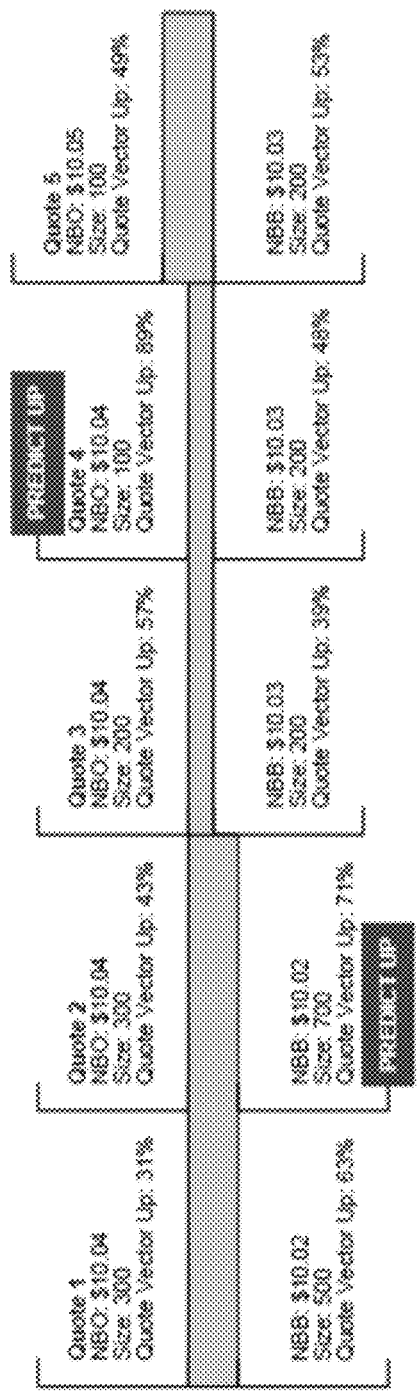
FIG. 41 shows an example of Quote Vector signaling where the user has selected 70% as the threshold for predicting up price changes.

For example, FIG. 41 shows an example of Quote Vector signaling where the user has selected 70% as the threshold for predicting up price changes. By extension, the threshold for predicting down price changes is 30%, and the Quote Vector signal "fires" when the probability crosses the user-selected threshold.

In the example of FIG. 41, we begin with an NBBO quote 1 of 500 shares bid at $10.02 and 300 shares offered at $10.04. At the time this quote was delivered, the Quote Vector signal probabilities of the next price change being up for the bid and offer are 63% and 25%, respectively. Again, these probability values can delivered synchronously with the normalized quote event fields via a client API. The time to compute these Quote Vector signal probabilities adds less than a microsecond to the normalization and distribution latency of the quote event.

As noted above, for this example, we assume that the user has selected 70% as the threshold for up price predictions (which translates to a threshold of 30% for predicting down price changes). For Quote 1, the Quote Vector probabilities for the NBB and NBO do not cross the thresholds for next price change predictions.

The next NBBO Quote 2 for this instrument increases the number of shares bid to 700. Note that NBB and NBO prices have not changed, but both bid and offer Quote Vector probabilities are updated to 71% and 31%, respectively. In this intuitive example, increased support for the NBB price increases the probability that more buyers will arrive with equal or better bids. If (or when) the bid price moves, it is likely that the consistency of the spread will be maintained, and the offer price will likewise increase (but perhaps not on the next price changing NBBO quote event). The new Quote Vector probability for the NBB exceeds the user-selected threshold, thus an up-prediction signal fires, as indicated by FIG. 41.

The next NBBO Quote 3 presents a price change for the NBB to $10.03, but no price change for the NBO. In this example, the Quote Vector signal correctly predicted that the next NBB price change would be up. With this new quote come new Quote Vector probabilities of 39% and 57% for the NBB and NBO, respectively. Again, for the sake of intuition, this example shows that since the NBB price changed, as of this quote, the probability that the next NBB price change will be up is reduced until more data arrives to predict the next change. The Quote Vector probability for NBO has increased, however, showing that the model predicts the offer price to increase as a result of the rising bid price.

The example continues on to show a subsequent quote that only updates sizes, but results in a new Quote Vector probability for the NBO that exceeds the user-selected threshold and fires and up price change prediction, as shown by FIG. 41.

As a final note on this example, we refer to the sequence of quotes that retain the current price, but update the size and attribution (i.e. venue setting the best price) as a "price series". A price series ends when the price changes. We treat the NBB and NBO independently, such that a quote that changes the NBO price but retains the current NBB price begins a new NBO price series and continues the current NBB price series. As mentioned above, the Quote Vector probabilities for both the NBB and NBO are updated with every quote. In general, the accuracies of the Quote Vector probabilities improve with each quote that is added to a price series. The new information delivered with each quote, e.g. adding share size to the NBO, provides the underlying machine learning model with more fuel to generate an accurate prediction.

Figure 50:
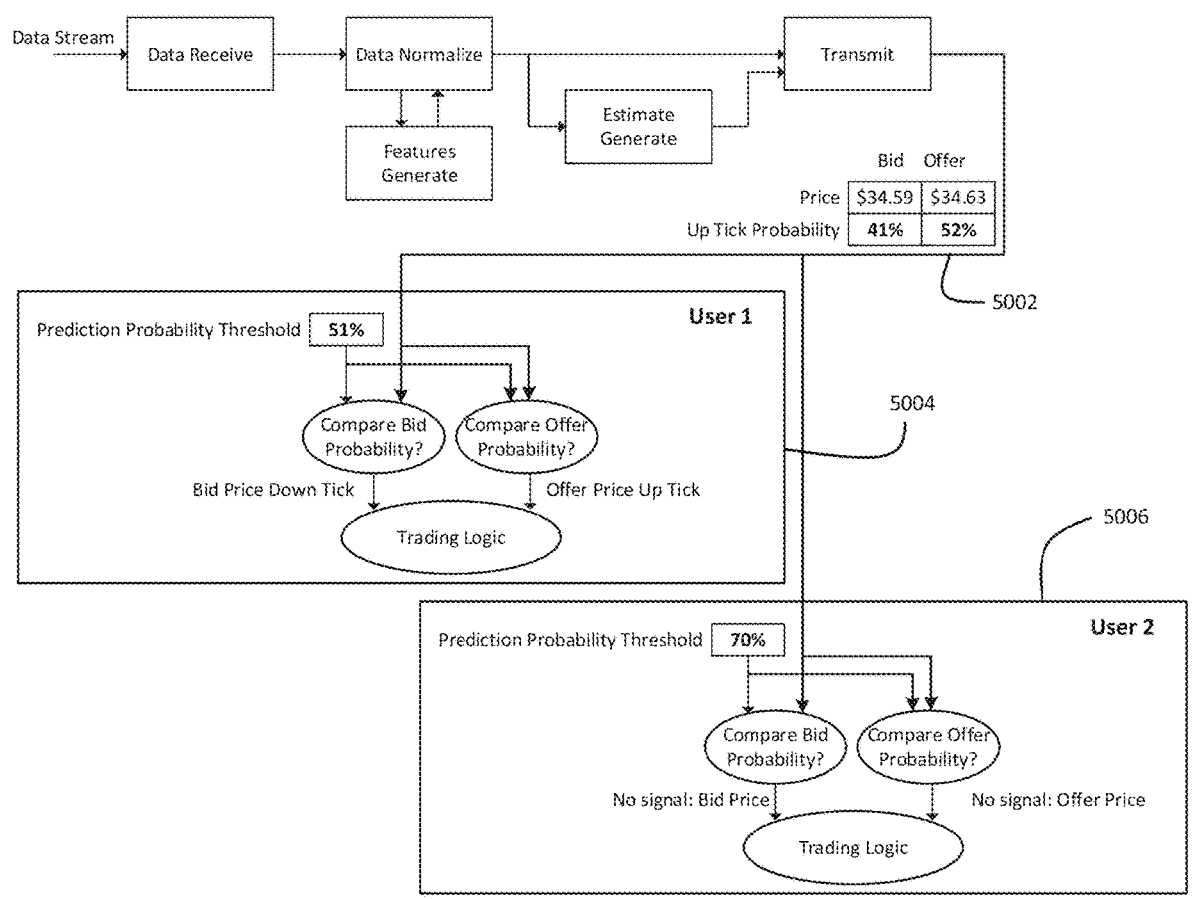
FIG. 50 provides an example embodiment where two users choose a different prediction threshold value for predicting the direction of the next change to the bid and offer prices.

FIG. 50 provides another example embodiment where a quote message contains bid and offer prices of $34.59 and $34.63, respectively. The Quote Vector probabilities generated by the Features Generate and Estimate Generate stages produce up tick probabilities for the bid and offer prices of 41% and 52%, respectively. In this example, the down tick probabilities are the complement of the up tick probabilities, resulting in bid and offer down tick probabilities of 59% and 48%, respectively. The output normalized quote message 5002 contains both the prices and up tick estimates, and this message 5002 is delivered to two different users (computer systems 5004 and 5006). User 1 chooses a prediction probability threshold of 51%. The User 1 trading application compares the up tick and complementary down tick estimates in the normalized quote message to its selected prediction probability threshold. The comparisons result in a prediction of the next bid price being a down tick and the next offer price being an up tick—i.e. a widening spread. These signals are used by the trading logic to make a trading decision prior to the predicted offer price change. User 2 chooses a prediction probability threshold of 70%. The User 2 trading application compares the up tick and complementary down tick estimates in the normalized quote message to its selected prediction probability threshold. The comparisons results in no prediction—i.e. a signal does not "fire" for either the bid or offer price. Note that the trading logic may make a trading decision without incorporating a directional prediction of quote price movement.

We will now explore the performance of an example embodiment of the Quote Vector signal. To facilitate this analysis, we define the following terms:

Accuracy: Quote Vector accuracy refers to the proportion of correct predictions relative to the total number of predictions. That is, when the Quote Vector signal "fires" (because the probability is above the chosen threshold), what percentage of the "fires" were correct?

Opportunity Capture: Quote Vector opportunity capture refers to the proportion of events that were correctly predicted (given a chosen threshold). That is, how many of the up-price changes were predicted to be up?

Response Time: Quote Vector response time refers to the median amount of time from a prediction (the Quote Vector signal "firing") until the next price change event occurs.

Figure 42:
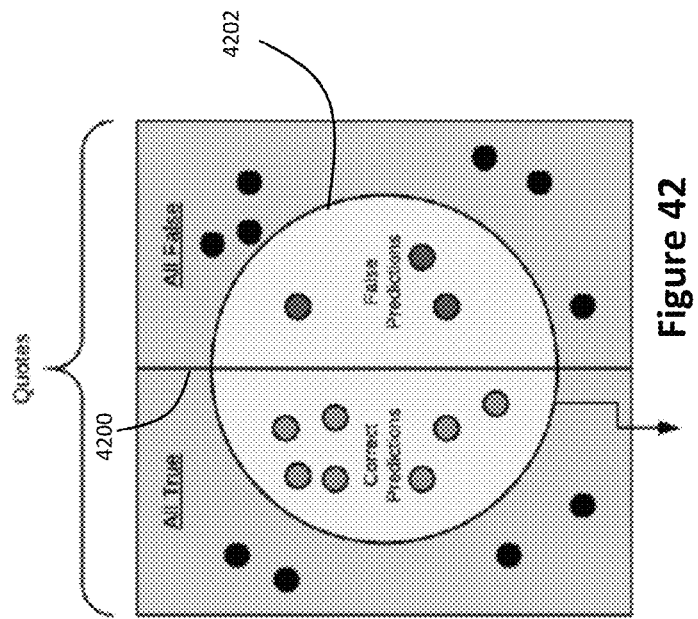
FIG. 42 shows a diagram that illustrates the concepts of accuracy and opportunity capture with respect to an example embodiment of the Quote Vector signal.

FIG. 42 provides a visual guide to these definitions. All the dots shown by FIG. 42 represent quote events; the dots in the box of FIG. 42 to the left of dividing line 4200 are true events (up price changes), while dots to the right of dividing line 4200 represent false events (down price changes). The circle 4202 represents predictions of up price changes (where the probability exceeded the chosen threshold). FIG. 42 shows that 7 dots are correct predictions (of up price changes—see the 7 dots within circle 4202 to the left of line 4200), whereas there are 3 dots that represent wrong predictions (the 3 dots within circle 4202 to the right of line 4200).

In this example, the accuracy is 70.0%-7 out of 10 predictions are correct. The opportunity capture is 63.6%-7 out of 11 up price changes were correctly predicted. Note that quotes with up price changes are to the left of line 4200, and there are 4 missed opportunities to the left of line 4200 that fall outside circle 4202.

To gain an intuition about the impact of the chosen threshold, imagine the size of the circle 4202 shrinking as the threshold increases. As a result, the number of dots that fall inside the prediction circle 4202 is reduced. This results in higher accuracy but fewer opportunities to use correct predictions. Tuning the balance between accuracy and opportunity capture is a primary point of customization and control for application developers.

Figures 43, 44:
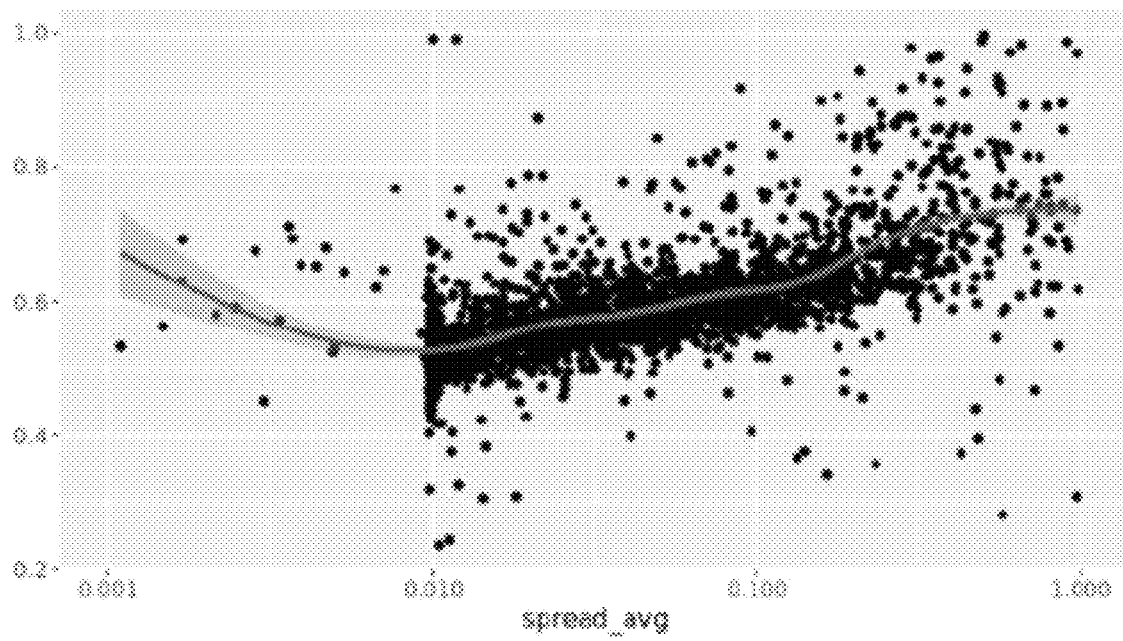
FIG. 43 is a chart that provides three performance metrics using sample trading data from dates with both volatile and nonvolatile days.
FIG. 44 plots the relationship of average spread to proportion of improving to crumbling quotes for tickers with greater than 1000 quotes.

The Quote Vector signal's performance metrics are best understood from the perspective of "improving" vs "crumbling" quotes rather than "up" or "down" quotes. Crumbling quotes are price changes which move away from the midpoint or expand the spread (bid price down or offer price up) whereas improving quotes are the inverse, price changing quotes that collapse the spread or move towards the midpoint (bid up or offer down). Instead of, "did the quote correctly predict an up or down move" we ask, "did the model correctly predict a quote moving towards the midpoint or away from the midpoint". The mechanical properties of a crumbling quote are the same whether it's a bid or offer quote; the total number of displayed shares must be eroded before the next price level becomes the new best price. Although the mechanics are the same, the direction of the move is opposite for the bid and the offer. An improving quote likewise has opposite directional moves (bid up and offer down) but the mechanics are the same; it takes just one market participant to cut the spread or take out an entire price level. FIG. 43 explains three metrics and the characteristics we can derive from the viewpoint.

In this regard, FIG. 43 shows our three primary performance metrics using sample trading data from dates with both volatile and nonvolatile days from December 2018 through February 2019. For reference, FIG. 43 also provides the Cboe Volatility Index (VIX) for each test day. FIG. 43 show metrics for a 50% threshold.

FIG. 43 shows that accuracy and opportunity capture results are incredibly consistency across all test days regardless of volatility (VIX). The average accuracy of 66.7% when quotes are improving has a standard deviation of 0.6%. The miniscule variability in the day-to-day accuracies and opportunity capture allows applications to use the Quote Vector signal with a high degree of confidence in all market conditions.

We note that FIG. 43 also shows that accuracies for "Improving" quotes are consistently higher than the "crumbling" quotes by 4%-8%. Also, the opportunity capture for improving quotes is significantly higher than that for crumbling quotes—78.1% for improving versus 46.6% for crumbling. The differences are attributed to features of the Quote Vector machine learning model that measure the tendency of quotes to resume their normal spread after undergoing expansion and compression. It should be appreciated that the flexibility provided by the machine learning model for computing the Quote Vector signal enables a practitioner to track and update the Quote Vector machine learning model as the efficacy of individual features strengthens and weakens. Furthermore, the ability to track and quantify the performance of the features and weights used for the machine learning model over time also provides a benefit in that it allows a practitioner to support customers who may be subject to order handling disclosures to regulators. In this regard, the Quote Vector signal (as well as other trading signals discussed herein) can be useful for execution algorithms and matching engines in addition to market making and proprietary trading strategies.

The response time (measured in microseconds, $\mu s$) results provide further insight into the dynamics of underlying features. Notice that the response times for crumbling quotes are much faster than those for improving quotes. A plausible explanation is the erosion of displayed liquidity speeds up during the final moments of the price series. In contrast, an improving price that cuts into the spread (perhaps chasing the opposite side price change) is slower in responsiveness. Another explanation of the Quote Vector signal's tendencies to call more "improving" quotes is simply because there are more of them. FIG. 44 plots the relationship of average spread to proportion of improving to crumbling quotes for tickers with greater than 1000 quotes, and it illustrates a positive linear relationship of individual security's spread to the proportion of "improving quotes". FIG. 44 shows that as spreads widen (x axis) for stocks (dots) the proportion of quotes that cut the spread ("improving") increases.

We expect the accuracy of the Quote Vector signal will improve with price series position (i.e. as we approach the point in time when the price changes), and our analysis indicates that the final quartile of the price series position has both the highest number of accurate predictions and there is increasing accuracy with price series position.

The Quote Vector signal's ability to predict the direction of the next price change of the NBBO has value to a wide variety of use cases. For example, the Quote Vector signal can be used to improve the price of every trade from the perspective of both liquidity providers and liquidity takers. Liquidity providers can use the Quote Vector signal to decide to post now at the best price (as the price will degrade on the next change) or to post (or wait to post, depending on your strategy) at the next (better) price (as the price will improve on the next change). Liquidity takers can use the Quote Vector signal to decide to take now at the best price (as the price will degrade on the next change) or to wait to take at the next (better) price (as the price will improve on the next change).

Figures 45, 46:
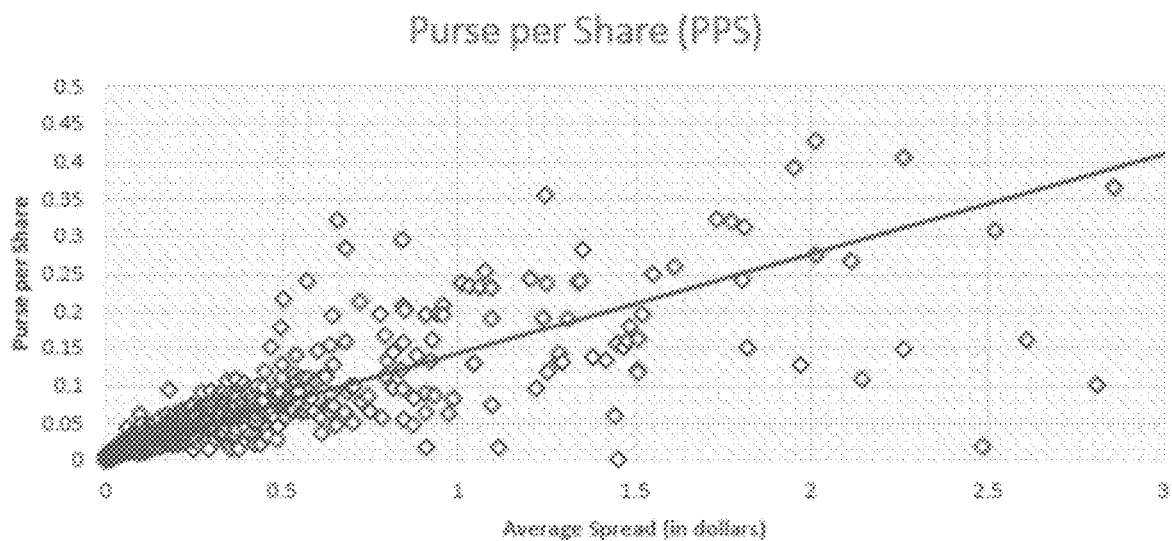
FIG. 45 provides examples that demonstrate how net price improvement can be quantified for different trading scenario examples with respect to an example embodiment of the Quote Vector signal.
FIG. 46 plots "purse per share" (PPS) relative to average spread traded over one day for an example embodiment of the Quote Vector signal.

We define the sum of the traded value of all price improvements to be the Net Price Improvement (NPI), or "purse" for short. Our analysis shows that the daily value of the purse for US listed equities over the past two years ranges from $6.5 million to $14.2 million. Over the past 12 months, the total purse is over $2.3 billion. This represents an enormous opportunity for improved trading that can be aided by the Quote Vector signal. FIG. 45 provides examples that demonstrate how we can determine the contribution to NPI for a given trade.

The assumptions underlying FIG. 45 include the following: (1) available liquidity at NBB or NBO price exceeds trade size, (2) we do not consider market impact, queue positioning, or market data latency, and (3) assume trading application selects a 50% threshold for Quote Vector signal predictions.

Example 1 from FIG. 45 represents a rising price where the trade under consideration is 100 shares at the offer price of $10.39. For this example:
  The probability of the offer price rising is 54.4%, thus the Quote Vector signal fires an up price prediction.
  Quote Vector's correct prediction of a rising offer price benefits both the liquidity taker and provider.
    The liquidity taker should take before the price rises
    The liquidity provider should wait to post at the next (better) price.
  The next offer rises $0.04 to $10.43, thus the prediction was correct.
  Acting on this correct prediction by the Quote Vector signal causes a positive credit to the purse of: $4.00=volume×Δ quote.

Example 2 from FIG. 45 represents a falling price where the trade under consideration is 2000 shares at the offer price of $10.41.
  The probability of the offer price falling is 59.6% (1-40.4%), thus the Quote Vector signal fires a down price prediction.
  Quote Vector's prediction of a falling offer price benefits both the liquidity taker and provider.
    The liquidity taker should wait for a lower price.
    The liquidity provider should stay their order at the current price or post now.
  The next offer falls $0.01 to $10.40, thus the prediction was correct.
  Acting on this correct prediction causes a positive credit to the purse of: $20.00=volume×Δ quote.

Example 3 from FIG. 45 represents an incorrect prediction, where the trade under consideration is 1500 shares at the offer price of $10.45.
  The probability of the offer price rising is 57.8%, thus the Quote Vector signal fires an up price prediction.
  Quote Vector's prediction of a rising offer price negatively impacts both the liquidity taker and provider.
    The liquidity taker should have waited for a lower price.
    The liquidity provider should have stayed their order at the current price or posted at the $10.44.
  The next offer price falls $0.01 to $10.44, thus the prediction was incorrect.
  Acting on this incorrect prediction causes a negative credit to the purse of: −$15.00=volume×Δ quote.

Example 4 from FIG. 45 represents a midpoint trade, where the trade under consideration is a midpoint trade of 1000 shares that the pre-vailing mid-point price of $10.29.
  The probability of the BID UP outcome and OFFER UP outcome are both over 50%
  The Quote Vector signal's prediction of a rising midpoint price benefits both the liquidity taker and provider.
    The liquidity taker should buy at a lower price or wait to sell at a higher price
    The liquidity provider should either wait to sell at a higher price or stay their current midpoint buy order. Should they wait to sell, they could modify the order or wait to post.
  The next offer price rises to $10.31 and causes the midpoint to rise by a half-cent.
  Acting on this correct prediction causes a positive credit to the purse of: $5.00=volume×Δ quote.
    For our analysis, 50% of the purse credit is allocated each to the "Bid" purse and "Offer" purse respectively.

We note that the value of the "purse" on any given day is inherently dependent on trade volume, and strong correlations exist between the daily purse value, volatility, and traded volumes. While these relationships indicate the value of the Quote Vector signal, we further note that the Quote Vector signal also has accessible value if the positive performance remains consistent as we make the analysis more granular. First, we examined the daily purse over the past twelve months and found that the purse was positive every day—the Quote Vector signal never had a down day for the studied period. This result holds when we allocate the daily purse between trades occurring at the bid or offer.

We believe that the Quote Vector signal is most broadly applicable if the available purse for each symbol is consistently positive. This would allow simple trading strategies to be profitable when only considering current quote prices and Quote Vector probabilities for a single symbol at a time.

During out study of 12-months of trading data, we found that 94.7% to 96.4% of the symbols had a positively valued purse on each trading day. Yielding a positive purse for approximately 95% of symbols is an extraordinary achievement of consistency. Next, we wondered about the variability in purse value of each symbol on a per trade (or per share) basis. We note that a symbol like SPY that typically trades with a penny spread has an expected price change of one penny increments, whereas a high priced stock like Berkshire Hathaway can have a significantly larger price change between sequential NBBO quotes and trade events. Since the purse is calculated as the quote price difference (delta) multiplied by the size of the trade, we can calculate a new metric: "Purse per Share" (PPS). PPS can be calculated for each trade and averaged daily for each symbol. For each symbol in our test universe, FIG. 46 plots PPS relative to its average spread traded over one day.

Accurately predicting the direction of the next NBBO price change can deliver extraordinary improvements to a wide variety of trading strategies. For illustration, we highlight a few use cases for advantageous use of the Quote Vector signal, ranging from market making to execution management. These example use cases can be considered in the context of FIG. 41 discussed above.

One example use case is for market makers—who can increase spread capture. For example, a market maker with an open long position at $10.03 (see Quote 3 in FIG. 41) and a resting offer order at $10.04 needs to close this position to capture the spread. A 100% capture of the spread will net the market maker $0.01 per share. The Quote Vector signal predicts the offer price will move up at Quote 4. In response, the market maker modifies his offer order $0.01 higher and receives a favorable queue position before others join his price. She closes the trade at $10.05 for a $0.02 per share spread capture, or double the original opportunity.

Another example use case is for proprietary traders—who can allocated capital more profitably. For example, a proprietary trader using mid-frequency or high-frequency strategies needs to allocate capital to the most profitable trading opportunities. The Quote Vector signal allows the trader to select liquid names with large Purse-per-Share (PPS) opportunity. For example, consider Stock A and B that are priced at $18.50 and $14.75, respectively, and Stock A and B have PPS values are $0.03 and $0.01, respectively. While Stock A requires 8.5% more capital commitment per share, the trader can capture 3× more profit per share by using the Quote Vector signal. With limits on available capital to trade, the trader chooses to trade Stock A, making the most of Quote Vector's ability to drive profitable trades.

Another example use case is for brokers—who can improve execution quality. For example, an agency broker identifies several opportunities to improve execution quality with market microstructure predictions:

Opportunistically cross the spread when it is tight or the market is moving in the same direction as our trading.
Remove the order from the market if the market trades have significant adverse selection or the market is moving in the opposite direction as our trading
Step into the spread to improve fill probability while still capturing the spread The Quote Vector Signal Makes these Opportunities a Reliable Reality.

Yet another example use case is for matching engines—which can attract liquidity with AI-driven order types. An operator of trading venue (exchange, dark pool, or ATS) attracts more order flow by providing order types that improve execution quality. The matching engine also wins more direct market access business by offering order types that incorporate tactical trading logic. A discretionary pegged order can use Quote Vector predictions of NBBO price movements to manage the magnitude of the discretionary offset. Instead of mitigating slippage, the matching engine's customers consistently receive price improvements.

Derived Summaries of Trading Signals

As discussed above, another class of trading signals that can be generated by embodiments described herein are summaries of real-time trading signals. For example, the trading signals generated for Tier 1 market participants can be aggregated and summarized for use by Tier 2 or Tier 3 market participants. These summaries can be referred to as derivative (or derived) trading signals, and they can be delivered to consumers on a periodic basis, such as hourly, daily, etc.

Figure 47:
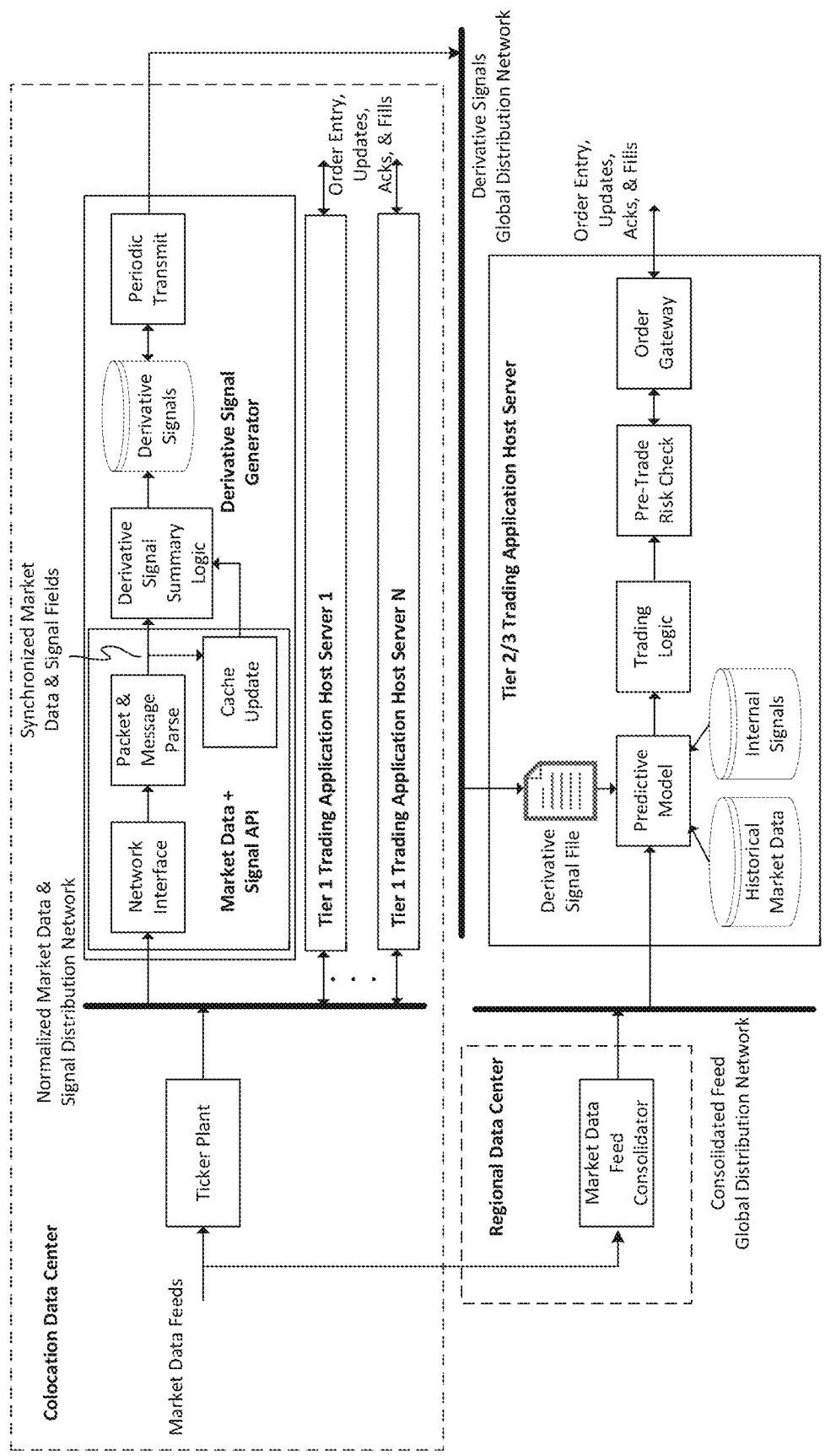
FIG. 47 shows an example embodiment of a derivative signal generator that consumes messages that were generated by a ticker plant and contain both normalized market data and signal data.

FIG. 47 shows an example embodiment of a derivative signal generator that consumes messages that were generated by a ticker plant and contain both normalized market data and trading signal data. Derivative signal summary logic processes the messages to generate derivative trading signals that are delivered on a periodic basis to Tier 2 and 3 trading applications. These derivative trading signals represent summaries of the real-time, low latency, trading signal data that are included in the messages as a result of upstream processing. These derivative trading signals can be aggregated into derivative trading signal files that are periodically reported to the Tier 2/3 trading applications (e.g., see the Tier 2/3 Trading Application Host Server shown by FIG. 47 as consuming derivative trading signal files periodically output by the Derivative Signal Generator. Tier 2 and 3 trading applications may use predictive models that consume the derivative trading signal files along with market data, historical market data, and other internal signals. The predictive model drives trading logic that places buy and sell orders for financial instruments at lower frequency than Tier 1 trading applications.

As an example of derivative signal summary logic, consider a summary file delivered after the conclusion of the trading session that summarizes reserve order trading activity. Specifically, the summary file can provide for each security traded any or all of the following: the total reserve buy orders detected, the total reserve sell orders detected, the Volume Weighted Average Price of total buy orders detected, the Volume Weighted Average Price of total sell orders detected, the notional value of total buy orders detected, and the notional value of total sell orders detected. As discussed above, this information can be used by a Tier 3 market participant to understand changes in the positions of natural traders. The Tier 3 market participant may use this information directly to make investment decisions or feed this information to a predictive model to improve its ability to predict future price movements or quantify risk to their portfolio.

In this example, the derivative signal summary logic can process the liquidity indicator signals associated with the market data messages can aggregate the liquidity indicator trading signal data discussed above for the Liquidity Lamp signal as well as hidden liquidity estimation trading signal data discussed above for the Searchlight signal to compute the values that would populate the summary file. For example, the derivative summary logic can include count logic that accumulates counts of how many buy and sell reserve orders are detected by the liquidity indicator trading signal. Similarly, the derivative summary logic can include summation logic can be sums the computed notional values all of the buy-side and sell-side reserve orders that are detected.

As shown in FIG. 47, the output of the derivative signal summary logic is delivered periodically by periodic transmit component. The component may be configured to transmit a given derivative signal at multiple intervals, such as different scheduled intervals (e.g., every minute, hourly, daily, etc.). As an example, returning to the summary of reserve order trading activity, the periodic transmit component may be configured to deliver summaries covering one minute intervals on a multicast channel A, summaries covering thirty minute intervals on a multicast channel B, and a summary of the full day trading session via file transfer.

The format of derivative signals may use a plurality of formats. Examples include messages with self-describing format such as the Financial Information eXchange (FIX) format, as well as files using comma-separated values (CSV), Extensible Markup Language (XML), or JavaScript Object Notation (JSON) formats.

As shown in FIG. 47, the example Tier 2/3 trading application can use predictive models that consume derivative signal summaries along with market data, historical market data, and other internal signals. Note that the market data in this example may be provided by a market data feed consolidator that uses centralized or regional infrastructure to aggregate and distribute market data at slower speeds and lower cost to Tier 2 and 3 market participants. The predictive model drives trading logic that places buy and sell orders for financial instruments at lower frequency than Tier 1 trading applications.

Figure 48:
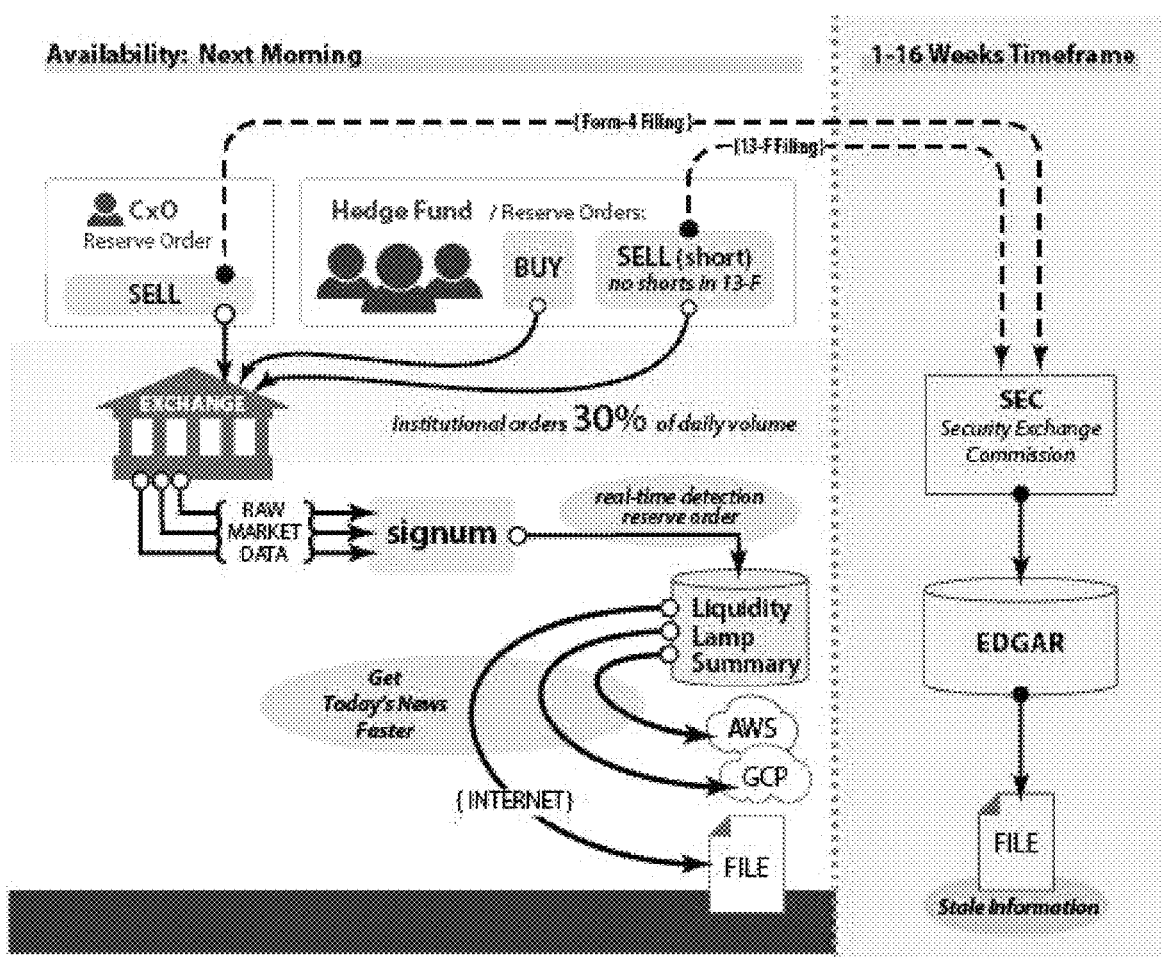
FIG. 48 provides a comparison between an example embodiment for derivative trading signal generation with respect to conventional techniques for inferring the behavior of natural investors.

As discussed above, the ability to generate derivative trading signals from the real-time, low latency, trading signals provides significant technical benefits in the form of dramatically reduced latency. As discussed above for the use of case of detecting the trading activities of natural investors, the conventional approach has been to source Form 13F and Form 4 regulatory filings via computerized searches of the Electronic Data Gathering, Analysis, and Retrieval (ED-GAR) system of the United States Securities and Exchange Commission (SEC) to glean so-called "smart money" movements by large, natural investors. However, this conventional approach typically brings extremely stale data to traders, as indicated by FIG. 48 (which shows an example where daily "Signum" files which represent derived summaries of low latency liquidity indicator trading signals that reflect reserve order activity, as compared to much slower searches/analysis of regulatory databases). By contrast with conventional approaches, the use of derivative summaries of liquidity indicator trading signals provides traders with a mechanism for inferring trading activity by natural investors within much shorter time frames (e.g., hourly, daily, etc.) relative to the conventional approach.

While the invention has been described above in relation to its example embodiments, various modifications may be made thereto that still fall within the invention's scope. Such modifications to the invention will be recognizable upon review of the teachings herein.

What is claimed is:

1. A system for accelerated processing of streaming financial market data to derive trading signals at low latency, the system comprising:
    at least one member of the group consisting of (1) a reconfigurable logic device, (2) a graphics processor unit (GPU), (3) a chip multi-processor (CMP), and (4) a multi-core general purpose processor (GPP); and
    the at least one member configured to (1) receive streaming financial market data and (2) process the streaming financial market data through parallelized processing logic, wherein the streaming financial market data comprises a plurality messages, wherein each of a plurality of the messages comprises a plurality of fields of financial market data;
    wherein the parallelized processing logic comprises (1) a plurality of parallel paths and (2) combinatorial logic downstream from the parallel paths;
    wherein each of a plurality of the parallel paths comprises logic configured to compute a feature of the streaming financial market data based on one or more of the fields of the messages so that a plurality of different parallel paths operate on different fields of the messages to compute a plurality of different features; and
    wherein the combinatorial logic is configured to generate trading signals for the streaming financial market data based on the features computed by the parallel paths.

2. The system of claim 1 wherein the logic within each of a plurality of the parallel paths comprises:
    field selection logic; and
    feature computation logic downstream from the field selection logic;
    wherein the field selection logic is configured to filter which fields of the messages that the downstream feature computation logic in that parallel path will process, wherein the field selection logic in a plurality of different parallel paths are configured to select different sets of the fields of the messages, wherein the different sets share one or more of the fields in common with each other; and
    wherein the feature computation logic is configured to compute a feature for the streaming financial market data based on the financial market data in the filtered fields from the upstream field selection logic in that parallel path, wherein different feature computation logic in a plurality of different parallel paths are configured to compute different features.

3. The system of claim 2 wherein the feature computation logic in at least one of the parallel paths comprises (1) first feature computation logic and (2) second feature computation logic downstream from the first feature computation logic, wherein the second feature computation logic is configured to compute a derivative feature that is derived from a feature computed by the first feature computation logic.

4. The system of claim 1 wherein the combinatorial logic is further configured to generate the trading signals as a weighted combination of the computed features.

5. The system of claim 4 wherein the weighted combination uses a plurality of weights for the features that are derived according to a supervised machine learning model.

6. The system of claim 1 wherein the at least one member further comprises state memory configured to store state data for use by the parallel paths to compute the features over time.

7. The system claim 1 wherein the at least one member is further configured to transmit data for delivery to a consuming application, wherein the transmitted data comprises the generated trading signals and the financial market data.

8. The system of claim 7 wherein the at least one member is further configured to normalize the streaming financial market data, and wherein the transmitted financial market data comprises the normalized financial market data.

9. The system of claim 7 wherein the transmitted data comprises a plurality of trading signal-augmented messages, each trading signal-augmented message comprising a plurality of fields, wherein the fields include (1) a plurality of fields for financial market data applicable to that message and (2) at least one field for a generated trading signal applicable to that message to thereby provide synchrony in the transmitted data between the generated trading signals and the financial market data corresponding to those generated trading signals.

10. The system of claim 9 wherein at least one member is further configured to normalize the streaming financial market data, and wherein the financial market data within the transmitted data comprises normalized financial market data.

11. The system of claim 7 wherein the transmitted data comprises the generated trading signals in synchrony with the financial market data from which the generated trading signals were derived.

12. The system of claim 1 wherein the trading signals include a liquidity indicator that indicates a presence of a reserve order for a symbol.

13. The system of claim 12 wherein the features used for generating the liquidity indicator trading signal include features that represent a plurality of conditions with respect to the streaming financial market data, the conditions comprising (1) a first condition that a message exists in a network packet for the streaming financial market data that represents an order execution at a price for the symbol, and (2) a second condition that another message exists in the same network packet or a near network packet that represents an order addition at the same price for the same symbol.

14. The system of claim 1 wherein the trading signals include a liquidity estimation that estimates an amount of hidden liquidity for a symbol.

15. The system of claim 14 wherein the features used for generating the liquidity estimation trading signal include features that represent a cumulative volume of reserve orders for the financial instrument or a market and/or a volume of orders executed as part of a currently detected reserve order for the financial instrument.

16. The system of claim 14 wherein the liquidity estimation comprises a probability that the hidden liquidity amount is larger or smaller than a defined threshold, and wherein the at least one member is further configured to apply a plurality of the features to a supervised machine learning model to compute the probability for each of a plurality of symbols.

17. The system of claim 1 wherein the trading signals include a quote price stability estimation that estimates a duration of time for which a quote price for a symbol will remain unchanged.

18. The system of claim 17 wherein the quote price stability estimation comprises a probability that indicates the likelihood that the quote price will remain unchanged for a duration defined by a threshold value.

19. The system of claim 18 wherein the probability comprises (1) a short fuse indicator that indicates an estimation that the quote price will remain unchanged for less than the defined threshold duration and/or (2) a long fuse indicator that indicates an estimation that the quote price will remain unchanged for longer than the defined threshold duration.

20. The system of claim 18 wherein the at least one member is further configured to apply a plurality of the features to a supervised machine learning model to compute the probability for each of a plurality of symbols.

21. The system of claim 20 wherein the supervised machine learning model is trained with labeled training data indicative of known durations for previous quotes.

22. The system of claim 1 wherein the trading signals include a quote price direction estimation that estimates whether a next quote price for a symbol will be higher or lower than a current quote price for a symbol.

23. The system of claim 22 wherein the features include features that represent timing data for current quote price durations and size data for order activity with respect to a quote, and wherein the combinatorial logic is further configured to compute the quote price direction estimation for the streaming financial market data based on the timing data features and the size data features.

24. The system of claim 22 wherein the quote price direction estimation comprises a probability that the next quote price for the symbol will be higher or lower than the current quote price for the symbol, wherein the combinatorial logic is further configured to compute the probability based on the features in combination with a plurality of weights applicable to the features, and wherein a selection of which features to use for computing the probability and what values to use for the weights are derived from a supervised machine learning model.

25. The system of claim 24 wherein the supervised machine learning model is trained with labeled training data indicative of known price direction changes for quotes.

26. The system of claim 1 wherein the parallelized processing logic is further configured to generate a plurality of different types of trading signals in parallel, wherein the trading signal types include at least two members of the group consisting of (1) a liquidity indicator that indicates a presence of a reserve order for a symbol, (2) a liquidity size estimation that estimates an amount of hidden liquidity for a symbol, (3) a quote price stability estimation that estimates a duration of time for which a quote price for a symbol will remain unchanged, and (4) a quote price direction estimation that estimates whether a next quote price for a symbol will be higher or lower than a current quote price for that symbol.

27. The system of claim 1 wherein the generated trading signal comprises a probability about an estimation with respect to future financial market data relating to a symbol, the system further comprising:
 a computer system configured to (1) receive the probability, (2) compare the received probability with a defined probability threshold, and (3) in response to a determination that the received probability exceeds the defined probability threshold, trigger an action associated with the symbol linked to the received probability.

28. The system of claim 27 wherein the defined probability threshold is adjustable.

29. The system of claim 1 wherein the at least one member comprises the reconfigurable logic device.

30. The system of claim 29 wherein the reconfigurable logic device comprises a plurality of reconfigurable logic devices.

31. The system of claim 1 wherein the at least one member is further configured to normalize financial market data in a plurality of the fields to generate streaming normalized financial market data for delivery to a plurality of consuming applications; and
 wherein the parallelized processing logic is configured to generate the trading signals from the streaming financial market data for delivery of the trading signals to the consuming applications in coordination with the streaming normalized financial market data with less than ten microseconds of latency.

32. The system of claim 1 wherein the generated trading signals comprise estimators.

33. The system of claim 32 wherein the estimators comprise probabilities about whether a predicted future value or condition will occur.

34. The system of claim 1 wherein the generated trading signals comprise logic signals.

35. A method for accelerated processing of streaming financial market data to derive trading signals at low latency, the method comprising:

streaming financial market data through at least one member of the group consisting of (1) a reconfigurable logic device, (2) a graphics processor unit (GPU), (3) a chip multi-processor (CMP), and (4) a multi-core general purpose processor (GPP), wherein the streaming financial market data comprises a plurality messages, wherein each of a plurality of the messages comprises a plurality of fields of financial market data; and the at least one member processing the streaming financial market data through parallelized processing logic, wherein the parallelized processing logic comprises (1) a plurality of parallel paths and (2) combinatorial logic downstream from the parallel paths; and wherein the processing step comprises (1) logic within the parallel paths computing a plurality of different features of the streaming financial market data based on a plurality of the fields of the messages so that a plurality of different parallel paths operate on different fields of the messages to compute the different features and (2) the combinatorial logic generating trading signals for the streaming financial market data based on the features computed by the parallel paths.

\* \* \* \* \*